US012735641B2

(12) United States Patent
Lee et al.

(10) Patent No.: US 12,735,641 B2
(45) Date of Patent: Sep. 15, 2026

(54) LIQUID-CRYSTAL MEDIUM

(71) Applicant: Merck Patent GmbH, Darmstadt (DE)

(72) Inventors: Eun-Kyu Lee, Pyeongtaek (KR); Jin-Soon Park, Pyeongtaek (KR); Myung-Hee Kim, Pyeongtaeki-si (KR)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/527,649

(22) Filed: Nov. 16, 2021

(65) Prior Publication Data

US 2022/0154073 A1 May 19, 2022

(30) Foreign Application Priority Data

Nov. 17, 2020 (EP) .................................... 20207963

(51) Int. Cl.

| | |
|---|---|
| ***G02F 1/1333*** | (2006.01) |
| ***C09K 19/34*** | (2006.01) |
| ***C09K 19/54*** | (2006.01) |
| ***G02F 1/1337*** | (2006.01) |
| ***G02F 1/1343*** | (2006.01) |
| *C09K 19/04* | (2006.01) |

(52) U.S. Cl.

CPC ........ *C09K 19/3491* (2013.01); *C09K 19/542* (2013.01); *G02F 1/133788* (2013.01); *G02F 1/134309* (2013.01); *C09K 2019/0448* (2013.01); *C09K 2019/548* (2013.01)

(58) Field of Classification Search

CPC .. C09K 19/3491; C09K 19/542; C09K 19/02; C09K 19/04; C09K 19/3098; C09K 19/38; C09K 19/586; C09K 2019/0448; C09K 2019/548; C09K 2019/301; C09K 2019/122; C09K 2019/3004; C09K 2019/3016; C09K 2019/3027; G02F 1/1333

See application file for complete search history.

(56) References Cited

U.S. PATENT DOCUMENTS

| | | | |
|---|---|---|---|
| 4,130,502 A | 12/1978 | Eidenschink et al. | |
| 4,237,026 A | 12/1980 | Eidenschink et al. | |
| 4,868,341 A | 9/1989 | Eidenschink et al. | |
| 10,982,145 B2 | 4/2021 | Xing et al. | |
| 11,008,515 B2 * | 5/2021 | Hirschmann | C09K 19/3066 |
| 2006/0066793 A1 | 3/2006 | Ohmuro et al. | |
| 2012/0305843 A1 | 12/2012 | Klasen-memmer et al. | |
| 2013/0182202 A1 | 7/2013 | Graziano et al. | |
| 2014/0138581 A1 | 5/2014 | Archetti et al. | |
| 2015/0166890 A1 | 6/2015 | Archetti et al. | |
| 2015/0252265 A1 | 9/2015 | Archetti et al. | |
| 2015/0299574 A1 | 10/2015 | Hirschmann et al. | |
| 2016/0090533 A1 | 3/2016 | Hirschmann et al. | |
| 2019/0031958 A1 | 1/2019 | Xue et al. | |
| 2019/0161679 A1 * | 5/2019 | Hirschmann | C09K 19/3405 |
| 2019/0185748 A1 * | 6/2019 | Liao | C09K 19/32 |
| 2019/0185750 A1 | 6/2019 | Meng et al. | |
| 2019/0185751 A1 | 6/2019 | Meng et al. | |
| 2019/0241809 A1 | 8/2019 | Klasen-memmer et al. | |
| 2019/0390112 A1 * | 12/2019 | Hirschmann | C09K 19/16 |
| 2020/0102499 A1 * | 4/2020 | Engel | C09K 19/3048 |
| 2020/0239779 A1 * | 7/2020 | Kang | C09K 19/3491 |
| 2022/0081617 A1 * | 3/2022 | Tuffin | C09K 19/3491 |
| 2022/0154073 A1 * | 5/2022 | Lee | G02F 1/134309 |

FOREIGN PATENT DOCUMENTS

| | | | | |
|---|---|---|---|---|
| CN | 106103652 A | | 11/2016 | |
| CN | 107384439 A | | 11/2017 | |
| CN | 108084029 A | | 5/2018 | |
| CN | 110577832 A | | 12/2019 | |
| CN | 110922985 A | * | 3/2020 | C09K 19/46 |
| CN | 110922987 A | | 3/2020 | |
| CN | 111676026 A | | 9/2020 | |
| CN | 113684037 A | * | 11/2021 | C09K 19/34 |
| DE | 2209127 A1 | | 9/1973 | |
| DE | 2240864 A1 | | 2/1974 | |
| DE | 2338281 A1 | | 2/1974 | |
| DE | 2321632 A1 | | 11/1974 | |
| DE | 2450088 A1 | | 4/1976 | |
| DE | 2636684 A1 | | 2/1978 | |
| DE | 2637430 A1 | | 2/1978 | |
| DE | 2853728 A1 | | 7/1980 | |
| DE | 3321373 A1 | | 12/1984 | |
| DE | 102018009037 A1 | | 5/2019 | |
| EP | 0364538 A1 | | 4/1990 | |
| GB | 1376115 | | 12/1974 | |
| GB | 1395678 | | 5/1975 | |
| GB | 1418441 | | 12/1975 | |
| GB | 1427390 | | 3/1976 | |
| JP | 2015-206042 A | | 11/2015 | |
| JP | 2019-116611 A | | 7/2019 | |
| JP | 2020-023665 A | | 2/2020 | |

OTHER PUBLICATIONS

Machine translation of CN-110922985-A (Year: 2020).*

European Examination Report for European Application No. 21 208 110.3, dated Dec. 1, 2023.

Office Action (The First Office Action) issued Nov. 27, 2024, by the State Intellectual Property Office of People's Republic of China in corresponding Chinese Patent Application No. 202111351546.8 and an English translation of the Office Action. (15 pages).

Office Action (The Second Office Action) issued Mar. 6, 2025, by the State Intellectual Property Office of People's Republic of China in corresponding Chinese Patent Application No. 202111351546.8 and an English translation of the Office Action. (14 pages).

Office Action (Notice of Reasons for Refusal) issued Jun. 30, 2026, by the Japan Patent Office in corresponding Japanese Patent Application No. 2021-185359 and an English translation of the Office Action. (13 pages).

* cited by examiner

*Primary Examiner* — Geraldina Visconti

(74) *Attorney, Agent, or Firm* — Buchanan Ingersoll & Rooney PC

(57) ABSTRACT

A liquid-crystal (LC) medium comprising polymerizable compounds, its use for optical, electro-optical and electronic purposes, in particular in LC displays, especially in LC displays of the PSA (polymer sustained alignment) or SA (self-aligning) mode, an LC display of the PSA or SA mode comprising the LC medium, and a process of manufacturing the LC display.

20 Claims, No Drawings

LIQUID-CRYSTAL MEDIUM

CROSS-REFERENCE TO RELATED APPLICATIONS

This application is a U.S. non-provisional application filed under 35 U.S.C. § 111(a), claiming priority under 35 U.S.C. § 119(a) of European Application No. 20207963.8, filed Nov. 17, 2020, the entire contents of which are incorporated herein by reference for all purposes.

FIELD

The present invention relates to a liquid-crystal (LC) medium comprising polymerizable compounds, to its use for optical, electro-optical and electronic purposes, in particular in LC displays, especially in LC displays of the PSA (polymer sustained alignment) or SA (self-aligning) mode, to an LC display of the PSA or SA mode comprising the LC medium, and to a process of manufacturing the LC display.

BACKGROUND

The popularity of 8K and gaming monitors leads to an increased need for LC display (LCD) panels having higher refresh rates and thus for LC media having faster response times. Many of these LCD panels are using polymer stabilized (PS) or polymer sustained alignment modes (PSA) modes, like the PS-VA (vertically aligned), PS-IPS (in-plane switching) or PS-FFS (fringe-field switching) mode or modes derived therefrom, or self-aligned (SA) modes like SA-VA which are polymer stabilized.

In the PS or PSA mode a small amount, typically from 0.1 to 1% of one or more polymerizable mesogenic compounds, also known as RMs (reactive mesogens), is added to the LC medium. After filling the LC medium into the display the RMs are then polymerized in situ by UV photopolymerization, while a voltage is applied to the electrodes of the display. Thereby a small tilt angle is generated in the LC molecules of the LC medium, which is stabilized by the polymerized RMs. The UV polymerization process, also referred to as "PSA process", is usually carried out in two steps, a first UV exposure step ("UV1 step"), with application of a voltage, to generate the tilt angle, and a second UV exposure step ("UV2 step"), without application of a voltage, to complete polymerization of the RMs.

In the SA-VA mode, the alignment layers are omitted in the display. Instead, a small amount, typically 0.1 to 2.5%, of a self alignment (SA) additive is added to the LC medium, which induces the desired alignment, for example homeotropic or planar alignment, in situ by a self assembling mechanism. The SA additive usually contains an organic, mesogenic core group and attached thereto one or more polar anchor groups, for example hydroxy, carboxy, amino or thiol groups, which are capable of interacting with the substrate surface, causing the additives on the substrate surface to align and induce the desired alignment also in the LC molecules. The SA additive may also contain one or more polymerizable groups that can be polymerized under similar conditions as the RMs used in the PSA process. The LC medium may in addition to the SA additive also contain one or more RMs.

One method to reduce the response times in LC media for the PSA mode is for example by using compounds with an alkenyl group as components of the LC host mixture. However, this may lead to a decrease of the reliability of the mixture when being exposed to the UV light need to polymerize the RMs additives, which is believed to be caused by a reaction of the alkenyl compound with the polyimide of the alignment layer, which is especially problematic when using shorter UV wavelengths of less than 320 nm. Therefore, there is a tendency to use longer UV wavelengths for the PSA process.

Another method to reduce the response time in LC media for the PSA mode is by adjusting the cell gap towards higher/lower cell gaps.

UV-LED lamps have also been proposed for use in the PSA process, as they show less energy consumption, longer lifetime and more effective optical energy transfer to the LC medium due to the narrower emission peak, which allows reducing the UV intensity and/or UV irradiation time. This enables a reduced tact time and savings in energy and production costs. The UV lamps currently available have higher wavelength emission, for example at 365 nm.

SUMMARY

Therefore, there is a need for polymerizable LC media for use in PSA or SA displays, which enable a high specific resistance at the same time as a large working-temperature range, short response times, even at low temperatures, and a low threshold voltage, a low tilt angle, a high tilt stability, a multiplicity of grey shades, high contrast and a broad viewing angle, have high reliability and high values for the VHR after UV exposure, and, in case of the polymerizable compounds, have low melting points and a high solubility in the LC host mixtures and enable polymerization even at longer UV wavelengths. In displays for mobile applications, it is especially desired to have available LC media that show low threshold voltage and high birefringence.

The present invention is based on the object of providing novel suitable materials, in particular RMs and LC media comprising the same, for use in PSA or SA displays, which do not have the disadvantages indicated above or do so to a reduced extent.

In particular, the invention is based on the object of LC media comprising RMs for use in PSA or SA displays, which enable very high specific resistance values, high VHR values, high reliability, low threshold voltages, short response times, high birefringence, show good UV absorption also at longer UV wavelengths, preferably in the range from 340 to 380 nm, enable quick and complete polymerization of the RMs, allow the generation of a low tilt angle, preferably as quickly as possible, enable a high stability of the tilt angle even after longer time and/or after UV exposure, reduce or prevent the occurrence of "image sticking" and "ODF mura" in the display, and in case of the RMs polymerize as rapidly and completely as possible and show a high solubility in the LC media which are typically used as host mixtures in PSA or SA displays.

A further object of the invention is to provide LC media for use in PSA displays wherein the RMs exhibit both fast polymerization speed and good reliability parameters, like high VHR or tilt stability.

A further object of the invention is the provision of novel LC media containing RMs, in particular for optical, electro-optical and electronic applications, and of suitable processes and intermediates for the preparation thereof.

It was found that one or more of these objects could be achieved by providing LC media as disclosed and claimed hereinafter.

The Invention Thus Relates to an LC Medium Comprising a polymerizable component A) comprising, preferably consisting of, one or more polymerizable compounds, and a liquid-crystalline component B), hereinafter also referred to as "LC host mixture", comprising, preferably consisting of, one or more mesogenic or liquid-crystalline compounds, wherein component B) comprises one or more compounds of formula IA, one or more compounds of formula IB, and one or more compounds of formula IC

IA

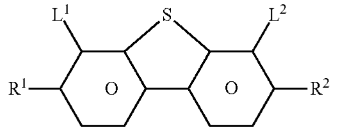

IB

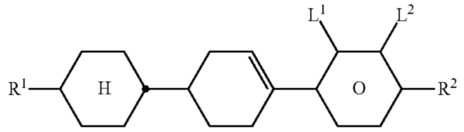

IC

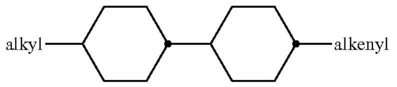

in which the individual radicals, on each occurrence identically or differently, and each, independently of one another, have the following meaning:

$R^1$, $R^2$ straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

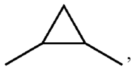,
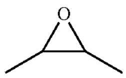,
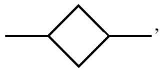,
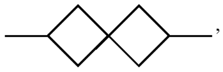,
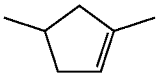
or
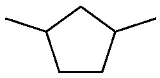

in such a manner that O- and/or S-atoms are not directly connected with each other, and wherein one or more H atoms are each optionally replaced by F or Cl, preferably alkyl or alkoxy having 1 to 6 C atoms, $R^0$, $R^{00}$ H or alkyl having 1 to 12 C atoms, $L^1$, $L^2$ F or Cl, preferably F, alkyl an alkyl radical having 1 to 7 C atoms, preferably having 2 to 5 C atoms, particularly preferably n-propyl, alkenyl an alkenyl radical having 2 to 5 C atoms, preferably having 2 to 4 C atoms, particularly preferably vinyl or 1-propenyl, wherein the proportion of compounds of formula IA in the component B) of the LC medium is >5% by weight, preferably >8% by weight.

The liquid-crystalline component B) of an LC medium according to the present invention is hereinafter also referred to as "LC host mixture", and preferably contains only LC compounds that are selected from low-molecular-weight compounds which are unpolymerizable, like those of formula IA, IB or IC, and optionally contains additives like polymerization initiators, inhibitors etc.

The invention furthermore relates to an LC medium or LC display as described above and below, wherein the polymerizable compounds of component A) are polymerized.

The invention furthermore relates to a process for preparing an LC medium as described above and below, comprising the steps of mixing one or more compounds of formula IA, IB and IC, or an LC host mixture or LC component B) as described above and below, with one or more polymerizable compounds, and optionally with further LC compounds and/or additives.

The invention further relates to the use of LC medium in LC displays, especially in LC displays of the PSA or SA mode.

The invention furthermore relates to the use of LC medium according to the invention in PSA displays, in particular the use in PSA displays containing an LC medium, for the production of a tilt angle in the LC medium by in-situ polymerization of the polymerizable compound(s) of component B) in the PSA display, preferably in an electric or magnetic field.

The invention furthermore relates to an LC display comprising one or more compounds of formula I or an LC medium according to the invention, which is preferably a PSA display, very preferably a PS-VA, PS-IPS or PS-UB-FFS display.

The invention furthermore relates to an LC display comprising an LC medium as described above and below wherein the polymerizable compounds are present in polymerized form, which is preferably a PSA or SA display, very preferably a PS-VA, PS-IPS, PS-FFS or SA-VA display.

The invention furthermore relates to an LC display of the PSA type comprising two substrates, at least one which is transparent to light, an electrode provided on each substrate or two electrodes provided on only one of the substrates, and located between the substrates a layer of an LC medium as described above and below, wherein the polymerizable compounds are polymerized between the substrates of the display by UV photopolymerization.

The invention furthermore relates to a process for manufacturing an LC display as described above and below, comprising the steps of filling or otherwise providing an LC medium as described above and below between the substrates of the display, and polymerizing the polymerizable compounds, preferably while a voltage is applied to the electrodes of the display.

The invention furthermore relates to a process for manufacturing an LC display as described above and below, wherein irradiation of the polymerizable compounds is carried out using a UV-LED lamp.

The LC media according to the present invention show one or more of the following advantageous properties when used in PSA displays:

- high transmittance,
- high contrast ratio,
- reduced image sticking,
- reduced ODF mura,
- reduced rotational viscosity,
- high reliability and high VHR value after UV exposure and/or heat treatment,
- fast response times,
- strong tilt generation which is inside a certain process window, fast polymerization leading to minimal residues of RM after the UV-process, good tilt stability.

An alkenyl group in the compounds of formula IA, IB, II or other components of the LC medium as disclosed below is not considered to be within the meaning of the term "polymerizable group" as used herein. The conditions for the polymerization of the polymerizable compounds of the LC medium are preferably selected such that alkenyl substituents do not participate in the polymerization reaction. Preferably, the LC media disclosed and claimed in the present application do not contain an additive that initiates or enhances the participation of the alkenyl group in a polymerization reaction.

Unless stated otherwise, the polymerizable compounds and the compounds of formula II are preferably selected from achiral compounds.

DETAILED DESCRIPTION

As used herein, the expression "UV light having a wavelength of" followed by a given range of wavelengths (in nm), or by a given lower or upper wavelength limit (in nm), means that the UV emission spectrum of the respective radiation source has an emission peak, which is preferably the highest peak in the respective spectrum, in the given wavelength range or above the given lower wavelength limit or below the given upper wavelength limit and/or that the UV absorption spectrum of the respective chemical compound has a long or short wavelength tail that extends into the given wavelength range or above the given lower wavelength limit or below the given upper wavelength limit.

As used herein, the term "substantially transmissive" means that the filter transmits a substantial part, preferably at least 50% of the intensity, of incident light of the desired wavelength(s). As used herein, the term "substantially blocking" means that the filter does not transmit a substantial part, preferably at least 50% of the intensity, of incident light of the undesired wavelengths. As used herein, the term "desired (undesired) wavelength" e.g. in case of a band pass filter means the wavelengths inside (outside) the given range of λ, and in case of a cut-off filter means the wavelengths above (below) the given value of λ.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display), and will be understood to be inclusive of "pretilt" and "pretilt angle". The tilt angle here denotes the average angle (<90°) between the longitudinal molecular axes of the LC molecules (LC director) and the surface of the plane-parallel outer plates that form the LC cell. A low absolute value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

An SA-VA display according to the present invention will be of the polymer stabilised mode as it contains, or is manufactured by use of, an LC medium containing RMs of formula I and II. Consequently as used herein, the term "SA-VA display" when referring to a display according to the present invention will be understood to refer to a polymer stabilised SA-VA display even if not explicitly mentioned.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

Above and below,

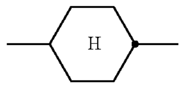

denotes a trans-1,4-cyclohexylene ring, and

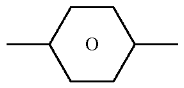

denotes a 1,4-phenylene ring.

In a group

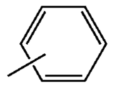

the single bond shown between the two ring atoms can be attached to any free position of the benzene ring.

If in the formulae shown above and below a group $R^{1-12}$, $R^{Q}$, R or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If in the formulae shown above and below a group $R^{1-12}$, $R^{Q}$, R or L denotes an alkyl radical wherein one or more $CH_2$ groups are replaced by S, this may be straight-chain or branched. It is preferably straight-chain, has 1, 2, 3, 4, 5, 6 or 7 C atoms and accordingly preferably denotes thiomethyl, thioethyl, thiopropyl, thiobutyl, thiopentyl, thiohexyl or thioheptyl.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxa-decyl.

If in the formulae shown above and below a group $R^{1-12}$, $R^{Q}$, R or L denotes an alkoxy or oxaalkyl group it may also contain one or more additional oxygen atoms, provided that oxygen atoms are not linked directly to one another.

In another preferred embodiment, one or more of $R^{1-12}$, $R^{Q}$, R or L are selected from the group consisting of

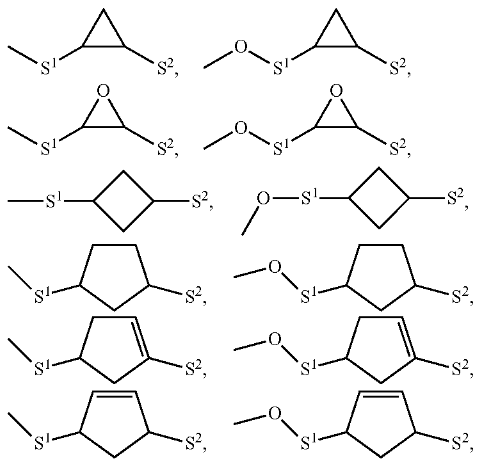

$—S^1—F$, $—O—S^1—F$, $—O—S_1—O—S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

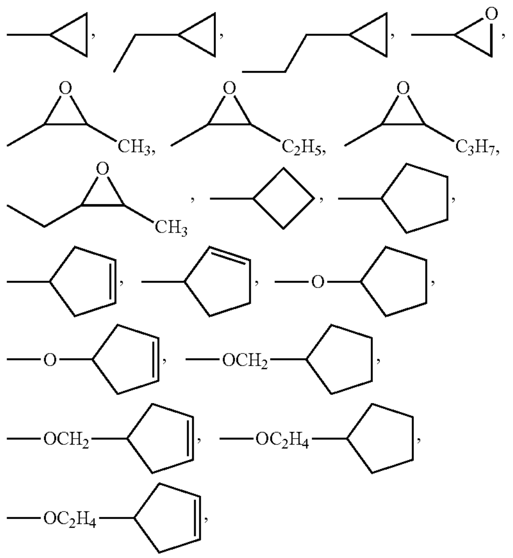

$—OCH_2OCH_3$, $—O(CH_2)_2OCH_3$, $—O(CH_2)_3OCH_3$, $—O(CH_2)_4OCH_3$, $—O(CH_2)_2F$, $—O(CH_2)_3F$, $—O(CH_2)_4F$.

If in the formulae shown above and below a group $R^{1-12}$, $R^{Q}$, R or L denotes an alkyl radical in which one $CH_2$ group has been replaced by —CH═CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If in the formulae shown above and below a group $R^{1-12}$, $R^{Q}$, R or L denotes an alkyl or alkenyl radical, which is at least monosubstituted by halogen, this radical, is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the co-position.

Halogen is preferably F or Cl, very preferably F.

The group $—CR^0═CR^{00}—$ is preferably —CH═CH—.

—CO—, —C(═O)— and —C(O)— denote a carbonyl group, i.e.

Preferred substituents L, are, for example, F, Cl, Br, I, —CN, $—NO_2$, —NCO, —NCS, —OCN, —SCN, $—C(═O)N(R^x)_2$, $—C(═O)Y^1$, $—C(═O)R^x$, $—N(R^x)_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

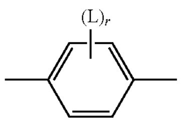

is preferably

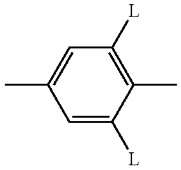, 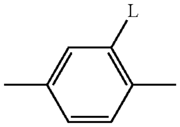,

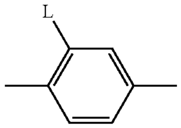, or 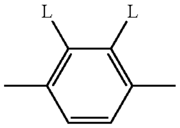, in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C═C double bond or —C≡C— triple bond, and groups which are suitable for polymerization with ring opening, such as, for example, oxetane or epoxide groups.

Preferred groups P are selected from the group consisting of $CH_2$═$CW^1$—CO—O—, $CH_2$═CW—CO—,

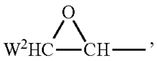, 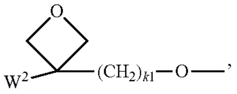,

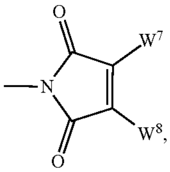, 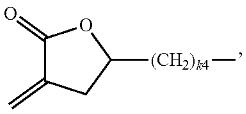, $CH_2$═$CW^2$—$(O)_{k3}$—, $CW^1$═CH—CO—$(O)_{k3}$—, $CW^1$═CH—CO—NH—, $CH_2$═$CW^1$—CO—NH—, $CH_3$—CH═CH—O—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, HO—$CW^2W^3$—, HS—$CW^2W^3$—, $HW^2$N—, HO—$CW^2W^3$—NH—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$═$CW^1$—CO—O—, $CH_2$═$CW^1$—CO—,

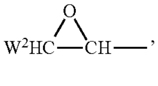, 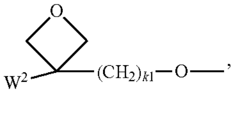,

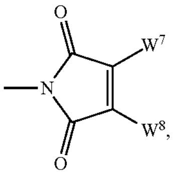 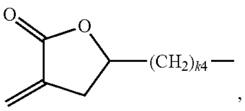, $CH_2$═$CW^2$—O—, $CH_2$═$CW^2$—, $CW^1$═CH—CO—$(O)_{k3}$—, $CW^1$═CH—CO—NH—, $CH_2$═$CW^1$—CO—NH—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2$═$CW^1$—CO—O—, in particular $CH_2$═CH—CO—O—, $CH_2$═$C(CH_3)$—CO—O— and $CH_2$═CF—CO—O—, furthermore $CH_2$═CH—O—, $(CH_2$═$CH)_2$CH—O—CO—, $(CH_2$═$CH)_2$CH—O—,

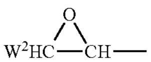 and 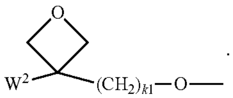.

Further preferred polymerizable groups P are selected from the group consisting of vinyloxy, acrylate, methacrylate, fluoroacrylate, chloroacrylate, oxetane and epoxide, most preferably from acrylate and methacrylate.

Very preferably, all polymerizable groups in the polymerizable compound have the same meaning.

If the spacer group Sp is different from a single bond, it is preferably of the formula Sp"—X", so that the respective radical P-Sp- conforms to the formula P-Sp"—X"—, wherein Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$—CO—O—)—O—CO—N($R^0$—))—N($R^0$—CO—N($R^{00}$—, —CH═CH— or —C≡C— in such a way that O and/or S atoms are not linked directly to one another, X" denotes —O—, —S—, —CO—, —CO—O—, —O—CO—, —O—CO—O—)—CO—N($R^0$)—, —N($R^0$—CO—, —N($R^0$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═C$R^0$—, —$CY^2$═$CY^3$—, —CH═CH—CO—O—, —O—CO—CH═CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —CO—O—, —O—OCO—, —CO—N$R^0$—, —N$R^0$—CO—, —N$R^0$—CO—N$R^{00}$— or a single bond.

Typical spacer groups Sp and -Sp"—X"— are, for example, —$(CH_2)_{p1}$—, —$(CH_2)_{p1}$—O—, —$(CH_2)_{p1}$—O—CO—, —$(CH_2)_{p1}$—O—CO—O—, —$(CH_2)_{p1}$—O—CO—O—, —$(CH_2CH_2O)_{p1}$—$CH_2CH_2$—, —$CH_2CH_2$—S—$CH_2CH_2$—, —$CH_2CH_2$—NH—$CH_2CH_2$— or —$(SiR^0R^{00}$—$O)_{p1}$—, in which p1 is an integer from 1 to 12, q1 is an integer from 1 to 3, and $R^0$ and $R^{00}$ have the meanings indicated above.

Particularly preferred groups Sp and -Sp"—X"— are —$(CH_2)_{p1}$—, —$(CH_2)_{p1}$—O—, —$(CH_2)_{p1}$—O—CO—, —$(CH_2)_{p1}$—O—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxymethylene, methyleneoxybutylene, ethylenethioethylene, ethylene-N-methylimino-ethylene, 1-methylalkylene, ethenylene, propenylene and butenylene.

In a preferred embodiment of the invention the compounds of formula I and its subformulae contain a spacer group Sp that is substituted by one or more polymerizable groups P, so that the group Sp-P corresponds to $Sp(P)_s$, with s being ≥2 (branched polymerizable groups).

Preferred compounds of formula I according to this preferred embodiment are those wherein s is 2, i.e. compounds that contain a group $Sp(P)_2$. Very preferred compounds of formula I according to this preferred embodiment contain a group selected from the following formulae:

—X-alkyl-CHPP S1

—X-alkyl-CH($(CH_2)_{aa}$P)($(CH_2)_{bb}$P) S2

—X—N($(CH_2)_{aa}$P)($(CH_2)_{bb}$P) S3

—X-alkyl-CHP—$CH_2$—$CH_2$P S4

—X-alkyl-C($CH_2$P)($CH_2$P)—$C_{aa}H_{2aa+1}$ S5

—X-alkyl-CHP—$CH_2$P S6

—X-alkyl-CPP—$C_{aa}H_{2aa+1}$ S7

—X-alkyl-CHPCHP—$C_{aa}H_{2aa+1}$ S8 in which P is as defined in formula I, alkyl denotes a single bond or straight-chain or branched alkylene having 1 to 12 C atoms which is unsubstituted or mono- or polysubstituted by F, Cl or CN and in which one or more non-adjacent $CH_2$ groups may each, independently of one another, be replaced by —C($R^0$)═C($R^0$)—, —C≡C—, —N($R^0$)—, —O—, —S—, —CO—, —CO—O—, —O—CO—, —O—CO—O— in such a way that O and/or S atoms are not linked directly to one another, where $R^0$ has the meaning indicated above, aa and bb each, independently of one another, denote 0, 1, 2, 3, 4, 5 or 6, X has one of the meanings indicated for X", and is preferably a, CO, $SO_2$, O—CO—, CO—O or a single bond.

Preferred spacer groups $Sp(P)_2$ are selected from formulae S1, S2 and S3.

Very preferred spacer groups $Sp(P)_2$ are selected from the following subformulae:

—CHPP S1a

—O—CHPP S1b

—$CH_2$—CHPP S1c

—$OCH_2$—CHPP S1d

—CH($CH_2$—P)($CH_2$—P) S2a

—OCH($CH_2$—P)($CH_2$—P) S2b

—$CH_2$—CH($CH_2$—P)($CH_2$—P) S2c

—$OCH_2$—CH($CH_2$—P)($CH_2$—P) S2d

—CO—NH($(CH_2)_2$P)($(CH_2)_2$P) S3a

P is preferably selected from the group consisting of vinyloxy, acrylate, methacrylate, fluoroacrylate, chloroacrylate, oxetane and epoxide, very preferably from acrylate and methacrylate, most preferably from methacrylate.

Further preferably all polymerizable groups P that are present in the same compound have the same meaning, and very preferably denote acrylate or methacrylate, most preferably methacrylate.

Sp preferably denotes a single bond or —$(CH_2)_{p1}$—, —$(CH_2)_{p2}$—, —CH═CH—$(CH_2)_{p3}$—, —O—$(CH_2)_{p1}$—, —O—CO—$(CH_2)_{p1}$, or —CO—O—$(CH_2)_{p1}$, wherein p1 is 2, 3, 4, 5 or 6, preferably 2 or 3, p2 and p3 are independently of each other 0, 1, 2 or 3 and, if Sp is —O—$(CH_2)_{p1}$—, —O—CO—$(CH_2)_{p1}$ or —CO—O—$(CH_2)_{p1}$ the O-atom or CO— group, respectively, is linked to the benzene ring.

Further, preferably at least one group Sp is a single bond.

Further preferably at least one group Sp is different from a single bond, and is preferably selected from —$(CH_2)_{p1}$—, —$(CH_2)_{p2}$—CH═CH—$(CH_2)_{p3}$—, —O—$(CH_2)_{p1}$—, —O—CO—$(CH_2)_{p1}$, or —CO—O—$(CH_2)_{p1}$, wherein p1 is 2, 3, 4, 5 or 6, preferably 2 or 3, p2 and p3 are independently of each other 0, 1, 2 or 3 and, if Sp is $-O-(CH_2)_{p1}-$, $-O-CO-(CH_2)_{p1}$ or $-CO-O-(CH_2)_{p1}$ the O-atom or CO-group, respectively, is linked to the benzene ring.

Very preferably Sp is different from a single bond, and is selected from $-(CH_2)_2-$, $-(CH_2)_3-$, $-(CH_2)_4-$, $-O-(CH_2)_2-$, $-O-(CH_2)_3-$, $-O-CO-(CH_2)_2$ and $-CO-O-(CH)_2-$, wherein the O atom or the CO group is attached to the benzene ring.

Preferred compounds of formula IA are selected from the group consisting of the formulae IA-1 to IA-10:

IA-1

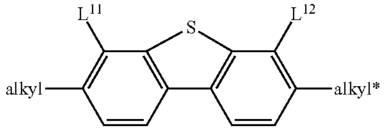

IA-2

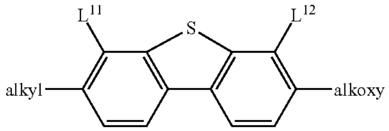

IA-3

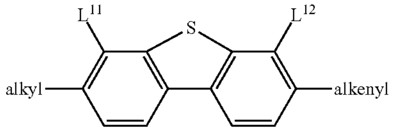

IA-4

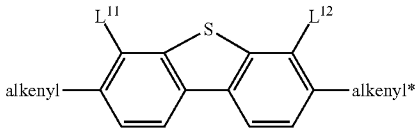

IA-5

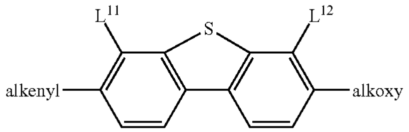

IA-6

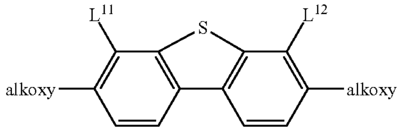

IA-7

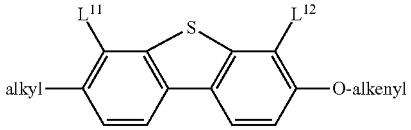

IA-8

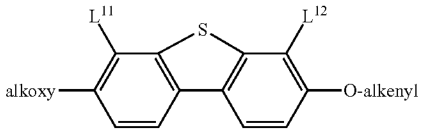

IA-9

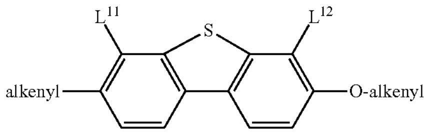

-continued

IA-10

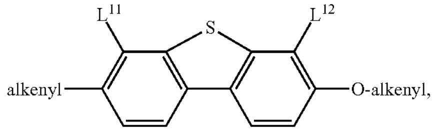

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl, preferably both F.

Very preferred are compounds of formula IA-6.

Preferably, the LC medium contains 1, 2 or 3 compounds of formula IA or its subformulae.

Preferably the total proportion of the compounds of formula IA and its subformulae in the LC medium is from >5 to 25%, very preferably from 7 to 20%, most preferably from 8 to 15% by weight.

Preferred compounds of formula IB are selected from the group consisting of the following subformulae:

IB-1

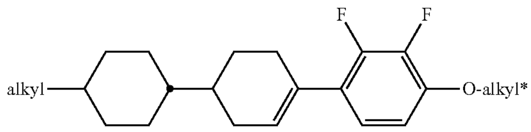

IB-2

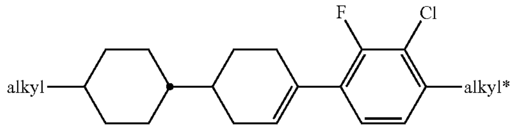

IB-3

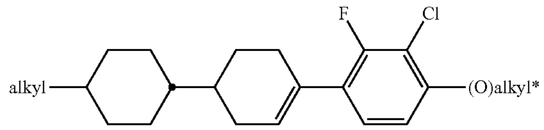

IB-4

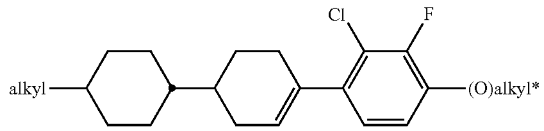

in which alkyl and alkyl* independently of each other denote a straight-chain alkyl radical having 1-6 C atoms, preferably ethyl, n-propyl or n-butyl, and (O) denotes an oxygen atom or a single bond, preferably an oxygen atom.

Very preferred are compounds of formula IB-1 and IB-2, most preferred are compounds of formula IB-1, especially those wherein alkyl denotes ethyl, n-propyl or n-butyl, preferably n-propyl, (O) denotes an oxygen atom, and alkyl* denotes ethyl, n-propyl or n-butyl, preferably ethyl.

Preferably, the LC medium contains 1, 2 or 3, very preferably 1, compounds of formula IB or its subformulae.

Preferably, the total proportion of the compounds of formula IB and its subformulae in the LC medium is from 0.5 to 10%, very preferably from 1 to 10% by weight. In another preferred embodiment, the total proportion of the compounds of formula IB and its subformulae in the LC medium is from 2 to 8%, very preferably from 2.5 to 7%.

Preferred compounds of formula IC are selected from the group consisting of the following subformulae:

IC-1

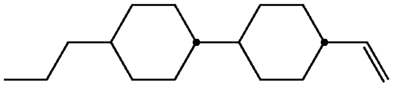

IC-2

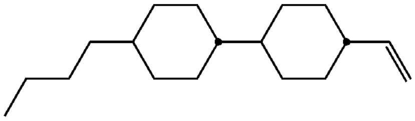

IC-3

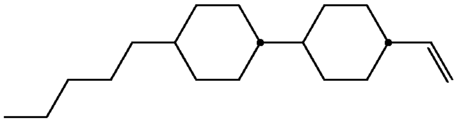

IC-4

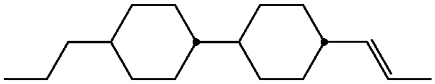

IC-5

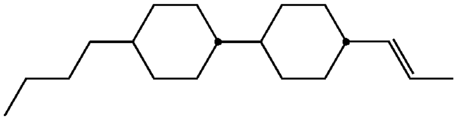

IC-6

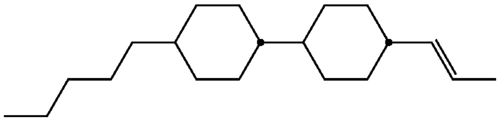

IC-7

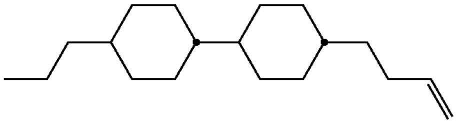

IC-8

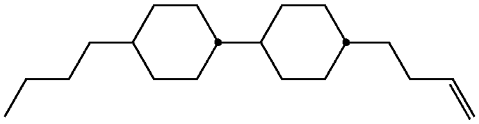

IC-9

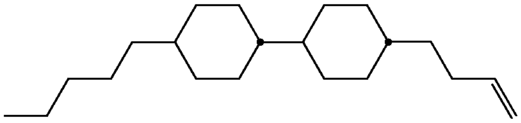

IC-10

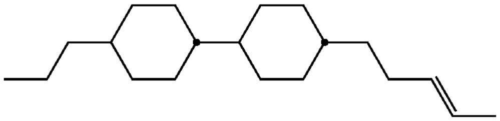

-continued

IC-11

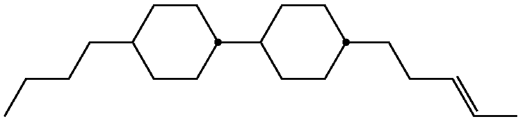

IC-12

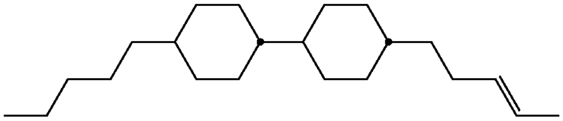

Very preferred are compounds of formula IC-1, IC-2, IC-3, IC-4, IC-5 and IC-6, most preferred are compounds of formula IC-1 and IC-4.

Preferably, the LC medium contains 1, 2 or 3 compounds of formula IC or its subformulae.

Preferably, the total proportion of the compounds of formula IC and its subformulae in the LC medium is from 10 to 65%, very preferably from 15 to 55%, most preferably from 20 to 45% by weight.

Further preferred embodiments of the LC medium according to the present invention are listed below, including any combination thereof:

The LC medium contains one or more compounds of formula II

II

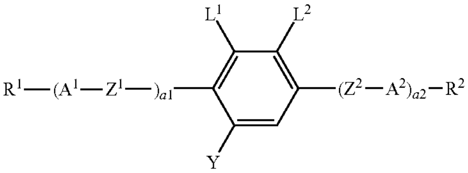

wherein the individual radicals, independently of each other and on each occurrence identically or differently, have the following meanings $R^1$ and $R^2$ straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, $CR^0$=$CR^{00}$—, —C≡C—,

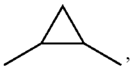, , 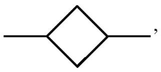, 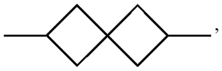, 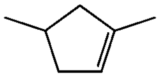 or 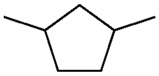

in such a manner that O- and/or S-atoms are not directly connected with each other, and wherein one or more H atoms are each optionally replaced by F or Cl, preferably alkyl or alkoxy having 1 to 6 C atoms, $R^0$, $R^{00}$H or alkyl having 1 to 12 C atoms, $A^1$ and $A^2$ a group selected from the following formulae

A1

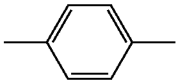

A2

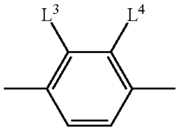

A3

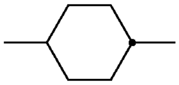

A4

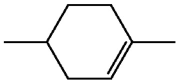

A5

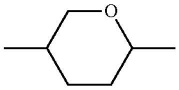

A6

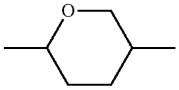

A7

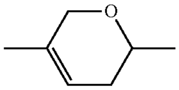

A8

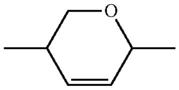

A9

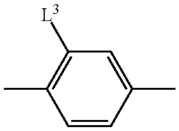

A10

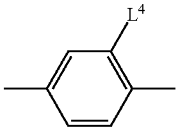

A11

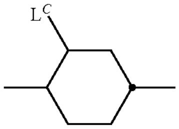

A12

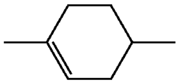

A13

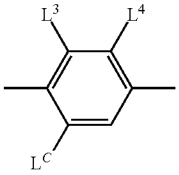

-continued

A14

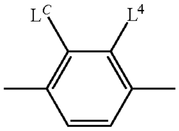

A15

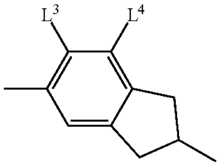

A16

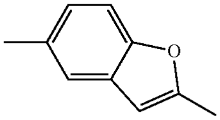

preferably from formulae A1, A2, A3, A4, A5, A6, A9 and A10, very preferably from formulae A1, A2, A3, A4, A5, A9 and A10, $Z^1$ and $Z^2$ —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^1$, $L^2$, $L^3$ and $L^4$ F, Cl, $OCF_3$, $CF_3$, $CH_3$, $CH_2F$ or $CHF_2$, preferably F or Cl, very preferably F, Y H, F, Cl, $CF_3$, $CHF_2$ or $CH_3$, preferably H or $CH_3$, very preferably H, $L^C$ $CH_3$ or $OCH_3$, preferably $CH_3$, a1 1 or 2, a2 0 or 1.

Preferably, the LC medium contains one or more compounds of formula II selected from the group consisting of compounds of the formulae IIA, IIB, IIC and IID Preferably, the LC medium contains one or more compounds of formula II selected from the group consisting of compounds of the formulae IIA, IIB, IIC and IID

IIA

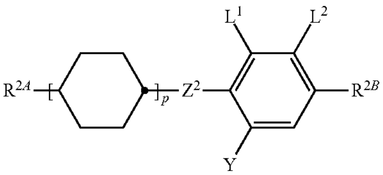

IIB

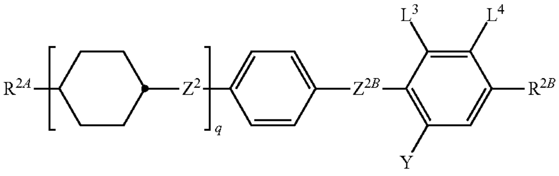

IIC

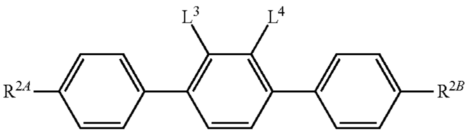

-continued

IID

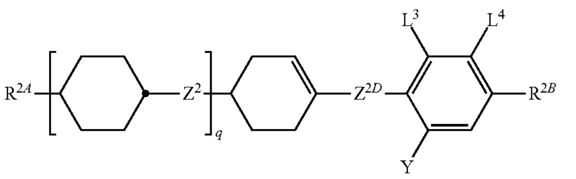

in which $R^{2A}$ and $R^{2B}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

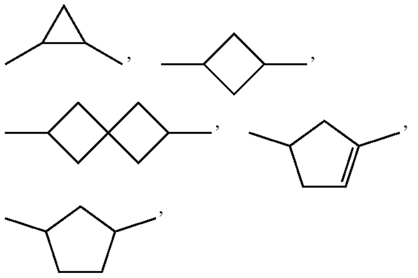

—C≡C—, —$CF_2$O—, —O$CF_2$—, —OC—O— or —O—CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, preferably H or $CH_3$, particularly preferably H, $Z^2$, $Z^2$B and $Z^{2D}$ each, independently of one another, denote a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF—, —CH═CH$CH_2$O—, p denotes 0, 1 or 2, and q on each occurrence, identically or differently, denotes 0 or 1.

Preferred compounds of the formulae IIA, IIB, IIC and IID are those wherein $R^{2B}$ denotes an alkyl or alkoxy radical having up to 15 C atoms, and very preferably denotes $(O)C_vH_{2v+1}$ wherein (O) is an oxygen atom or a single bond and v is 1, 2, 3, 4, 5 or 6.

Further preferred compounds of the formulae IIA, IIB, IIC and IID are those wherein $R^{2A}$ or $R^{2B}$ denotes or contains cycloalkyl or cycloalkoxy radical, preferably selected from the group consisting of

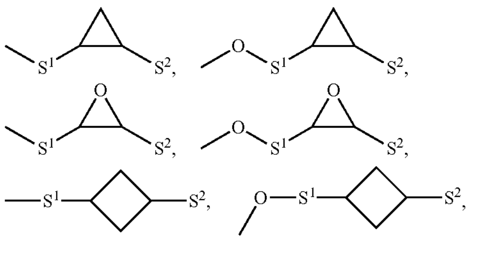

-continued

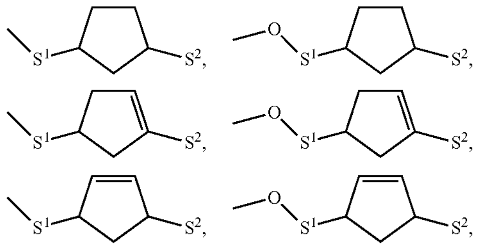

wherein $S^1$ is $C_{1-5}$-alkylene or $C_{2-5}$-alkenylene and $S^2$ is H, $C_{1-7}$-alkyl or $C_{2-7}$-alkenyl, and very preferably selected from the group consisting of

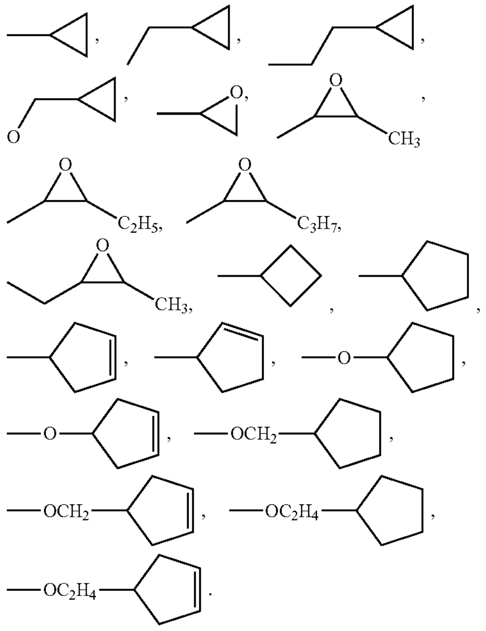

Further preferred compounds of the formulae IIA, IIB, IIC and IID are indicated below:

Further preferred compounds of the formulae IIA, IIB, IIC and IID are indicated below:

IIA-1

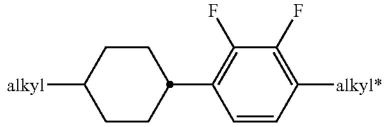

IIA-2

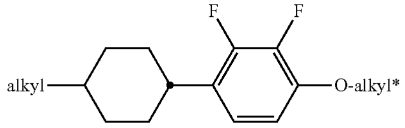

IIA-3

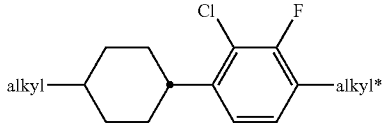

-continued
IIA-4
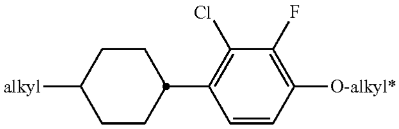
IIA-5
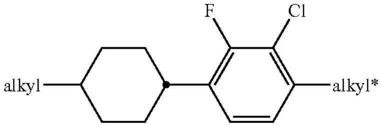
IIA-6
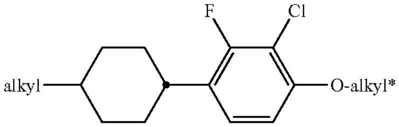
IIA-7
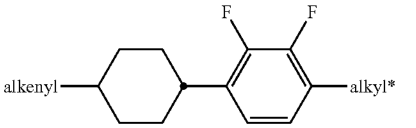
IIA-8
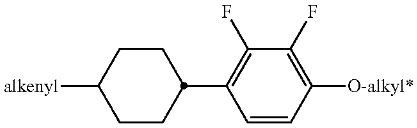
IIA-9
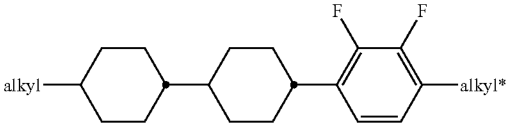
IIA-10
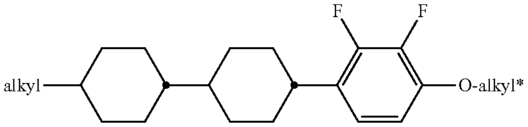
IIA-11
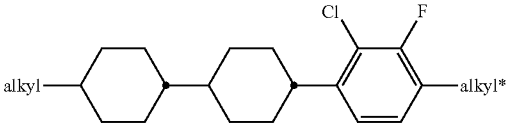
IIA-12
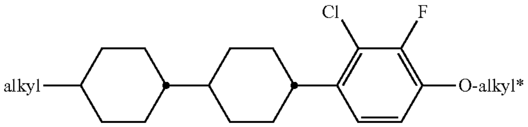
IIA-13
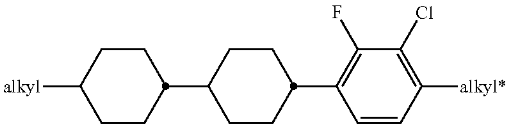
-continued
IIA-14
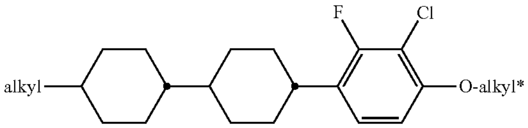
IIA-15
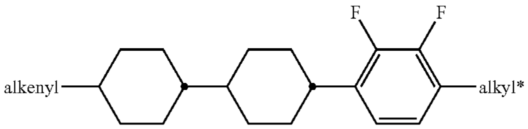
IIA-16
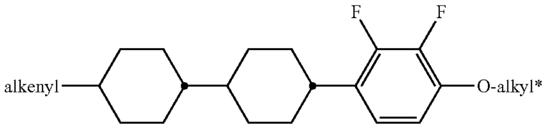
IIA-17
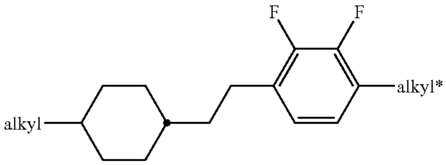
IIA-18
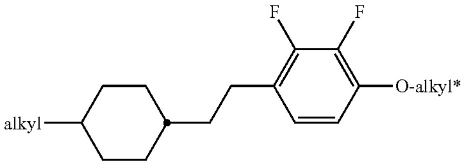
IIA-19
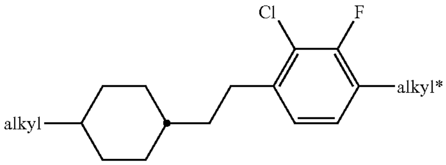
IIA-20
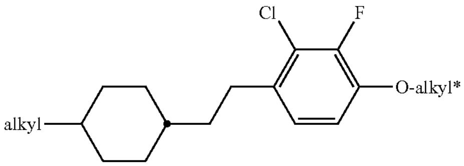
IIA-21
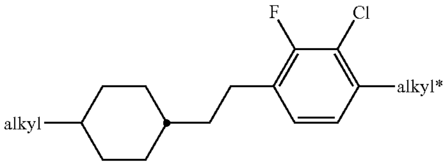
IIA-22
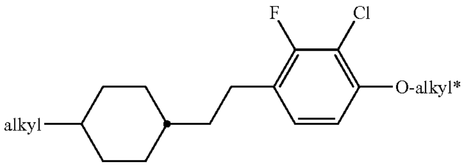

-continued
IIA-23
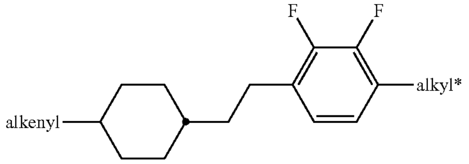
IIA-24
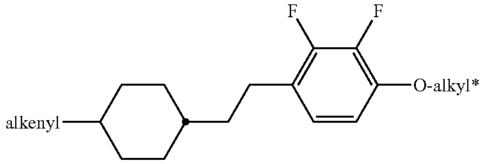
IIA-25
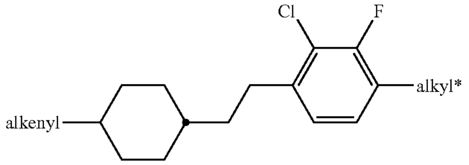
IIA-26
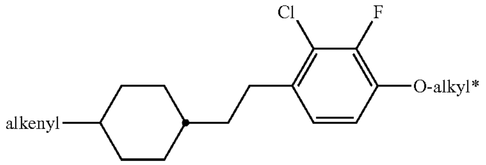
IIA-27
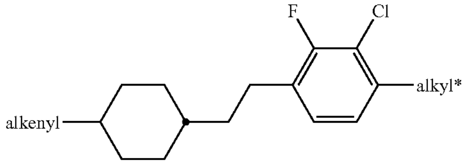
IIA-28
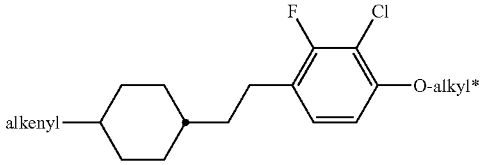
IIA-29
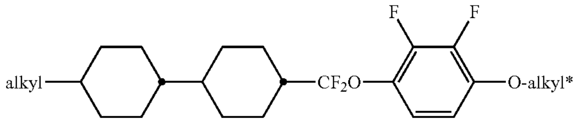
IIA-30
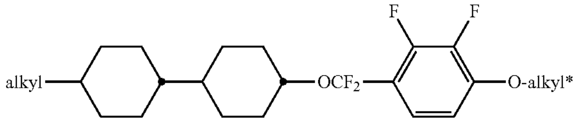
IIA-31
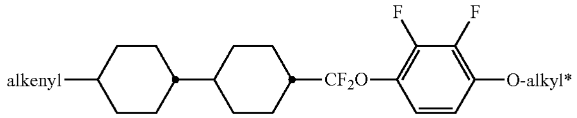
-continued
IIA-32
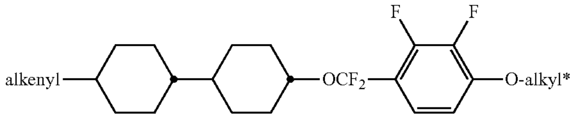
IIA-33
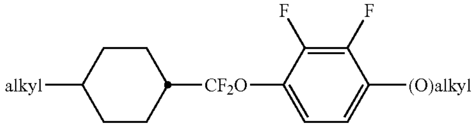
IIA-34
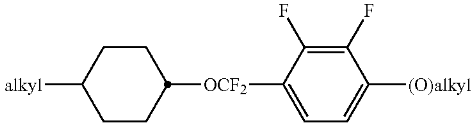
IIA-35
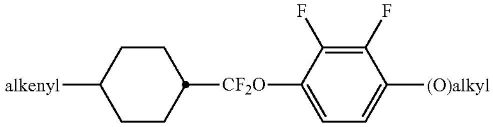
IIA-36
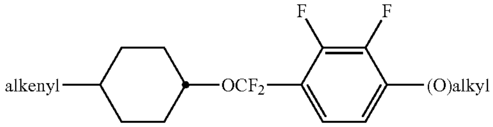
IIA-37
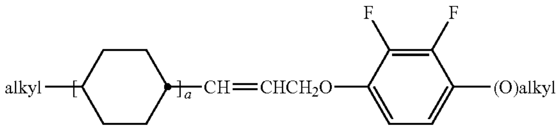
IIA-38
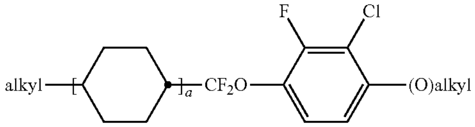
IIA-39
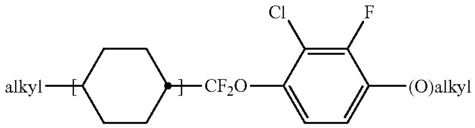
IIA-40
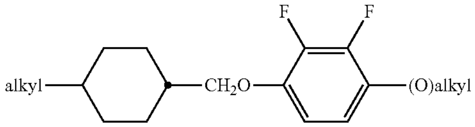
IIA-41
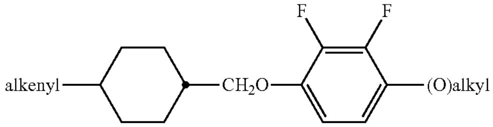

-continued
IIA-42
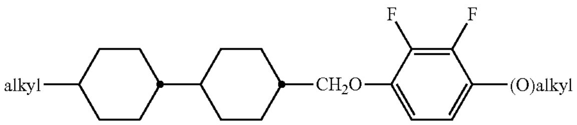
IIA-43
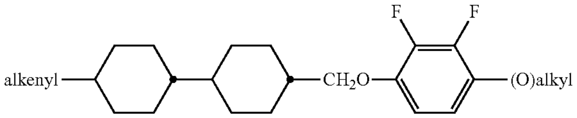
IIA-44
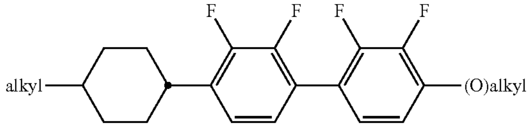
IIA-45
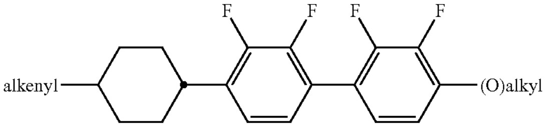
IIA-46
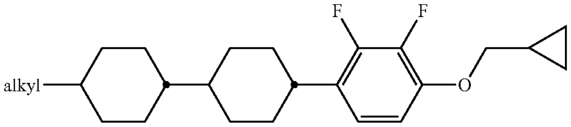
IIB-1
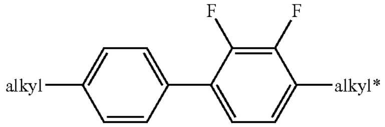
IIB-2
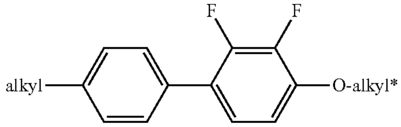
IIB-3
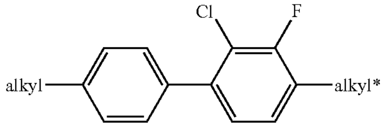
IIB-4
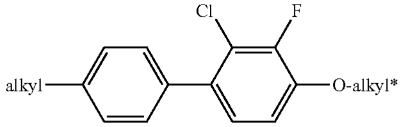
IIB-5
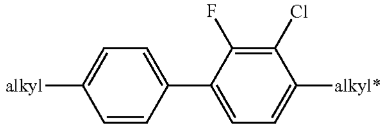
IIB-6
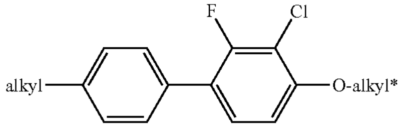
-continued
IIB-7
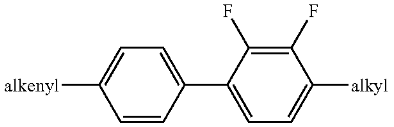
IIB-8
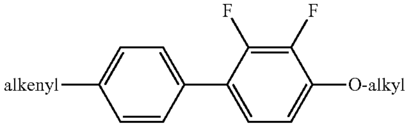
IIB-9
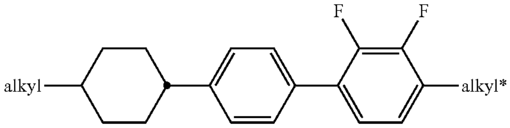
IIB-10
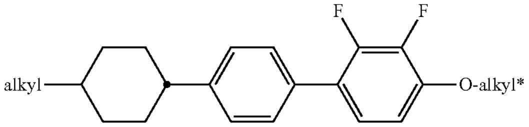
IIB-11
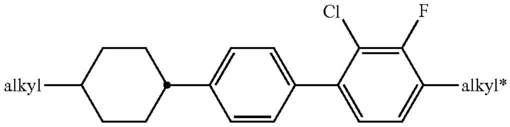
IIB-12
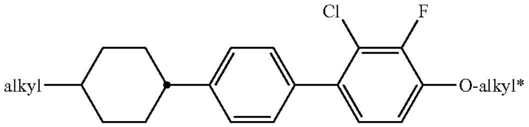
IIB-13
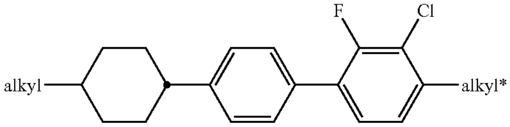
IIB-14
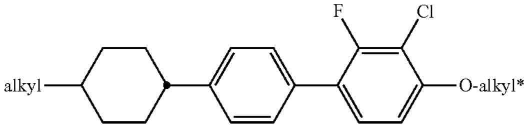
IIB-15
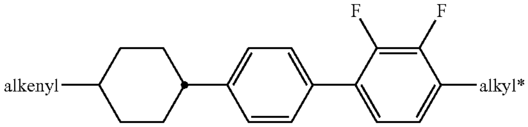
IIB-16
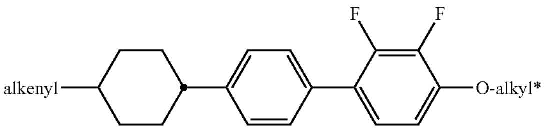

-continued

IIB-17

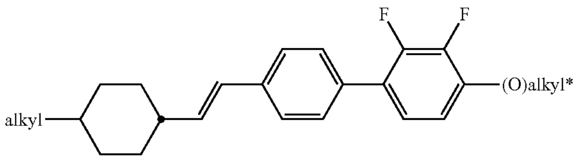

IIB-18

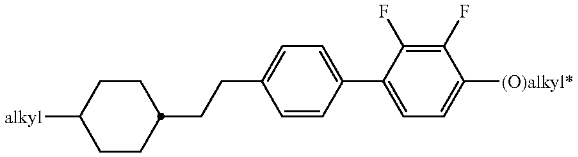

IIB-19

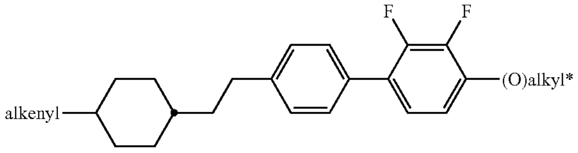

IIB-20

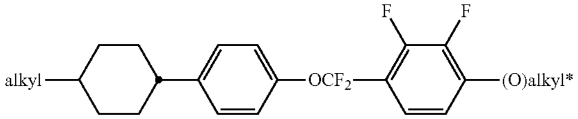

IIB-21

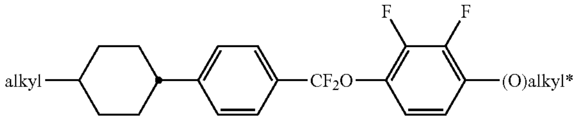

IIB-22

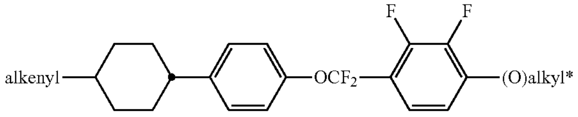

IIB-23

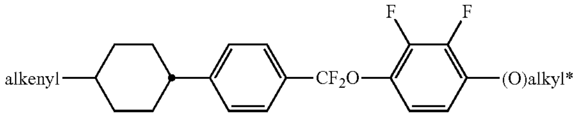

IIB-24

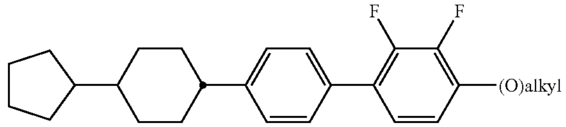

IIC-1

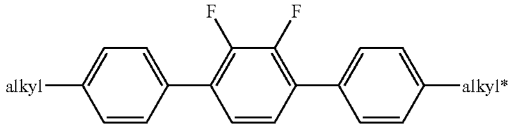

IID-1

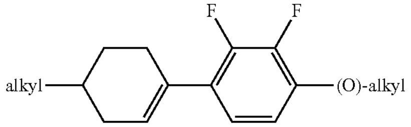

-continued

IID-2

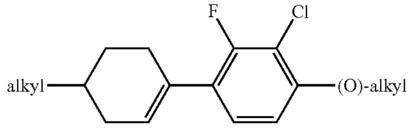

IID-3

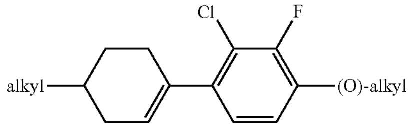

IID-4

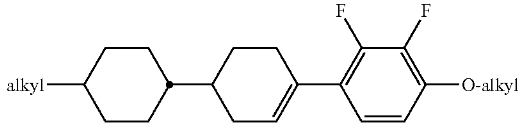

IID-5

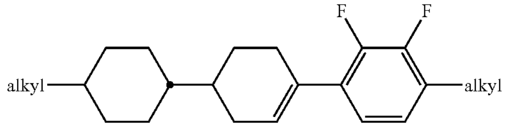

IID-6

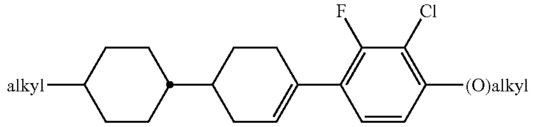

IID-7

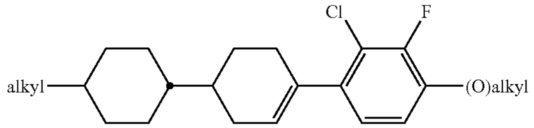

in which the parameter a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH-$, $CH_2{=}CHCH_2CH_2-$, $CH_3-CH{=}CH-$, $CH_3-CH_2-CH{=}CH-$, $CH_3-(CH_2)_2-CH{=}CH-$, $CH_3-(CH_2)_3-CH{=}CH-$ or $CH_3-CH{=}CH-(CH_2)_2-$.

Particularly preferred LC media according to the invention comprise one or more compounds of the formulae IIA-2, IIA-8, IIA-10, IIA-16, 11-18, IIA-40, IIA-41, IIA-42, IIA-43, IIB-2, IIB-10, IIB-16, IIC-1, and IID-4.

The proportion of compounds of the formulae IIA and/or IIB in the mixture as a whole is preferably at least 20% by weight.

In another preferred embodiment, the LC medium comprises one or more compounds of formula III

III

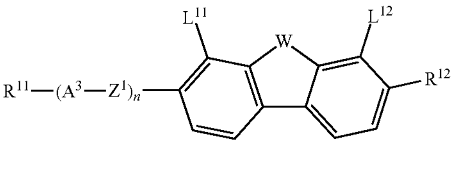

in which $R^{11}$ and $R^{12}$ each, independently of one another, denote H, an alkyl or alkoxy radical having 1 to 15 C atoms, where one or more $CH_2$ groups in these radicals may each be replaced, independently of one another, by

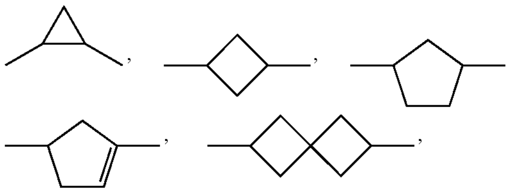

—C≡C—, —$CF_2O$—, —$OCF_2$—, —CH=CH—, by —O—, —CO—O— or —O—CO— in such a way that O atoms are not linked directly to one another, and in which, in addition, one or more H atoms may be replaced by halogen, $A^3$ on each occurrence, independently of one another, denotes a) 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, preferably 0 or 1, $Z^1$ on each occurrence independently of one another denotes —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH=CH—$CH_2O$—, —$C_2F_4$—, —$CH_2CF_2$—, —$CF_2CH_2$—CF=CF—, —CH=CF—, —CF=CH—, —CH=CH—, —C□C— or a single bond, and $L^{11}$ and $L^{12}$ each, independently of one another, denote F, Cl, $CF_3$ or $CHF_2$, preferably H or F, most preferably F, and W denotes O or S, and if n is 0 then W is not S.

In a preferred embodiment of the present invention, the LC medium comprises one or more compounds of the formula III-1

III-1

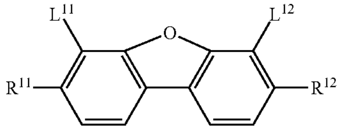

in which the occurring groups have the same meanings as given under formula III above and preferably $R^{11}$ and $R^{12}$ each, independently of one another, an alkyl, alkenyl or alkoxy radical having up to 15 C atoms, more preferably one or both of them denote an alkoxy radical and $L^{11}$ and $L^{12}$ each preferably denote F.

In another preferred embodiment the LC medium comprises one or more compounds of the formula III-1 selected from the group of compounds of formulae III-1-1 to III-1-11, preferably of formula III-1-6,

III-1-1

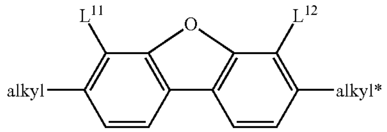

III-1-2

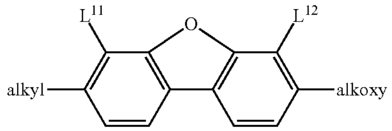

III-1-3

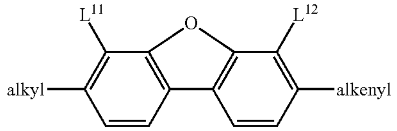

III-1-4

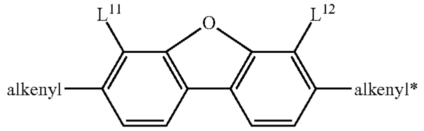

III-1-5

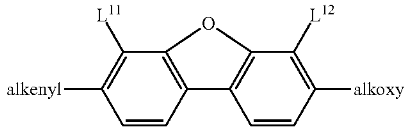

III-1-6

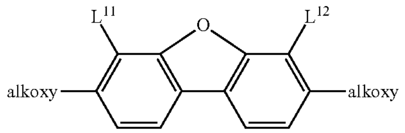

III-1-7

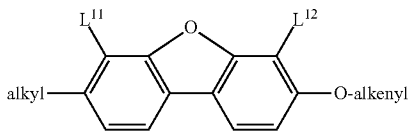

III-1-8

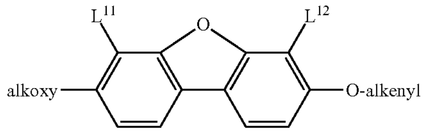

III-1-9

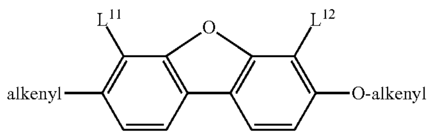

III-1-10

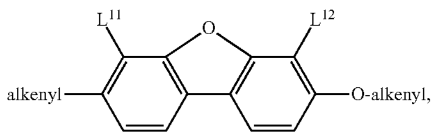

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

In another preferred embodiment of the present invention, the LC medium comprises one or more compounds of the formula III2-1 and/or III2-2

III2-1

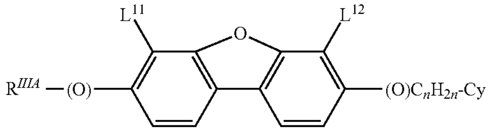

III2-2

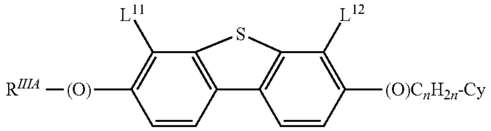

in which $L^{11}$ and $L^{12}$ have the same meanings as given under formula III, (O) denotes O or a single bond, $R^{IIIa}$ denotes alkyl or alkenyl having up to 7 C atoms or a group Cy-$C_mH_{2m+1}$—, m and n are, identically or differently, 0, 1, 2, 3, 4, 5 or 6, preferably 1, 2 or 3, very preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula III2-1 and/or III2-2 are contained in the LC medium either alternatively or additionally to the compounds of formula III, preferably additionally.

Very Preferred Compounds of the Formulae III2-1 and III2-2 are the Following:

III2-1-1

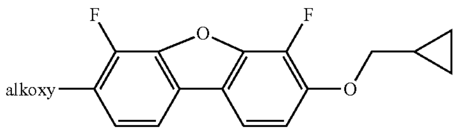

III2-1-2

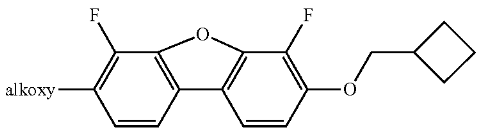

III2-1-3

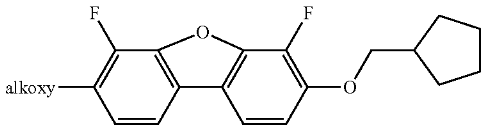

III2-2-1

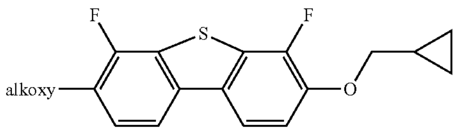

-continued

III2-2-2

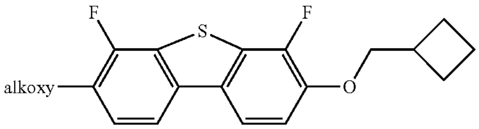

III2-2-3

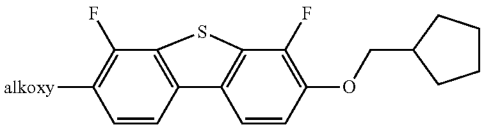

in which alkoxy denotes a straight-chain alkoxy radical having 1-6 C atoms.

In another preferred embodiment of the present invention, the LC medium comprises one or more compounds of the formulae III-3 to III-5, preferably of formula III-4,

III-3

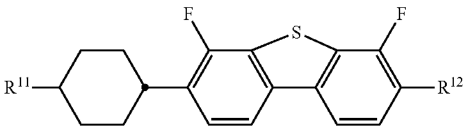

III-4

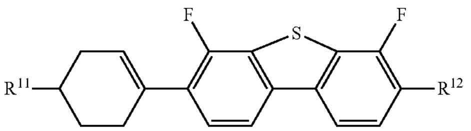

III-5

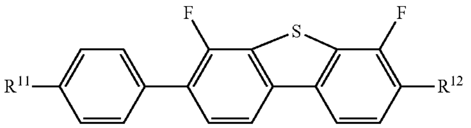

in which the parameters have the meanings given above, $R^{11}$ preferably denotes straight-chain alkyl and $R^{12}$ preferably denotes alkoxy, each having 1 to 7 C atoms.

In another preferred embodiment the LC medium comprises one or more compounds of the formula I selected from the group of compounds of formulae III-6 to III-8, preferably of formula III-7,

III-6

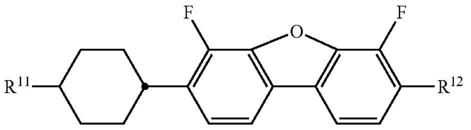

III-7

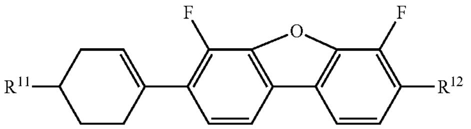

-continued

III-8

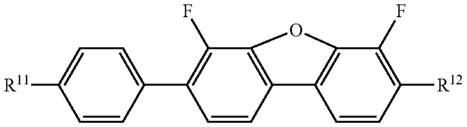

in which the parameters have the meanings given above, $R^{11}$ preferably denotes straight-chain alkyl and $R^{12}$ preferably denotes alkoxy each having 1 to 7 C atoms.

In another preferred embodiment of the present invention, the LC medium comprises one or more compounds of the formula III-9,

III-9

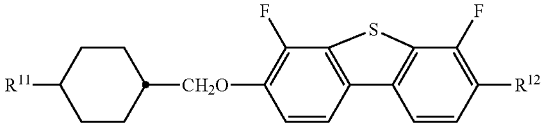

in which the parameters have the meanings given above, $R^{11}$ preferably denotes straight-chain alkyl and $R^{12}$ preferably denotes alkoxy, each having 1 to 7 C atoms.

Preferred compounds of formula III-9 are selected from the group consisting of the formulae III-9-1 to III-9-10:

III-9-1

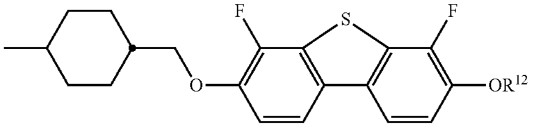

III-9-2

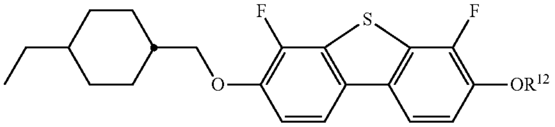

III-9-3

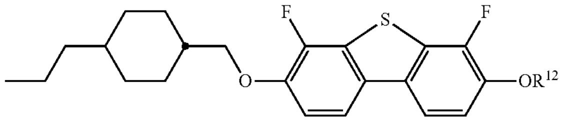

III-9-4

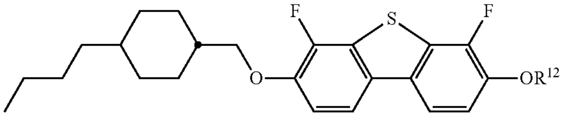

III-9-5

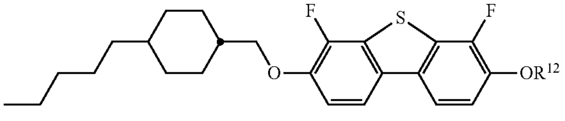

-continued

III-9-6

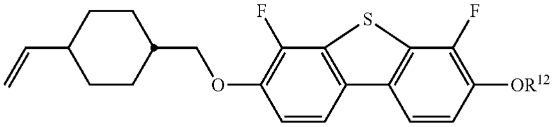

III-9-7

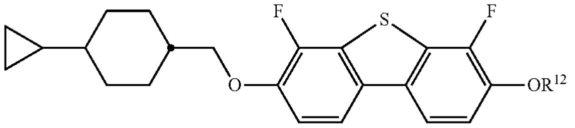

III-9-8

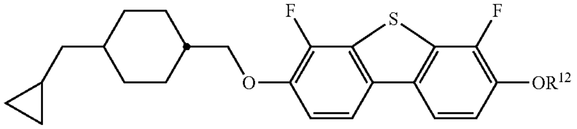

III-9-9

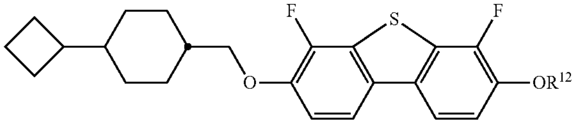

III-9-10

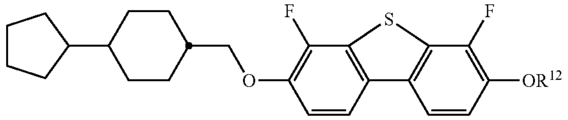

in which $R^{12}$ denotes alkyl having 1 to 7 C-atoms, preferably ethyl, n-propyl or n-butyl, or alternatively cyclopropylmethyl, cyclobutylmethyl or cyclopentylmethyl.

Preferred compounds of formula III-9 are selected from the group consisting of formulae III-9-1, III-9-2, III-9-3, III-9-4 and III-9-5, very preferably from formulae III-9-2 and III-9-3, most preferably from formula III-9-2, and wherein in all of the aforementioned formulae $R^{12}$ is preferably ethyl, n-propyl or n-butyl, very preferably n-butyl.

In a preferred embodiment, the medium comprises one or more compounds of the formula IV,

IV

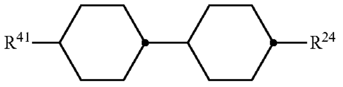

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical, wherein these compounds are different from formula IC.

The compounds of the formula IV are preferably selected from the group of the compounds of the formulae IV-1 to IV-4,

IV-1

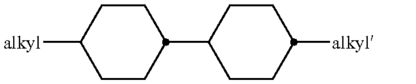

IV-2

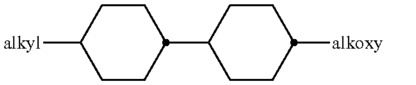

IV-3

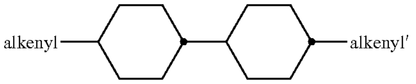

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

Preferably, the LC medium comprises one or more compounds selected from the compounds of the formulae IV-1-1 to IV-1-4

IV-1-1

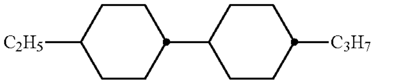

IV-1-2

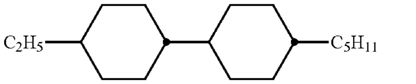

IV-1-3

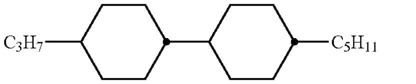

IV-1-4

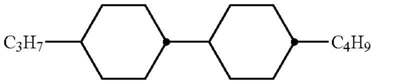

IV-1-5

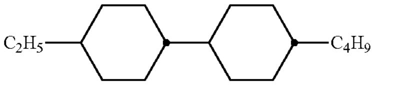

IV-1-6

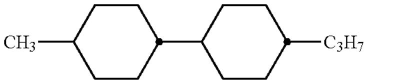

Very preferably, the LC medium according to the invention comprises one or more compounds of the formulae IV-2-1 and/or IV-2-2

IV-1-1

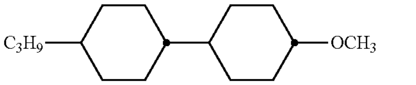

-continued

IV-1-2

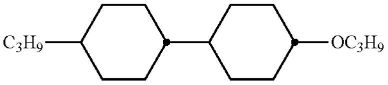

Very preferably, the LC medium according to the invention comprises a compound of formula IV-3, in particular selected from the compounds of the formulae IV-3-1 and IV-3-2

IV-3-1

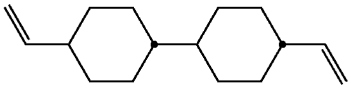

IV-3-2

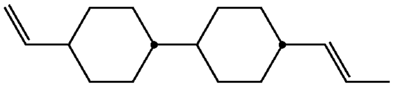

The LC medium preferably additionally comprises one or more compounds of the formula IVa, IVa

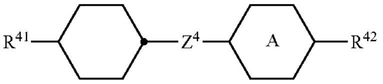

in which $R^{41}$ and $R^{42}$ each, independently of one another, denote a straight-chain alkyl, alkoxy, alkenyl, alkoxyalkyl or alkoxy radical having up to 12 C atoms, and

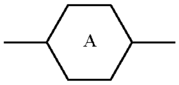

denotes

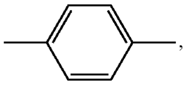, 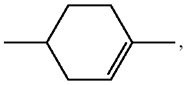,

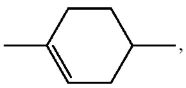, 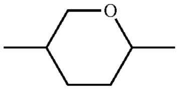 or

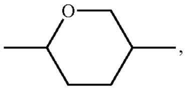, $Z^4$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$— or —CF═CF—.

Preferred compounds of the formula IVa are indicated below:

IVa-1

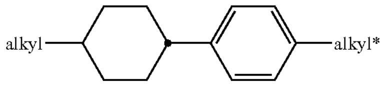

IVa-2

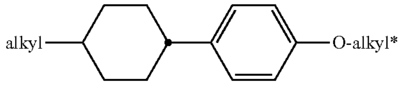

IVa-3

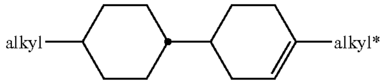

IVa-4

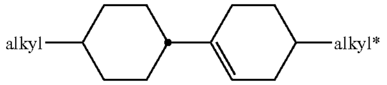

in which alkyl and alkyl* each, independently of one another, denote a straight-chain alkyl radical having 1 to 6 C atoms.

The LC medium according to the invention preferably comprises at least one compound of the formula IVa-1 and/or formula IVa-2.

The proportion of compounds of the formula IVa in the mixture as a whole is preferably at least 5% by weight Preferably, the LC medium comprises one or more compounds of formula IVb-1 to IVb-3

IVb-1

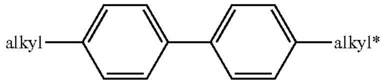

IVb-2

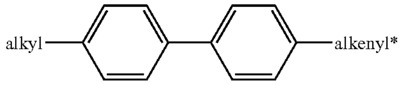

IVb-3

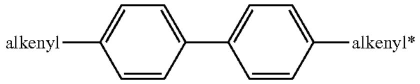

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

The proportion of the biphenyls of the formulae IV-1 to IV-3 in the mixture as a whole is preferably at least 3% by weight, in particular 5% by weight.

Of the compounds of the formulae IVb-1 to IVb-3, the compounds of the formula IVb-2 are particularly preferred. Particularly Preferred Biphenyls are IVb-1-1

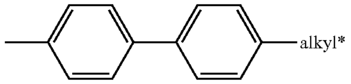

IVb-2-1

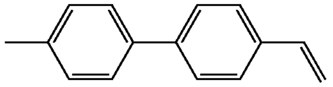

-continued

IVb-2-2

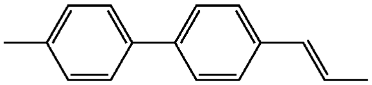

IVb-2-3

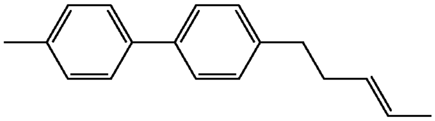

in which alkyl* denotes an alkyl radical having 1 to 6 C atoms and preferably denotes n-propyl.

The LC medium according to the invention particularly preferably comprises one or more compounds of the formulae IVb-1-1 and/or IVb-2-3.

In a preferred embodiment, the LC medium comprises one or more compounds of formula V

V

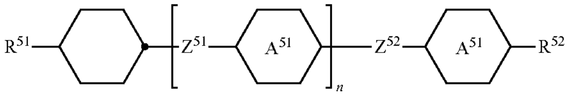

in which $R^{51}$ and $R^{52}$ independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

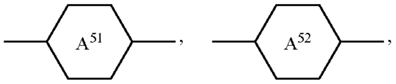

identically or differently, denote

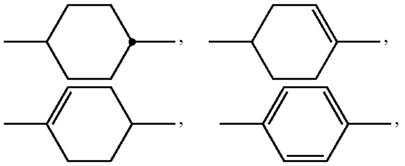

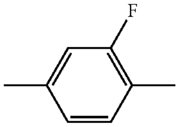

or

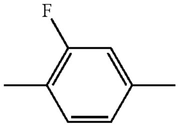

in which

preferably denotes

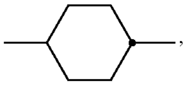, or 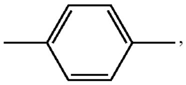, $Z^{51}$, $Z^{52}$ each, independently of one another, denote $—CH_2—CH_2—$, $—CH_2—O—$, $—CH{=}CH—$, $—C{\equiv}C—$, $—COO—$ or a single bond, preferably $—CH_2—CH_2—$, $—CH_2—O—$ or a single bond and particularly preferably a single bond, and n is 1 or 2.

The compounds of formula V are preferably selected from the compounds of the formulae V-1 to V-16:

V-1

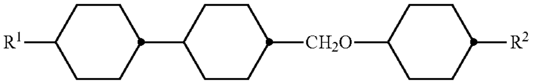

V-2

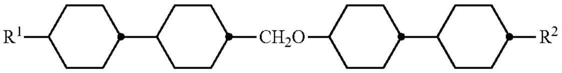

V-3

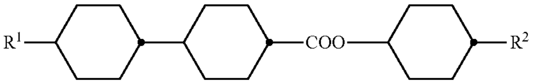

V-4

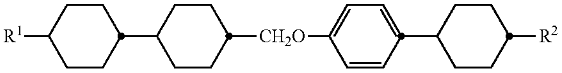

V-5

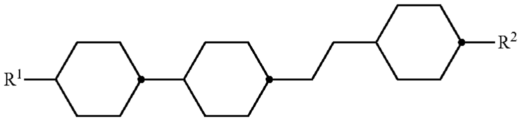

V-6

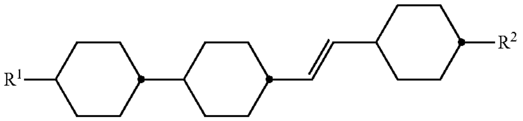

V-7

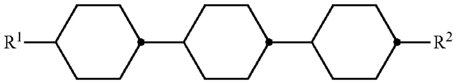

V-8

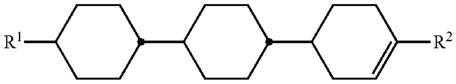

V-9

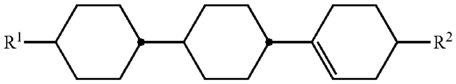

V-10

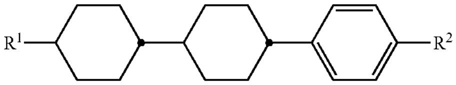

-continued

V-11

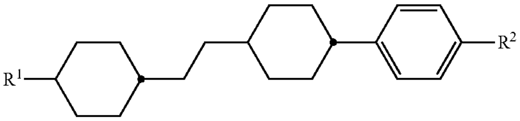

V-12

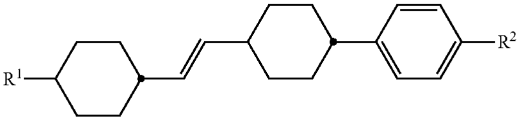

V-13

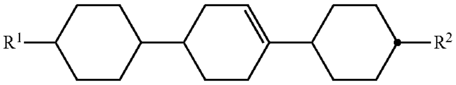

V-14

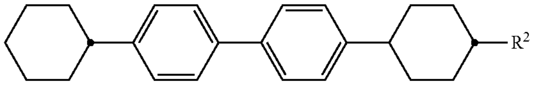

V-15

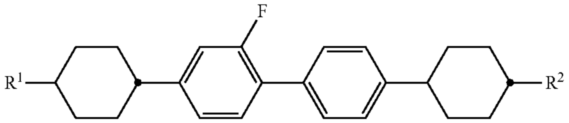

V-16

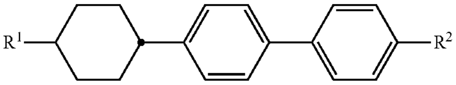

in which $R^1$ and $R^2$ have the meanings indicated for $R^{51}$ above. $R^1$ and $R^2$ preferably each, independently of one another, denote straight-chain alkyl with 1 to 6 C atoms or straight-chain alkenyl with 2 to 7 C atoms.

Preferred LC media comprise one or more compounds of the formulae V-1, V-3, V-4, V-6, V-7, V-10, V-11, V-12, V-14, V-15, and/or V-16

LC media according to the invention very particularly preferably comprise the compounds of the formula V-10, V-12, V-16 and/or IV-1, in particular in amounts of 5 to 30%.

Preferred compounds of the formulae V-10 are indicated below:

V-10a

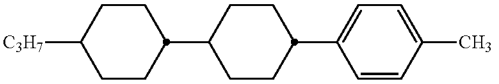

V-10b

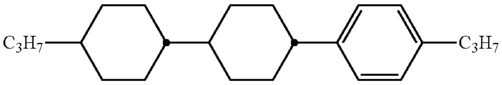

V-10c

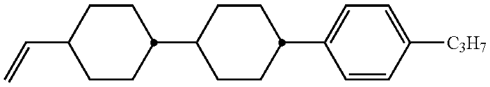

The LC medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Very particularly preferred LC media comprise compounds V-10a and CC-2-3

V-10a

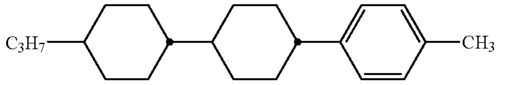

IV-1-1

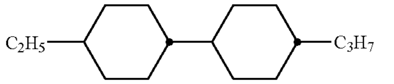

The compounds V-10a and IV-1-1 are preferably present in the mixture in a concentration of 15 to 35%, particularly preferably 15 to 25% and especially preferably 18 to 22%, based on the mixture as a whole.

Very particularly preferred LC media comprise the compounds V-10b and IV-1-1:

V-10b

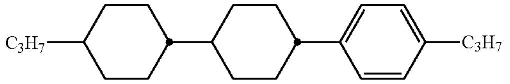

IV-1-1

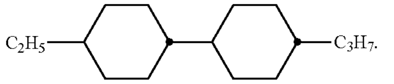

The compounds V-10b and IV-1-1 are preferably present in the mixture in a concentration of 15 to 35%, particularly preferably 15 to 25% and especially preferably 18 to 22%, based on the mixture as a whole.

Very particularly preferred LC media comprise the following three compounds:

V-10a

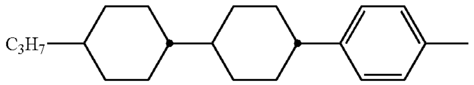

V-10b

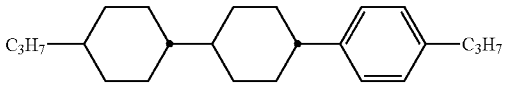

IV-1-1

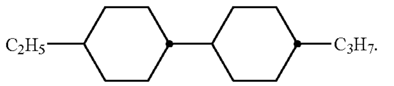

The compounds V-10a, V-10b and IV-1-1 are preferably present in the mixture in a concentration of 15 to 35%, particularly preferably 15 to 25% and especially preferably 18 to 22%, based on the mixture as a whole.

Preferred LC media comprise at least one compound selected from the group of the compounds

V-6

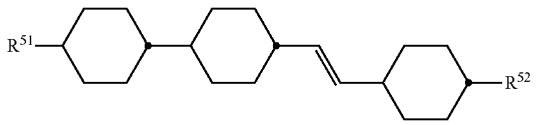

V-7

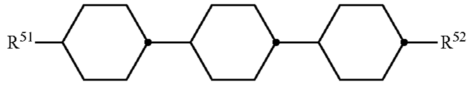

IV-1

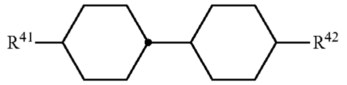

in which $R^{41}$ and $R^{42}$, and $R^{51}$ and $R^{52}$ have the meanings indicated above. Preferably in the compounds V-6, V-7 and IV-1, $R^{41}$ and $R^{51}$ denotes alkyl or alkenyl having 1 to 6 or 2 to 6 C atoms, respectively, and $R^{42}$ and $R^{52}$ denotes alkenyl having 2 to 6 C atoms.

Preferred LC media comprise at least one compound of the formulae V-6a, V-6b, V-7a, V-7b, IV-4-1, IV-4-2, IV-3a and IV-3b:

V-6a

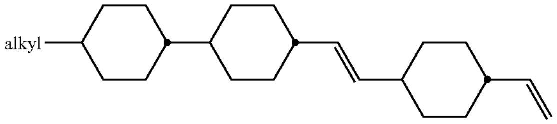

V-6b

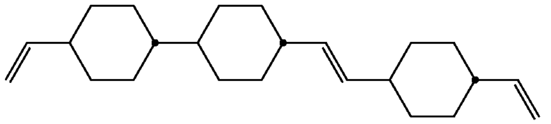

V-7a

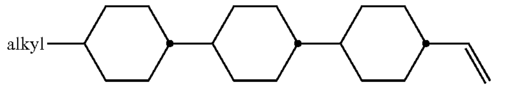

V-7b

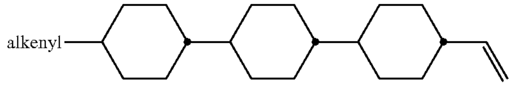

IV-4-1

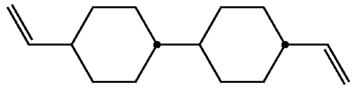

IV-4-2

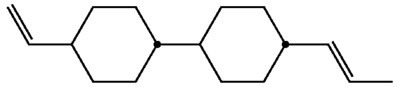

in which alkyl denotes an alkyl radical having 1 to 6 C atoms and alkenyl denotes an alkenyl radical having 2 to 6 C atoms.

The compounds of the formulae V-6a, V-6b, V-7a, V-7b, IV-4-1 and IV-4-2 are preferably present in the LC media according to the invention in amounts of 1 to 40% by weight, preferably 5 to 35% by weight and very particularly preferably 10 to 30% by weight.

In a preferred embodiment of the present invention the LC medium additionally comprises one or more compounds of the formulae VI-1 to VI-9

VI-1

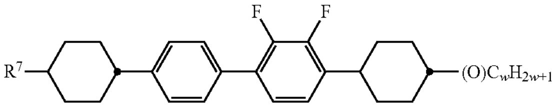

VI-2

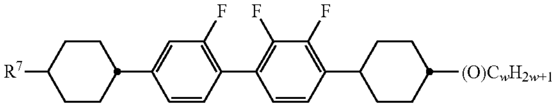

VI-3

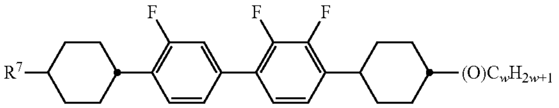

VI-4

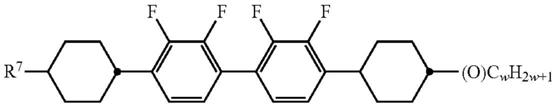

VI-5

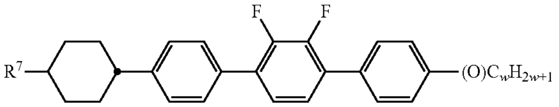

VI-6

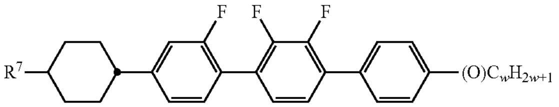

VI-7

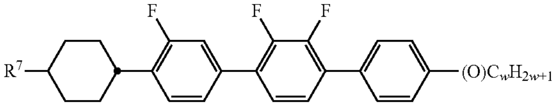

VI-8

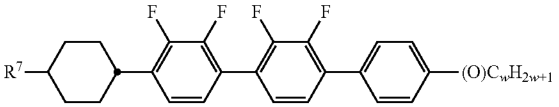

VI-9

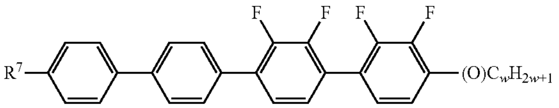

in which $R^7$ each, independently of one another, have one of the meanings indicated for $R^{2A}$ in formula IIA, and w and x each, independently of one another, denote 1 to 6.

Particular preference is given to LC media comprising at least one compound of the formula V-9.

In a preferred embodiment of the present invention the LC medium additionally comprises one or more compounds of the formulae VII-1 to VII-25,

VII-1

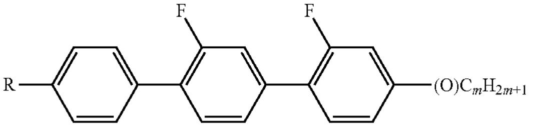

VII-2

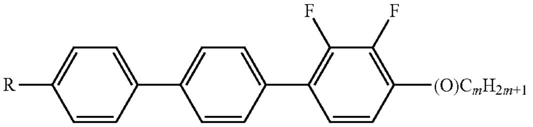

VII-3

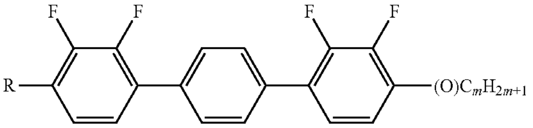

VII-4

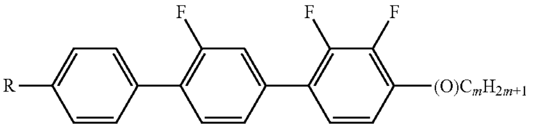

VII-5

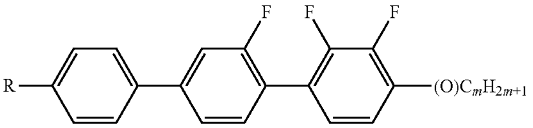

VII-6

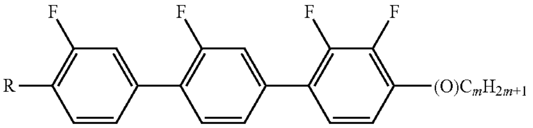

VII-7

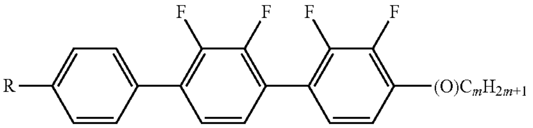

VII-8

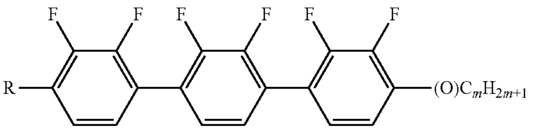

VII-9

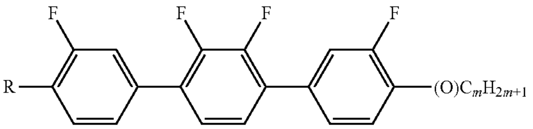

VII-10

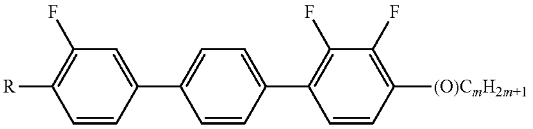

-continued

VII-11

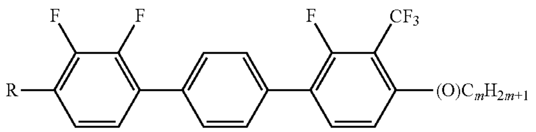

VII-12

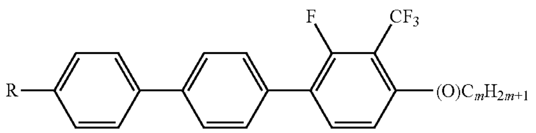

VII-13

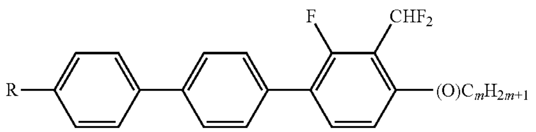

VII-14

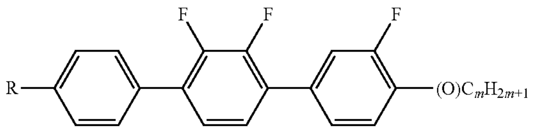

VII-15

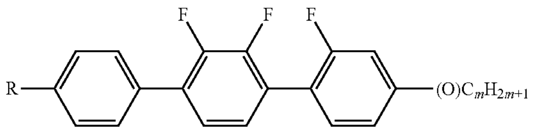

VII-16

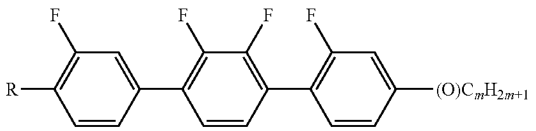

VII-17

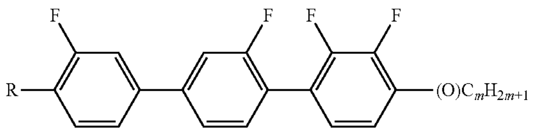

VII-18

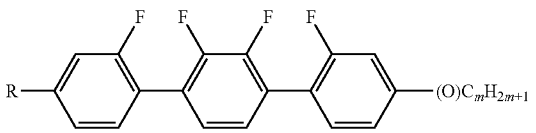

VII-19

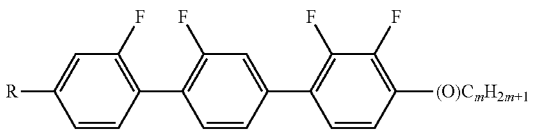

VII-20

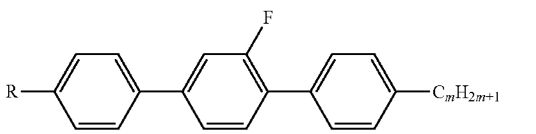

-continued

VII-21

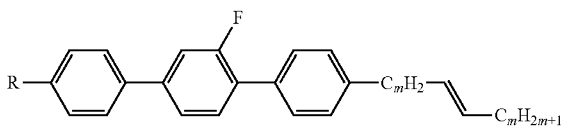

VII-22

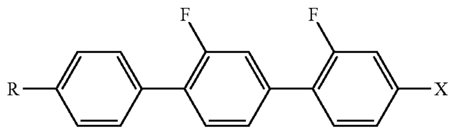

VII-23

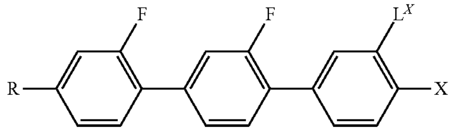

VII-24

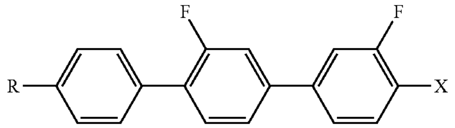

VII-25

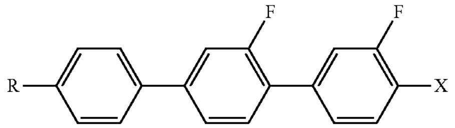

in which

R denotes a straight-chain alkyl or alkoxy radical having 1 to 6 C atoms, (O) denotes —O— or a single bond, X denotes F, Cl, $OCF_3$ or $OCHF_2$, LX denotes H or F, m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

X preferably denotes F or $OCH_3$, very preferably F.

The LC medium according to the invention preferably comprises the terphenyls of the formulae VII-1 to VII-25 in amounts of 2 to 30% by weight, in particular 5 to 20% by weight.

Particular preference is given to compounds of the formulae VII-1, VII-2, VII-4, VII-20, VII-21, and VII-22 wherein X denotes F. In these compounds, R preferably denotes alkyl, furthermore alkoxy, each having 1 to 5 C atoms. In the compounds of the formula VII-20, R preferably denotes alkyl or alkenyl, in particular alkyl. In the compounds of the formula VII-21, R preferably denotes alkyl. In the compounds of the formulae VII-22 to VII-25, X preferably denotes F.

The terphenyls of formula VII-1 to VII-25 are preferably employed in the LC media according to the invention if the $\Delta n$ value of the mixture is to be 0.1. Preferred LC media comprise 2 to 20% by weight of one or more terphenyl compounds selected from the group of the compounds of formulae VII-1 to VII-25.

Further Preferred Embodiments are Listed Below:

a) LC medium comprising at least one compound of the formulae Z-1 to Z-7,

Z-1

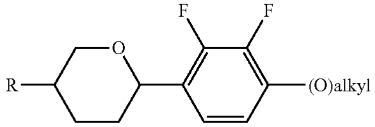

Z-2

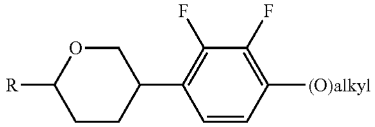

Z-3

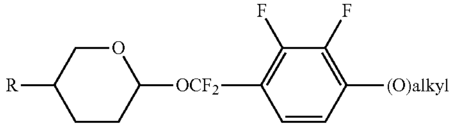

Z-4

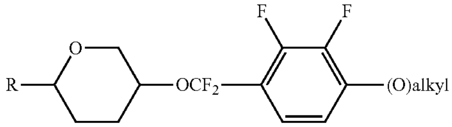

Z-5

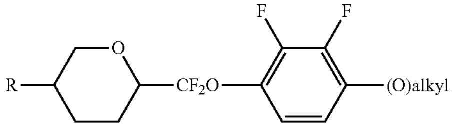

Z-6

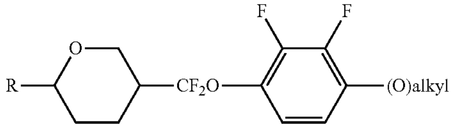

Z-7

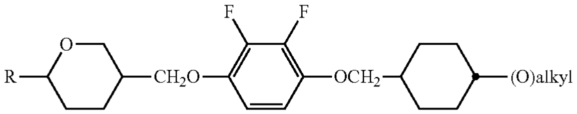

in which R, (O) and alkyl have the meanings indicated above for formula III.

b) Preferred LC media according to the invention comprise one or more substances, which contain a tetrahydronaphthyl or naphthyl unit, such as, for example, the compounds of the formulae N-1 to N-5,

N-1

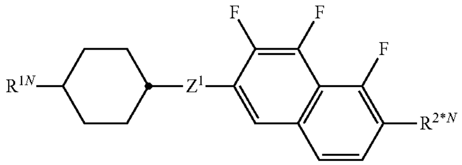

N-2

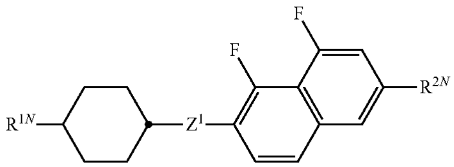

-continued

N-3

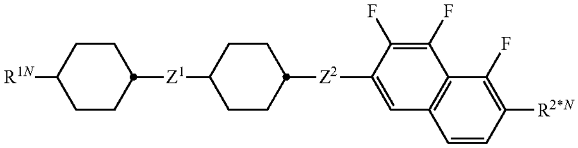

N-4

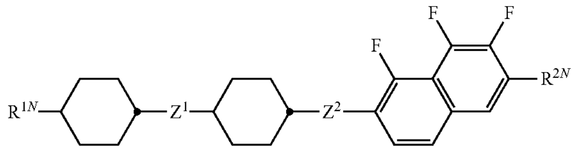

N-5

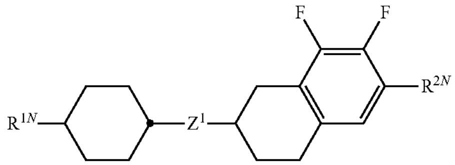

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote $—C_2H_4—$, $—CH{=}CH—$, $—(CH_2)_4—$, $—(CH_2)_3O—$, $—O(CH_2)_3—$, $—CH{=}CHCH_2CH_2—$, $—CH_2CH_2CH{=}CH—$, $—CH_2O—$, $—OCH_2—$, $—COO—$, $—OCO—$, $—C_2F_4—$, $—CF{=}CF—$, $—CF{=}CH—$, $—CH{=}CF—$, $—CF_2O—$, $—OCF_2—$, $—CH_2—$ or a single bond.

c) Preferred LC media comprise one or more compounds selected from the group of the difluorodibenzochroman compounds of the formula BC, chromans of the formula CR, and fluorinated phenanthrenes of the formulae PH-1 and PH-2,

BC

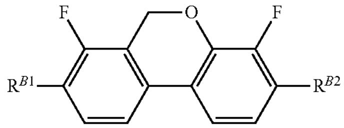

CR

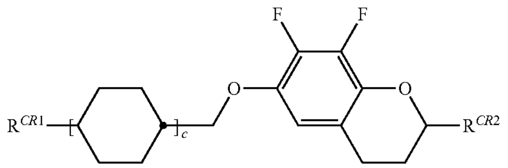

PH-1

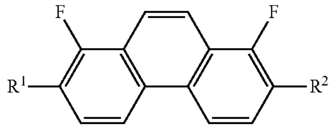

-continued

PH-2

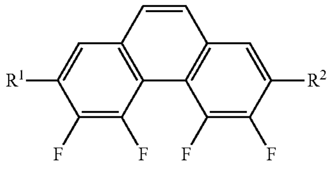

in which $R^{B1}$, $R^{B2}$, $R^{CR1}$, $R^{CR2}$, $R^1$, $R^2$ each, independently of one another, have the meaning of $R^{2A}$. c is 0, 1 or 2. $R^1$ and $R^2$ preferably, independently of one another, denote alkyl or alkoxy having 1 to 6 C atoms.

The LC media according to the invention preferably comprise the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

BC-1

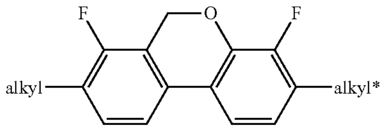

BC-2

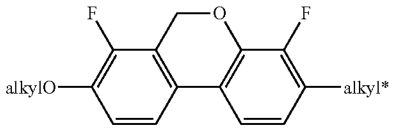

BC-3

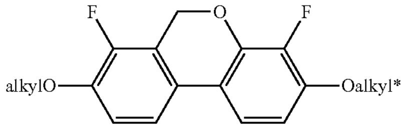

BC-4

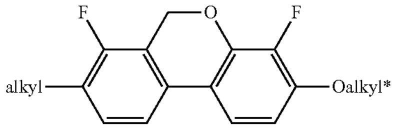

BC-5

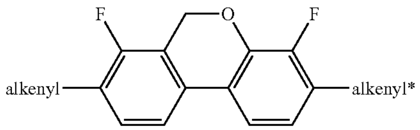

BC-6

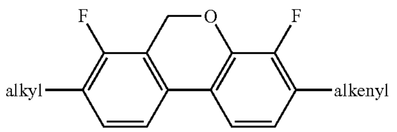

BC-7

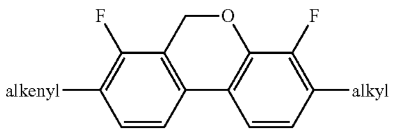

-continued

CR-1

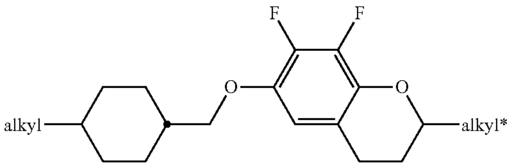

CR-2

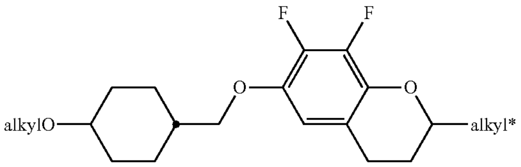

CR-3

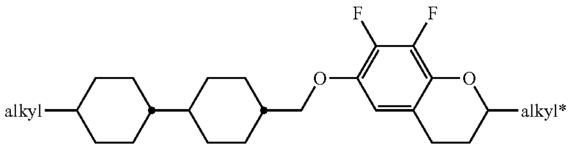

CR-4

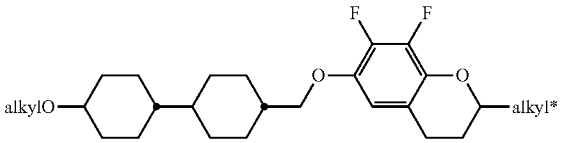

CR-5

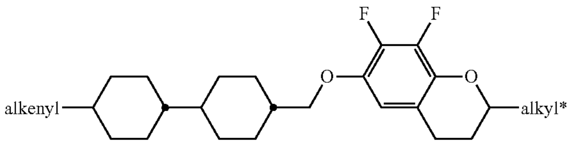

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Very particular preference is given to LC media comprising one, two or three compounds of the formula BC-2, BF-1 and/or BF-2.

d) Preferred LC media comprise one or more indane compounds of the formula In,

In

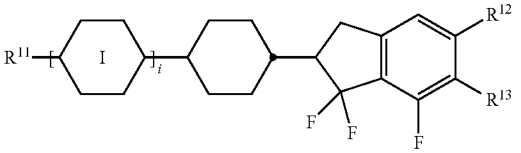

in which $R^{11}$, $R^{12}$, $R^{13}$ each, independently of one another, denote a straight-chain alkyl, alkoxy, alkoxyalkyl or alkenyl radical having 1 to 6 C atoms, $R^{12}$ and $R^{13}$ additionally denote halogen, preferably F,
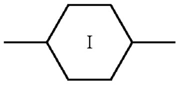
denotes
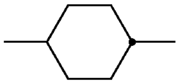 , 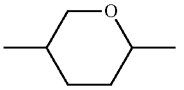 ,
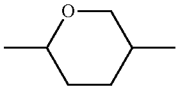 , 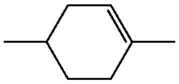 ,
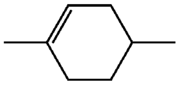 , 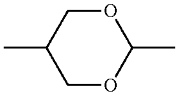 ,
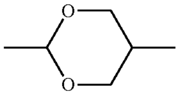 , 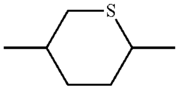 ,
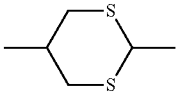 , 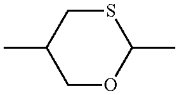 ,
i denotes 0, 1 or 2.
Preferred compounds of the formula In are the compounds of the formulae In-1 to In-16 indicated below:
In-1
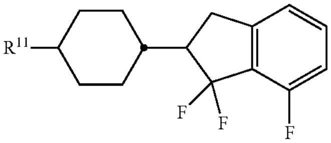
In-2
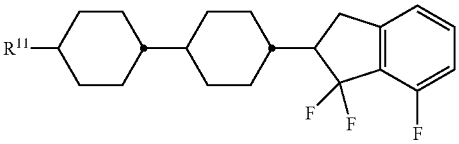
In-3
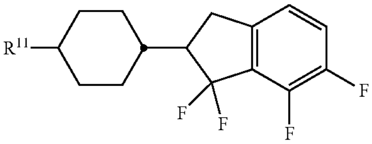
In-4
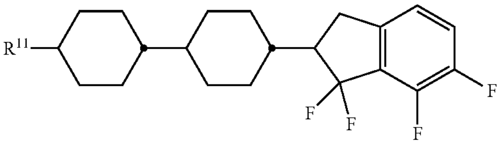
In-5
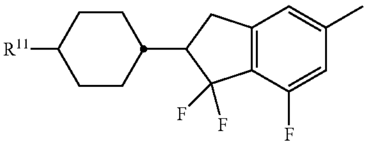
-continued
In-6
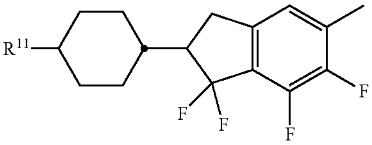
In-7
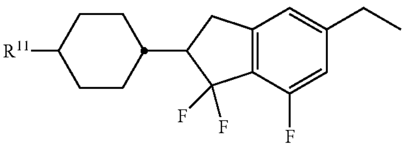
In-8
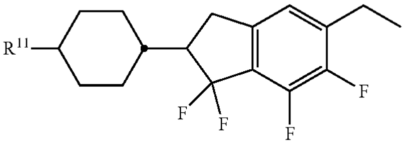
In-9
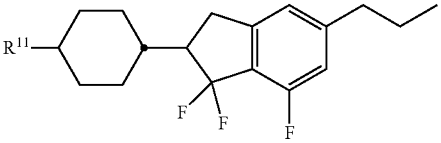
In-10
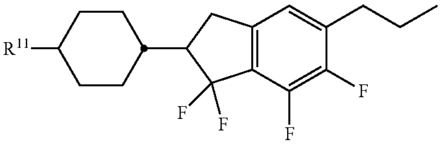
In-11
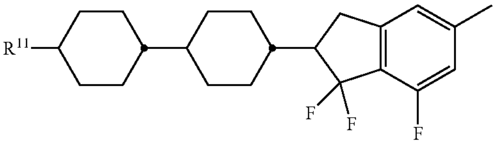
In-12
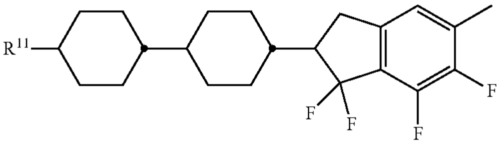
In-13
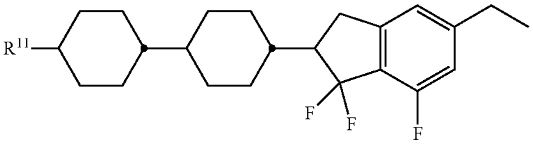
In-14
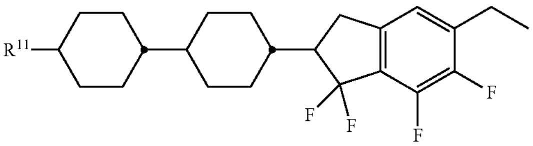

-continued

In-15

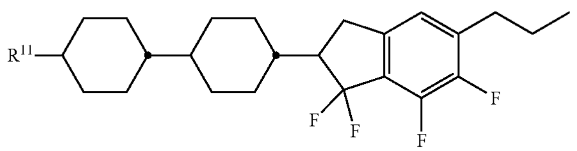

In-16

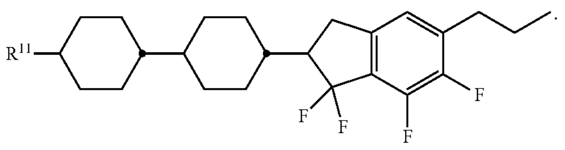

Particular preference is given to the compounds of the formulae In-1, In-2, In-3 and In-4.

The compounds of the formula In and the sub-formulae In-1 to In-16 are preferably employed in the LC media according to the invention in concentrations 5% by weight, in particular 5 to 30% by weight and very particularly preferably 5 to 25% by weight.

e) Preferred LC media additionally comprise one or more compounds of the formulae L-1 to L-5,

L-1

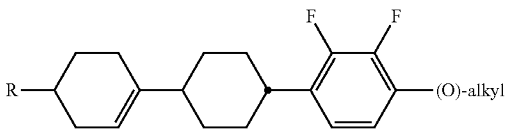

L-2

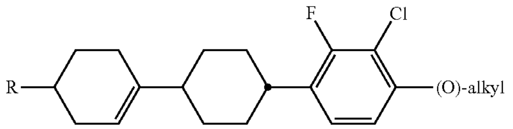

L-3

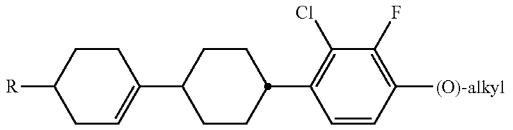

L-4

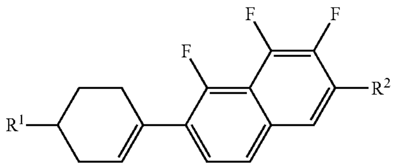

L-5

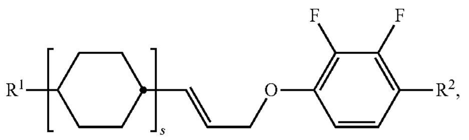

in which

R and $R^1$ each, independently of one another, have the meanings indicated for $R^{2A}$ in formula IIA above, and alkyl denotes an alkyl radical having 1 to 6 C atoms. The parameter s denotes 1 or 2. The compounds of the formulae L-1 to L-5 are preferably employed in concentrations of 5 to 50% by weight, in particular 5 to 40% by weight and very particularly preferably 10 to 40% by weight.

f) Preferred LC media additionally comprise one or more compounds of formula IIA-Y

IIA-Y

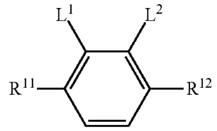

in which $R^{11}$ and $R^{12}$ have one of the meanings given for $R^{2A}$ in formula IIA above, and $L^1$ and $L^2$, identically or differently, denote F or Cl.

Preferred compounds of the formula IIA-Y are selected from the group consisting of the following subformulae

IIA-Y1

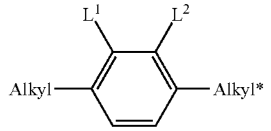

IIA-Y2

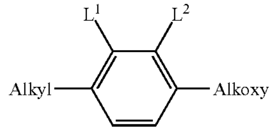

IIA-Y3

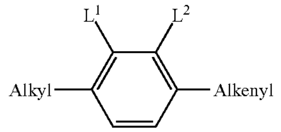

IIA-Y4

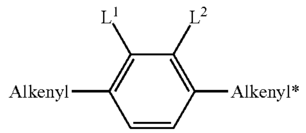

IIA-Y5

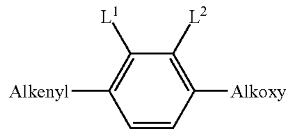

IIA-Y6

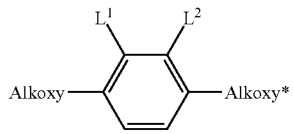

IIA-Y7

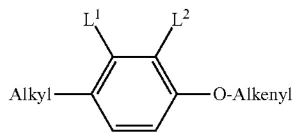

-continued

IIA-Y8

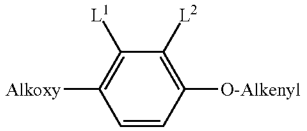

IIA-Y9

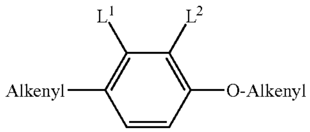

IIA-Y10

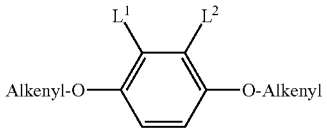

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Particularly preferred compounds of the formula IIA-Y are selected from the group consisting of following subformulae:

IIA-Y6a

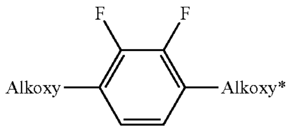

IIA-Y6b

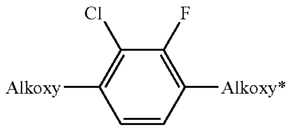

in which Alkoxy and Alkoxy* have the meanings defined above and preferably denote methoxy, ethoxy, n-propyloxy, n-butyloxy or n-pentyloxy.

g) LC medium that additionally comprises one or more quaterphenyl compounds selected from the following formula:

Q

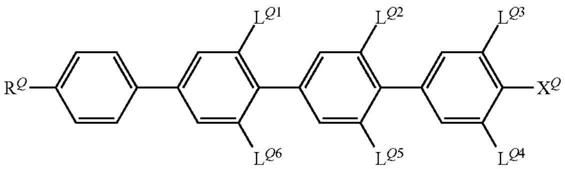

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

Q1

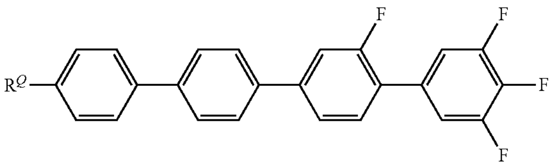

Q2

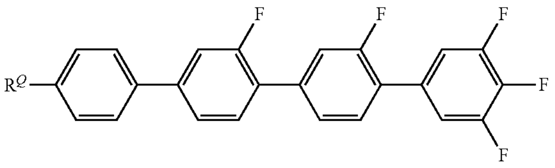

wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC host mixture is from >0 to ≤5%, by weight, very preferably from 0.05 to 2% by weight, more preferably from 0.1 to 1% by weight, most preferably from 0.1 to 0.8% by weight.

Preferably, the LC medium contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon^{\parallel}$ and $\varepsilon^{\perp}$, and in particular enables to achieve a high value of the dielectric constant $\varepsilon^{\parallel}$ while keeping the dielectric anisotropy $\Delta\varepsilon$ constant, thereby reducing the kick-back voltage and reducing image sticking.

The LC Media According to the Invention Preferably Comprise one or more compounds of formula IA or its subformulae, preferably of formula IA-6, preferably in a concentration in the range from >5 to 25%, very preferably from 6 to 20%, most preferably from 7 to 15%;

one or more compounds of formula IB or its subformulae, preferably of formula IB-1 or IB-2, most preferably of formula IB-1, preferably in a concentration in the range from 0.5 to 5%, very preferably from 0.5 to 2%;

one or more compounds of formula IC or its subformulae, preferably of formula IC-1, IC-2, IC-3, IC-4, IC-5 or IC-6, very preferably of formula IC-1 and/or IC-4, preferably in a concentration in the range from 10 to 70%, very preferably from 15 to 55%, most preferably from 20 to 45%;

one or ore compounds of formula IC-1 in a concentration in the range from 20 to 70%, very preferably from 25 to 65%, most preferably from 27 to 60%; and/or one or more compounds of formulae IIA and IIB, preferably in a total concentration in the range of from 30% to 45%; and/or one or more compounds of formula IV, preferably in a total concentration in the range of from 2 to 30% more preferably from 5% to 25%, particularly preferably from 5% to 15%; and/or one or more compounds of formula V-16, wherein preferably $R^1$ and $R^2$ are selected from ethyl and propyl, preferably in a total concentration in the range of from 2 to 30% more preferably from 5% to 25%, particularly preferably from 5% to 15%.

In Particular, the Medium Comprises one or more compounds CY-n-Om, in particular CY-3-04, CY-5-04 and/or CY-3-02, preferably in a total concentration in the range of from 5% to 30%, preferably 10% to 20%;

one or more compounds PY-n-Om, in particular PY-1-02, PY-2-02 and/or PY-3-02, preferably in a total concentration in the range of from 5% to 40%, preferably 10% to 30%; and/or CPY-n-Om, in particular CPY-2-02, CPY-3-02 and/or CPY-5-02, preferably in concentrations >5%, in particular 7% to 20%, based on the mixture as a whole, and/or one or more compounds CCY-n-Om, preferably CCY-4-02, CCY-3-02, CCY-3-03, CCY-3-01 and/or CCY-5-02, preferably in concentrations >3%, in particular 5 to 15%, based on the mixture as a whole; and/or CPY-n-Om and CY-n-Om, preferably in concentrations of 10 to 80%, based on the mixture as a whole, and/or CPY-n-Om and PY-n-Om, preferably CPY-2-02 and/or CPY-3-02 and PY-3-02 or PY-1-02, preferably in concentrations of 5 to 20%, more preferably 10 to 15% to based on the mixture as a whole.

The invention furthermore relates to an electro-optical display having active-matrix addressing, characterised in that it contains, as dielectric, a liquid-crystalline medium according to claim 1 and wherein the display is a VA, SA-VA, IPS, U-IPS, FFS, UB-FFS, SA-FFS, PS-VA, PS-OCB, PS-IPS, PS-FFS, PS-UB-FFS, PS-posi-VA, PS-TN, polymer stabilised SA-VA or polymer stabilised SA-FFS display.

It is advantageous for the liquid-crystalline medium according to the invention to preferably have a nematic phase from ≤−20° C. to ≥70° C., particularly preferably from ≤−30° C. to ≥80° C., very particularly preferably from ≤−40° C. to ≥90° C.

The medium according to the invention has a clearing temperature of 70° C. or more, preferably of 74° C. or more.

The expression "have a nematic phase" here means on the one hand, that no smectic phase and no crystallisation are observed at low temperatures at the corresponding temperature and on the other hand, that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60K and a flow viscosity $\nu_{20}$ of at most 30 $mm^2 \cdot s^{-1}$ at 20° C.

The mixture is nematic at a temperature of −20° C. or less, preferably at −30° C. or less, very preferably at −40° C. or less.

The values of the birefringence Δn in the liquid-crystal mixture are generally between 0.07 and 0.16, preferably between 0.08 and 0.15, very preferably between 0.09 and 0.14.

In a preferred embodiment of the present invention, the medium has a birefringence in the range of from 0.090 to 0.110, preferably from 0.095 to 0.105, in particular from 0.100 to 0.105.

In another preferred embodiment, the medium according to the invention has a birefringence of 0.120 or more, preferably in the range of from 0.125 to 0.145, more preferably from 0.130 to 0.140.

The liquid-crystal mixture according to the invention has a dielectric anisotropy Δε of −1.5 to −8.0, preferably of −2.0 to −4.0, in particular −2.5 to −3.5, The rotational viscosity $\gamma_1$ at 20° C. is preferably ≤120 mPa·s, in particular ≤100 mPa·s.

In a preferred embodiment, the rotational viscosity $\gamma_1$ at 20° C. is ≤100 mPa·s, in particular 95 mPa·s.

The liquid-crystal media according to the invention have relatively low values for the threshold voltage ($V_0$). They are preferably in the range from 1.7 V to 3.0 V, particularly preferably ≤2.7 V and very particularly preferably ≤2.5 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5 ≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The LC media according to the invention are suitable for all VA-TFT (vertical alignment-thin film transistor) applications, such as, for example, VAN (vertically aligned nematic), MVA (multidomain VA), (S)-PVA (super patterned VA), ASV (advanced super view, or axially symmetric VA), PSA (polymer sustained VA) and PS-VA (polymer stabilized VA). They are furthermore suitable for IPS (in-plane switching) and FFS (fringe field switching) applications having negative Δε.

The nematic LC media in the displays according to the invention generally comprise two components A and B, which themselves consist of one or more individual compounds.

Component A has significantly negative dielectric anisotropy and gives the nematic phase a dielectric anisotropy of ≤−0.5. Besides one or more compounds of the formula I, it preferably comprises the compounds of the formulae IIA, IIB and/or IIC, furthermore one or more compounds of the formula Iv-1.

The proportion of component A is preferably between 45 and 100%, in particular between 60 and 85%.

For component A, one (or more) individual compound(s) which has (have) a value of Δε≤−0.8 is (are) preferably selected. This value must be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

A multiplicity of suitable materials is known to the person skilled in the art from the literature. Particular preference is given to compounds of the formula 0-17.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in LC media. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of ≤20% by weight, based on the mixture as a whole.

Besides one or more compounds of the formula IA, IB and IC, the medium preferably comprises 4 to 15, in particular 5 to 12, and particularly preferably <10, compounds of the formulae IIA, IIB and/or IIC and optionally one or more compounds of the formula IV-1

Besides compounds of the formula IA, IB and IC and the compounds of the formulae IIA, IIB and/or IIC and optionally IV-1, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenyl-cyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds that are suitable as constituents of liquid-crystal phases of this type can be characterised by the formula IV $$R^{20}\text{-L-G-E-}R^{21} \qquad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline, G denotes —CH═CH— —N(O)═N—
—CH═CQ- —CH═N(O)—
—C≡C— —$CH_2$—$CH_2$—
CO—O— —$CH_2$—O—
CO—S— —$CH_2$—S—
—CH═N— —COO-Phe-COO—
$CF_2O$— —CF═CF—
—$OCF_2$— —$OCH_2$—
—$(CH_2)_4$— —$(CH_2)_3O$— or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

The VA, IPS or FFS mixture according to the invention may also comprise compounds in which, for example, H, N, O, Cl and F have been replaced by the corresponding isotopes.

The combination of compounds of the preferred embodiments mentioned above with the polymerized compounds described above causes low threshold voltages, low rotational viscosities and very good low-temperature stabilities in the LC media according to the invention at the same time as constantly high clearing points and high HR values, and allows the rapid establishment of a particularly low tilt angle (i.e. a large tilt) in PSA displays.

In particular, the LC media exhibit significantly shortened response times, in particular also the grey-shade response times, in PSA displays compared with the LC media from the prior art.

Preferably the proportion of the polymerizable component A) in the LC medium is from >0 to <5%, very preferably from >0 to ≤1%, most preferably from 0.01 to 0.5%.

Preferably the proportion of the LC component B) in the LC medium is from 95 to <100%, very preferably from 99 to <100%.

For use in PSA displays, the total proportion of the polymerizable compounds is preferably from 0.01 to 2.0%, very preferably from 0.1 to 1.0%, most preferably from 0.2 to 0.8%.

For use in SA-VA displays the total proportion of the polymerizable compounds in the LC medium is preferably from >0 to <3%, very preferably from >0 to <2%, more preferably from 0.05 to 2.0, most preferably from 0.05 to 1.0%.

The polymerizable compounds can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

The invention furthermore relates to an LC medium or LC display as described above, wherein the polymerizable compounds of formula I1, I2 and optionally I3 are present in polymerized form.

The LC display is preferably a PS-VA, PS-IPS, PS-FFS, or SA-VA display.

For the production of PSA or polymer stabilised SA displays, the polymerizable compounds contained in the LC medium are polymerized by in-situ polymerization in the LC medium between the substrates of the LC display, preferably while a voltage is applied to the electrodes.

The structure of the displays according to the invention corresponds to the usual geometry for PSA displays, as described in the prior art cited at the outset. Geometries without protrusions are preferred, in particular, those in which, in addition, the electrode on the colour filter side is unstructured and only the electrode on the TFT side has slots. Particularly suitable and preferred electrode structures for PS-VA displays are described, for example, in US 2006/0066793 A1.

A Preferred PSA Type LC Display of the Present Invention Comprises:

- a first substrate including a pixel electrode defining pixel areas, the pixel electrode being connected to a switching element disposed in each pixel area and optionally including a micro-slit pattern, and optionally a first alignment layer disposed on the pixel electrode,
- a second substrate including a common electrode layer, which may be disposed on the entire portion of the second substrate facing the first substrate, and optionally a second alignment layer,
- an LC layer disposed between the first and second substrates and including an LC medium as described above and below, wherein the polymerizable compounds may also be present in polymerized form.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerizable component of the LC medium is then polymerized for example by UV photopolymerization. The polymerization can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multidomain orientation of the LC molecules can be induced by providing electrodes having slits and/or bumps or protrusions in order to create two, four or more different tilt alignment directions.

Upon polymerization the polymerizable compounds form a copolymer, which causes a certain tilt angle of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. It is also possible firstly to carry out the polymerization, optionally while applying a voltage, in a first step in order to produce a tilt angle, and subsequently, in a second polymerization step without an applied voltage, to polymerize or crosslink the compounds which have not reacted in the first step ("end curing").

Suitable and preferred polymerization methods are, for example, thermal or photopolymerization, preferably photopolymerization, in particular UV induced photopolymerization, which can be achieved by exposure of the polymerizable compounds to UV radiation.

The polymerizable compounds are preferably selected from formula M $$R^a—B^1—(Z^b—B^2)_m—R^b \qquad M$$

in which the individual radicals, on each occurrence identically or differently, and each, independently of one another, have the following meaning:

$R^a$ and $R^b$ P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —C($R^0$)=C($R^{00}$)—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerizable group, Sp a spacer group or a single bond, $B^1$ and $B^2$ an aromatic, heteroaromatic, alicyclic or heterocyclic group having 4 to 25 ring atoms, which may also contain fused rings, and which is unsubstituted, or mono- or polysubstituted by L, $Z^b$ —O—, —S—, —CO—, —CO—O—, —CO—O—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —CH═CH—OCO—, —OCO—CH═CH—, $CR^0R^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L P, P-Sp-, OH, $CH_2OH$, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula M are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by 0 and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindene-2,5-diyl, where all these groups may be unsubstituted or mono- or polysubstituted by L as defined above.

Particularly preferred compounds of the formula M are those in which $B^1$ and $B^2$ each, independently of one another, denote 1,4-phenylene, 1,3-phenylene, naphthalene-1,4-diyl or naphthalene-2,6-diyl.

Further preferred are polymerizable compounds selected from the following formulae:

M1

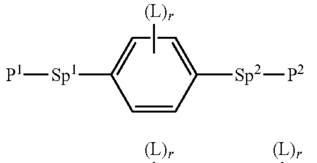

M2

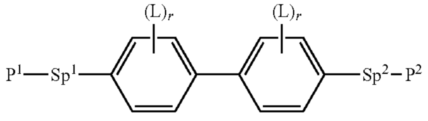

-continued

M3

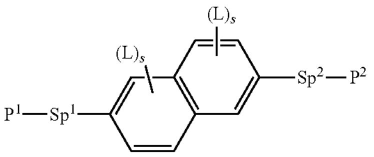

M4

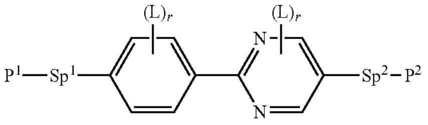

M5

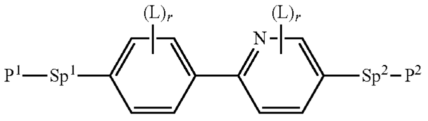

M6

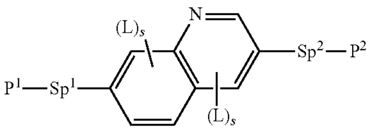

M7

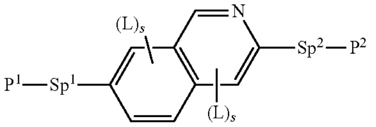

M8

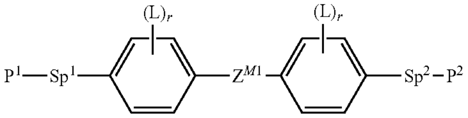

M9

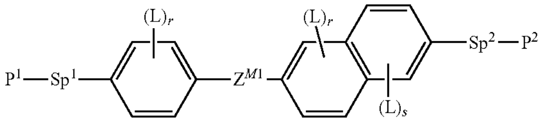

M10

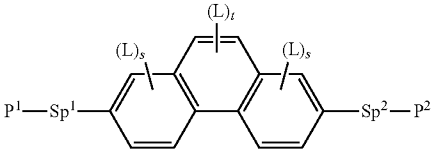

M11

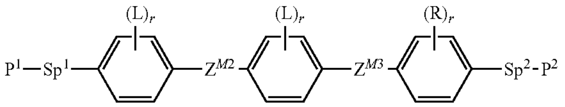

M12

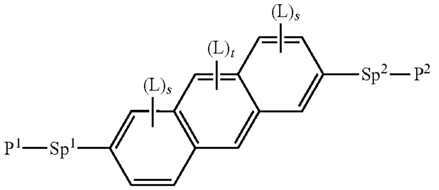

M13
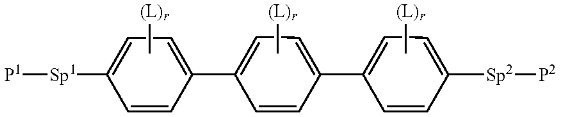
M14
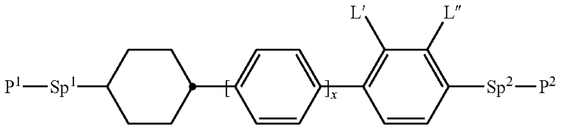
M15
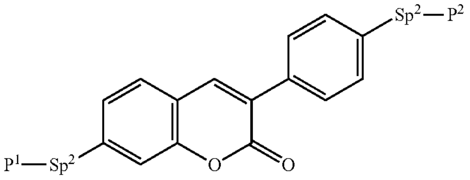
M16
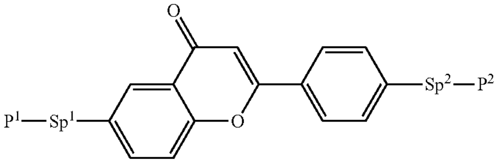
M17
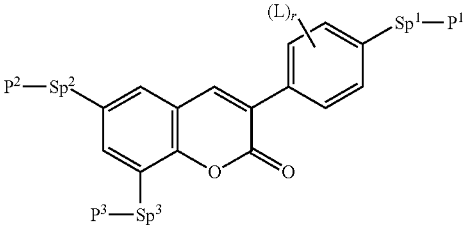
M18
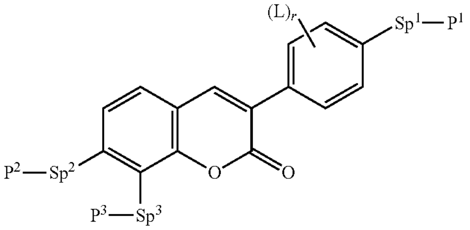
M19
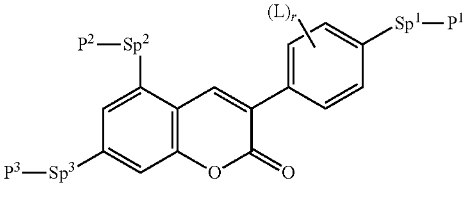
M20
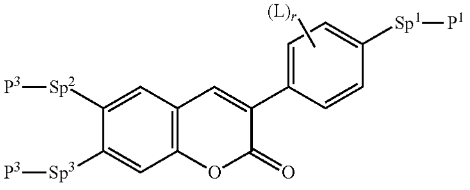
M21
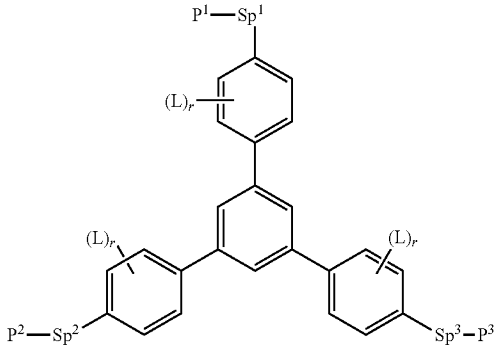
M22
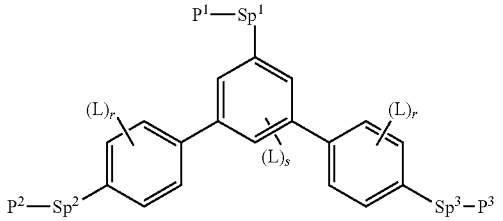
M23
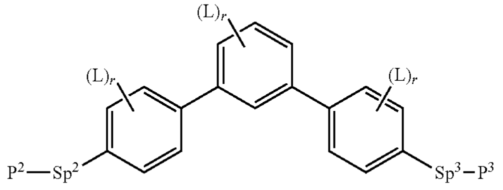
M24
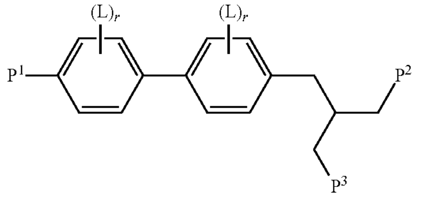
M25
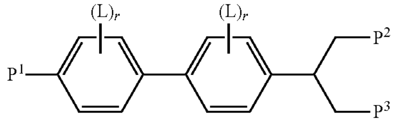
M26
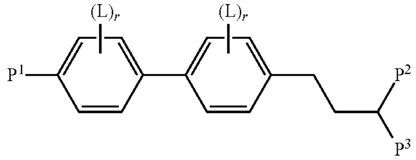
M27
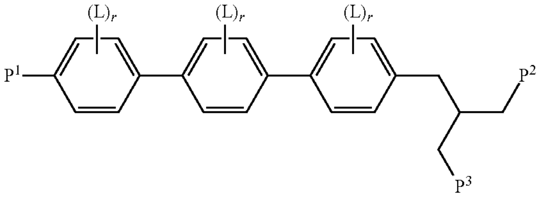

-continued

M28

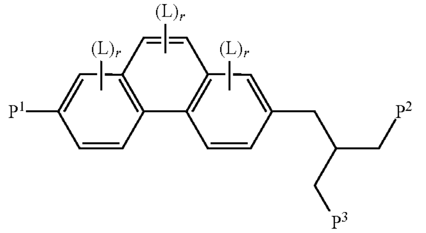

M29

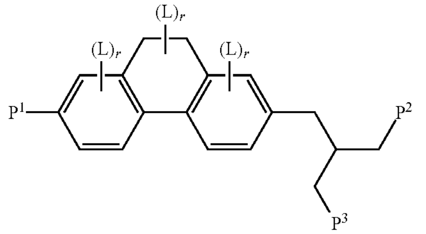

M30

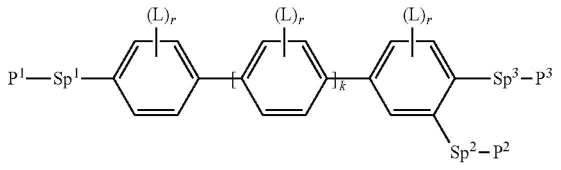

M31

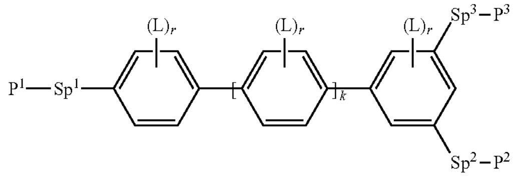

M32

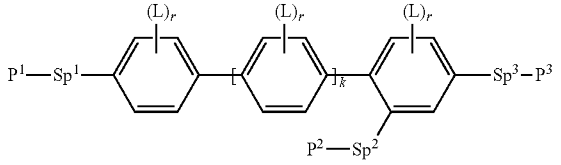

in which the individual radicals, on each occurrence identically or differently, and each, independently of one another, have the following meaning:

$P^1$, $P^2$, $P^3$ a polymerizable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^2$-$Sp^2$- and $P^3$-$Sp^3$- may also denote $R^{aa}$, with the proviso that at least one of the radicals $P^1$-$Sp^1$-, $P^2$-$Sp^2$ and $P^3$-$Sp^3$- present is different from $R^{aa}$, preferably $—(CH_2)_{p1}—$, $—(CH_2)_{p1}—O—$, $—(CH_2)_{p1}—CO—O—$ or $—(CH_2)_{p1}—O—CO—O—$, wherein p1 is an integer from 1 to 12, $R^{aa}$ F, Cl, CN or straight-chain or branched alkyl having 1 to 25 C atoms, in which, in addition, one or more non-adjacent $CH_2$ groups may each be replaced, independently of one another, by $—C(R^0)═C(R^{00})—$, —C≡C—, $—N(R^0)—$, —O—, —S—, —CO—, —CO—O—, —O—CO—, —O—CO—O— in such a way that 0 and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), and wherein $R^{aa}$ does not denote or contain a group $P^1$, $P^2$ or $P^3$, $R^0$, $R^{00}$ H or alkyl having 1 to 12 C atoms, $R^y$ and $R^z$ H, F, $CH_3$ or $CF_3$, $X^1$, $X^2$, $X^3$—CO—O—, —O—CO— or a single bond, $Z^{M1}$—O—, —CO—, $—C(R^yR^z)—$ or $—CF_2CF_2—$, $Z^{M2}$, $Z^{M3}$—CO—O—, —O—CO—, $—CH_2O—$, $—OCH_2—$, $—CF_2O—$, $—OCF_2—$ or $—(CH_2)_n—$, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, s 0, 1, 2 or 3, t 0, 1 or 2, x 0 or 1.

Very preferred are compounds of formulae M2 and M13, especially direactive compounds containing exactly two polymerizable groups $P^1$ and $P^2$.

Further preferred are compounds selected from formulae M17 to M32, in particular from formulae M20, M22, M24, M27, M30 and M32, especially trireactive compounds containing exactly three polymerizable groups $P^1$, $P^2$ and $P^3$.

In the compounds of formulae M1 to M31 the group

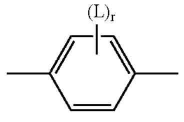

is preferably

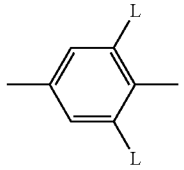 , 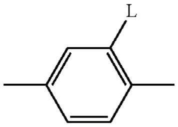 ,

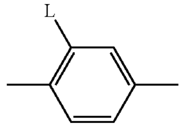 , 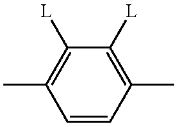 ,

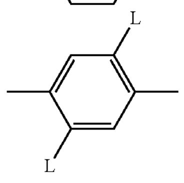 or 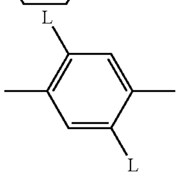 , wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, most preferably F or $OCH_3$.

Preferred compounds of formulae M1 to M32 are those wherein $P^1$, $P^2$ and $P^3$ denote an acrylate, methacrylate, oxetane or epoxy group, very preferably an acrylate or methacrylate group, most preferably a methacrylate group.

Further preferred compounds of formulae M1 to M32 are those wherein $Sp^1$, $Sp^2$ and $Sp^3$ are a single bond.

Further preferred compounds of formulae M1 to M32 are those wherein one of $Sp^1$, $Sp^2$ and $Sp^3$ is a single bond and another one of $Sp^1$, $Sp^2$ and $Sp^3$ is different from a single bond.

Further preferred compounds of formulae M1 to M32 are those wherein those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is X" is the linkage to the benzene ring and is —O—, —O—CO—, —CO—O, —O—CO—O— or a single bond.

Further preferred compounds of formula M are those selected from Table D below, especially those selected from the group consisting of formulae RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-92, RM-102, RM-103, RM-109, RM-116, RM-117, RM-120, RM-121, RM-122, RM-139, RM-142, RM-153, RM-155, RM-158 and RM-159.

Particularly preferred are LC media comprising one, two or three polymerizable compounds of formula M.

Further preferred are LC media comprising two or more direactive polymerizable compounds of formula M, preferably selected from formulae M1 to M16, very preferably selected from formulae M2 and M13.

Further preferred are LC media comprising one or more direactive polymerizable compounds of formula M, preferably selected from formulae M1 to M16, very preferably from formulae M2 and M13, and one or more trireactive polymerizable compounds of formula M, preferably selected from formulae M17 to M32, very preferably from formulae M20, M22, M24, M27, M30 and M32.

Further preferred are LC media comprising one or more polymerizable compounds of formula M wherein at least one r is not 0, or at least one of s and t is not 0, very preferably selected from formulae M2, M13, M22, M24, M27, M30 and M32, and wherein L is selected from the preferred groups shown above, most preferably from F and $OCH_3$.

Further preferred are polymerizable compounds that show absorption in the wavelength range from 340 to 380 nm, preferably selected from formula M, very preferably from formulae M1 to M32, most preferably from the group consisting of the above-mentioned formulae from Table D.

Optionally one or more polymerization initiators are added to the LC medium. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If a polymerization initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such, for example, lower material costs and in particular less contamination of the LC medium by possible residual amounts of the initiator or degradation products thereof. The polymerization can thus also be carried out without the addition of an initiator. In a preferred embodiment, the LC medium thus does not contain a polymerization initiator.

The LC medium may also comprise one or more stabilisers in order to prevent undesired spontaneous polymerization of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerizable component (component A), is preferably 10-50,000 ppm, particularly preferably 50-5,000 ppm.

In a preferred embodiment, the LC media contain one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment, the LC media contain a racemate of one or more chiral dopants, which are preferably selected from the chiral dopants mentioned in the previous paragraph.

In another preferred embodiment of the present invention the LC media contain one or more further stabilisers, preferably selected from the group consisting of the following formulae

S1

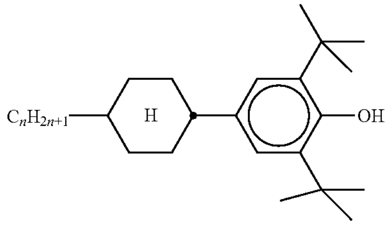

S2

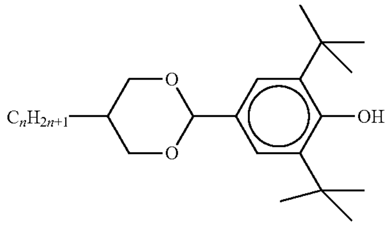

S3

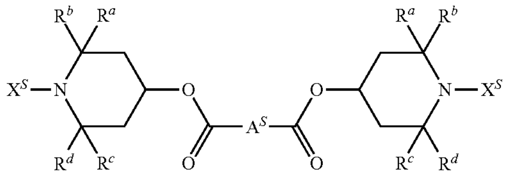

wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, $CH_3$, OH or O•, $A^S$ straight-chain, branched or cyclic alkylene with 1 to 20 C atoms which is optionally substituted, n an integer from 1 to 6, preferably 3.

Preferred stabilizers of formula S3 are selected from formula S3A

S3A

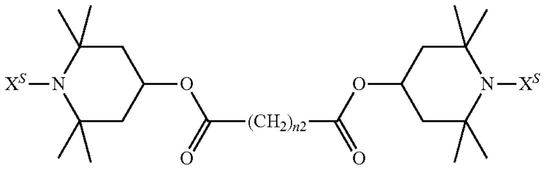

wherein n2 is an integer from 1 to 12, and wherein one or more H atoms in the group $(CH_2)_{n2}$ are optionally replaced by methyl, ethyl, propyl, butyl, pentyl or hexyl.

Very preferred stabilizers are selected from the group consisting of the following formulae

S1-1

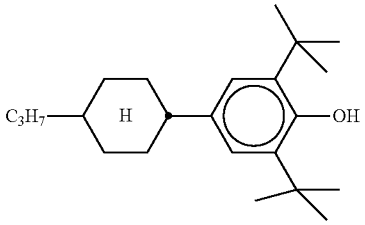

S2-1

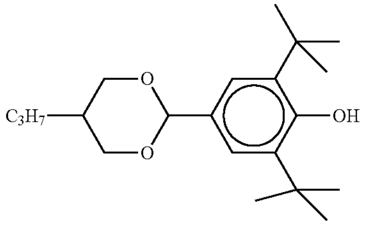

S3-1

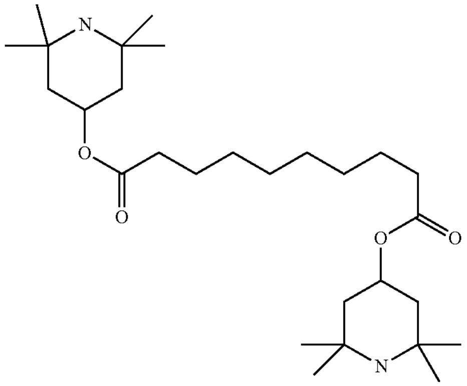

-continued

S3-2

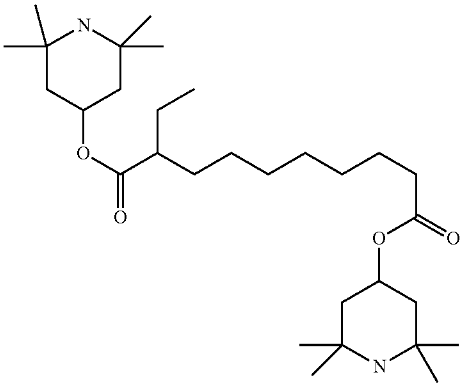

S3-3

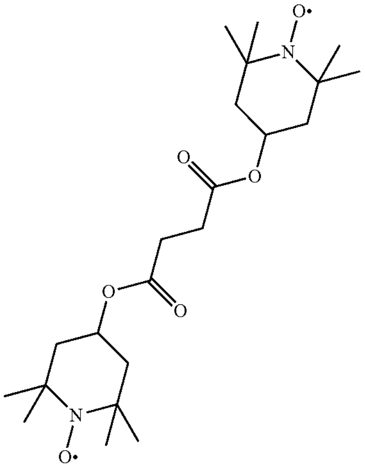

S3-4

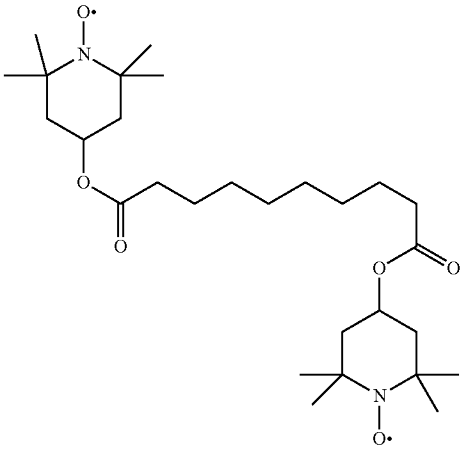

-continued

S3-5

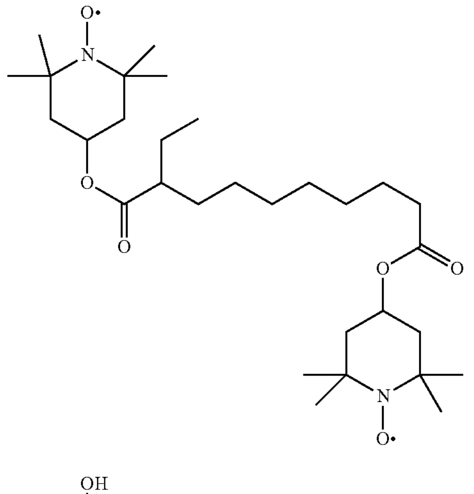

S3-6

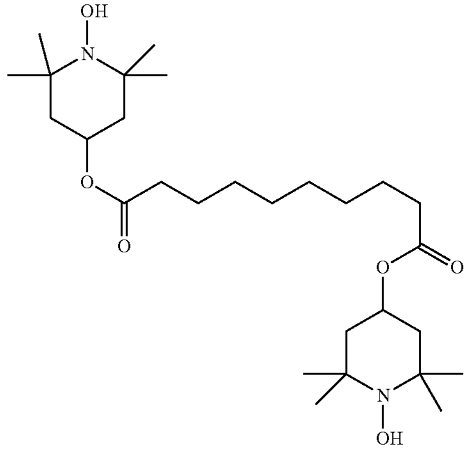

S3-7

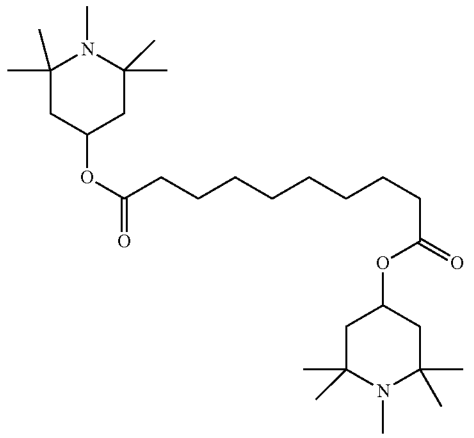

In a preferred embodiment, the liquid-crystalline medium comprises one or more stabilisers selected from the group consisting of formulae S1-1, S2-1, S3-1, S3-1 and S3-3.

In a preferred embodiment, the liquid-crystalline medium comprises one or more stabilizers selected from Table C below.

Preferably, the proportion of stabilisers, like those of formula S1-S3, in the liquid-crystalline medium is from 10 to 500 ppm, very preferably from 20 to 100 ppm.

In another preferred embodiment, the LC medium according to the present invention contains a self alignment (SA) additive, preferably in a concentration of 0.1 to 2.5%.

In another preferred embodiment, the LC medium according to the present invention contains a self alignment (SA) additive, preferably in a concentration of 0.1 to 2.5%.

In a preferred embodiment, the SA-VA display according to the present invention does not contain a polyimide alignment layer. In another preferred embodiment, the SA-VA display according to the invention contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups that are attached, optionally via spacer groups, to the mesogenic group. These polymerizable SA additives can be polymerized in the LC medium under similar conditions as applied for the RMs in the PSA process.

Suitable SA additives to induce homeotropic alignment, especially for use in SA-VA mode displays, are disclosed for example in US 2013/0182202 A1, US 2014/0138581 A1, US 2015/0166890 A1 and US 2015/0252265 A1.

In another preferred embodiment, an LC medium or a polymer stabilised SA-VA display according to the present invention contains one or more self alignment additives selected from Table E below.

In another preferred embodiment the LC medium according to the present invention contains one or more SA additives, preferably selected from formula II or its subformulae or selected from Table E, in a concentration from 0.1 to 5%, very preferably from 0.2 to 3%, most preferably from 0.2 to 1.5%.

In another preferred embodiment, the LC media and displays according to the present invention do not contain a self alignment additive, in particular, they do not contain a compound selected from Table E below.

A preferred embodiment of the present invention relates to a process for preparing a PSA display as described above and below, comprising one or more of the following features:

- the polymerizable LC medium is irradiated by UV light in a 2-step process, including a first UV exposure step ("UV1 step"), with application of a voltage, to generate the tilt angle, and a second UV exposure step ("UV2 step"), without application of a voltage, to complete polymerization,
- the polymerizable LC medium is irradiated by UV light generated by a UV lamp having an intensity of from 0.5 $mW/cm^2$ to 10 $mW/cm^2$ in the wavelength range from 300-380 nm, preferably in the UV2 step, and optionally also in the UV1 step,
- the polymerizable LC medium is irradiated by UV light having a wavelength of ≥340 nm, and preferably ≤420 nm, very preferably in the range from 340 to 380 nm, more preferably in the range from 350 to <370 nm, most preferably in the range from 355 to 368 nm,
- the polymerizable LC medium is irradiated by UV light while a voltage is applied to the electrodes of the display,
- irradiation by UV light is carried out using a UV-LED lamp.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV irradiation can be carried out using a cut-off filter being substantially transmissive for wavelengths λ>340 nm.

Preferably, UV irradiation is carried out using a UV-LED lamp.

The use of UV-LED lamps, which have with only one narrow emission peak, in the PSA process provides several advantages, like for example a more effective optical energy transfer to the polymerizable compounds in the LC medium, depending on the choice of the suitable polymerizable compounds that shows absorption at the emission wavelength of the LED lamp. This allows reducing the UV intensity and/or the UV irradiation time, thus enabling a reduced tact time and savings in energy and production costs. Another advantage is that the narrow emission spectrum of the lamp allows an easier selection of the appropriate wavelength for photopolymerization.

Very preferably, the UV light source is an UV-LED lamp emitting a wavelength in the range from 340 to 400 nm, more preferably in the range from 340 to 380 nm. UV-LED lamps emitting UV light with a wavelength of 365 nm are especially preferred.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

The LC medium according to the present invention may additionally comprise one or more further components or additives, preferably selected from the list including but not limited to co-monomers, chiral dopants, polymerization initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colorants, dyes, pigments and nanoparticles.

The further additives may be polymerizable or non-polymerizable. Polymerizable additives are accordingly ascribed to the polymerizable component or component A). Non-polymerizable additives are accordingly ascribed to the non-polymerizable component or component B).

The LC medium has preferably a nematic LC phase.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Table A below.

TABLE A

In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.

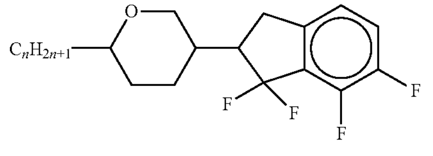

AIK-n-F

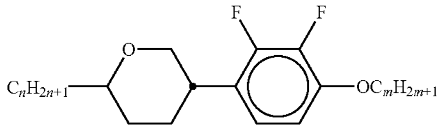

AIY-n-Om

TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
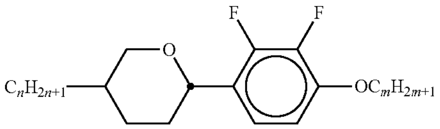
AY-n-Om
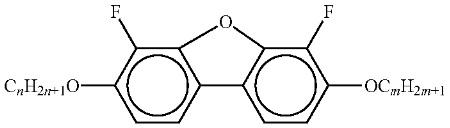
B-nO-Om
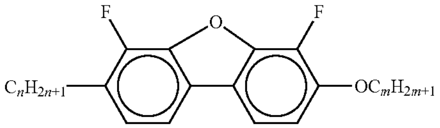
B-n-Om
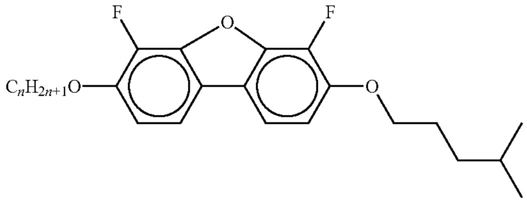
B-nO-O5i
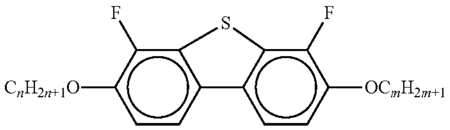
B(S)-nO-Om
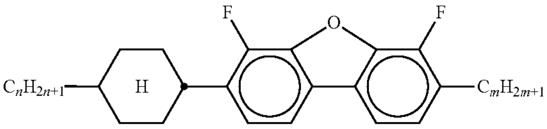
CB-n-m
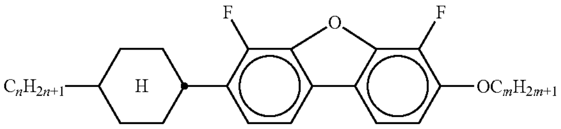
CB-n-Om
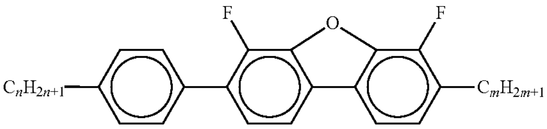
PB-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
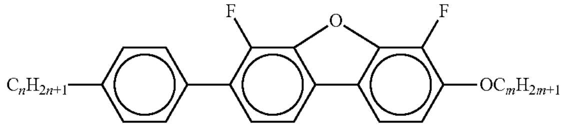
PB-n-Om
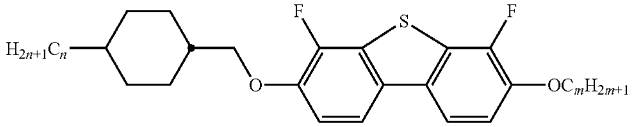
COB(S)-n-Om
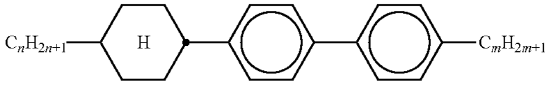
BCH-nm, CPP-n-m
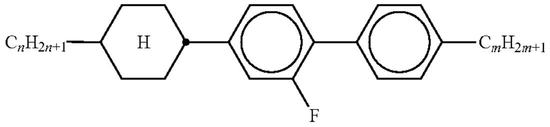
BCH-nmF
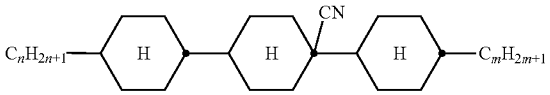
BCN-nm
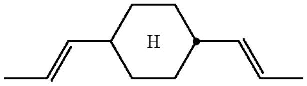
C-1V-V1
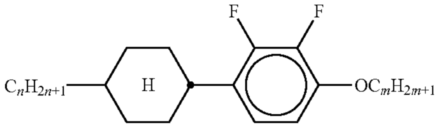
CY-n-Om
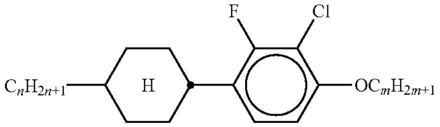
CY(F,Cl)-n-Om
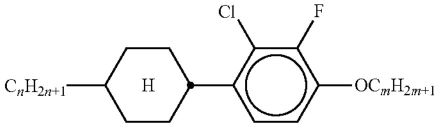
CY(Cl,F)-n-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
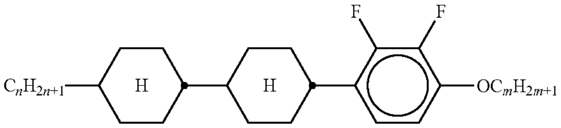
CCY-n-Om
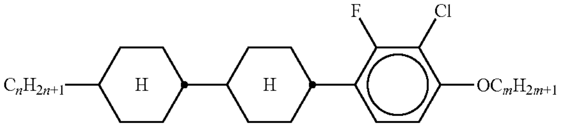
CCY(F,Cl)-n-Om
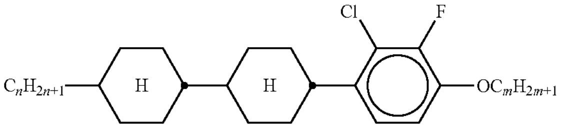
CCY(Cl,F)-n-Om
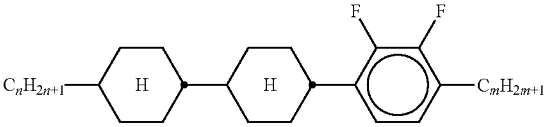
CCY-n-m
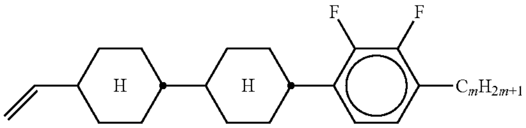
CCY-V-m
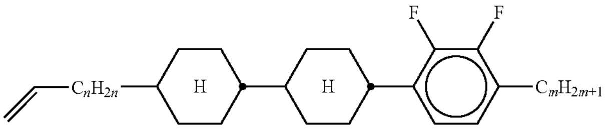
CCY-Vn-m
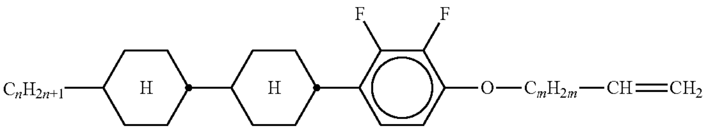
CCY-n-OmV
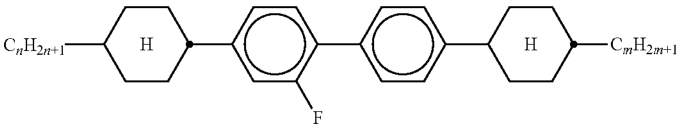
CBC-nmF
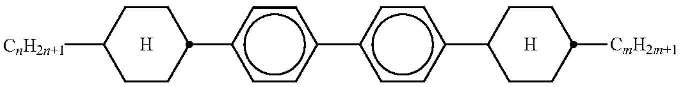
CBC-nm TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
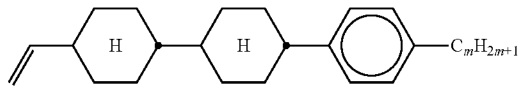
CCP-V-m
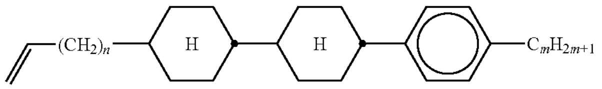
CCP-Vn-m
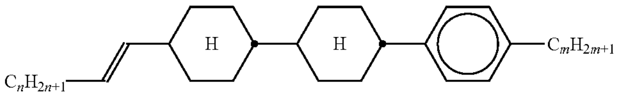
CCP-nV-m
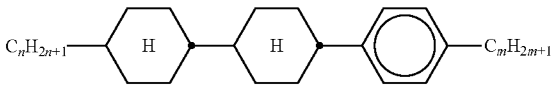
CCP-n-m
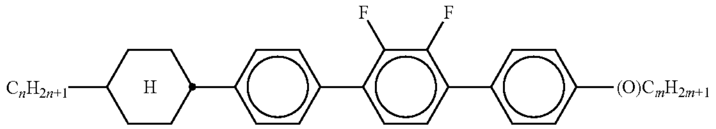
CPYP-n-(O)m
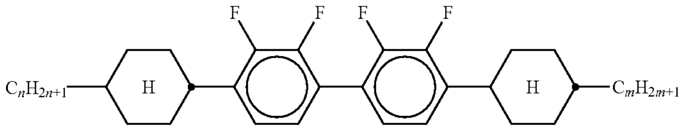
CYYC-n-m
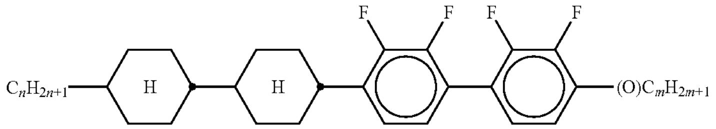
CCYY-n-(O)m
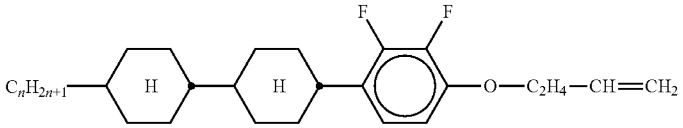
CCY-n-O2V
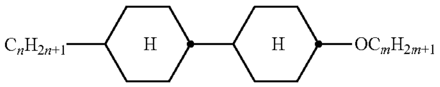
CCH-nOm, CC-n-Om
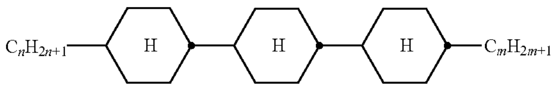
CCC-n-m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
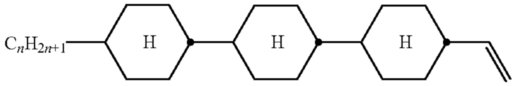
CCC-n-V
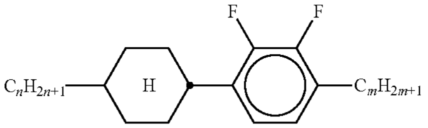
CY-n-m
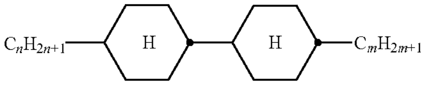
CCH-nm, CC-n-m
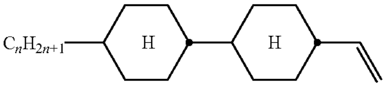
CC-n-V
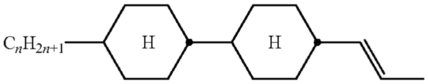
CC-n-V1
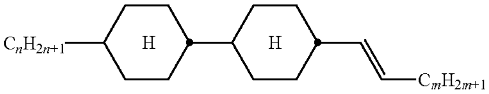
CC-n-Vm
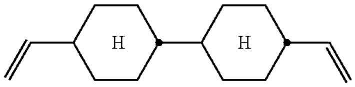
CC-V-V
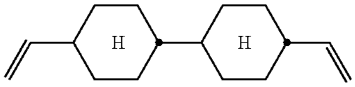
CC-V-V1
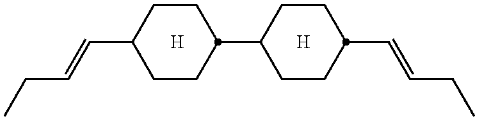
CC-2V-V2
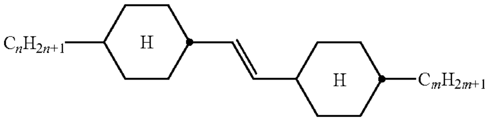
CVC-n-m TABLE A-continued
| |
|---|
| In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$. |
| 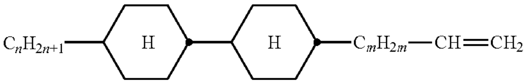 |
| CC-n-mV |
| 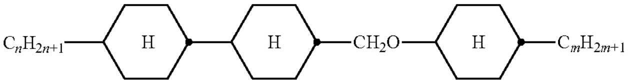 |
| CCOC-n-m |
| 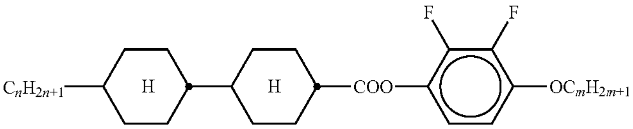 |
| CP-nOmFF |
| 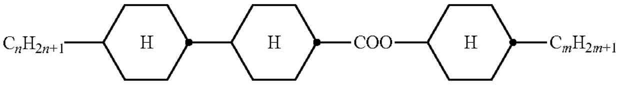 |
| CH-nm |
| 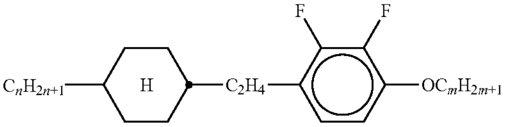 |
| CEY-n-Om |
| 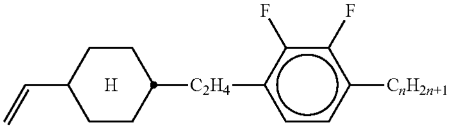 |
| CEY-V-n |
| 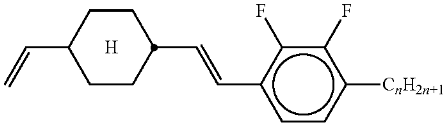 |
| CVY-V-n |
| 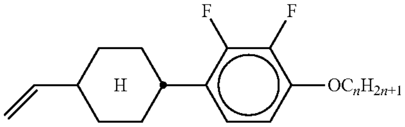 |
| CY-V-On |
| 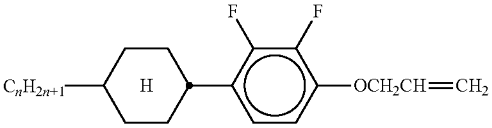 |
| CY-n-O1V |

TABLE A-continued
| In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$. |
|---|
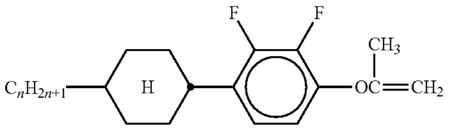
CY-n-OC(CH3)=CH2
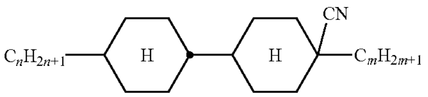
CCN-nm
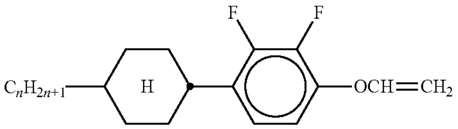
CY-n-OV
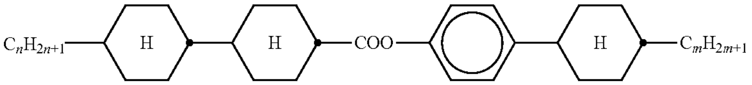
CCPC-nm
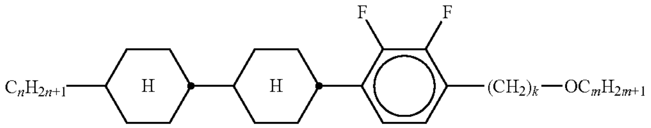
CCY-n-kOm
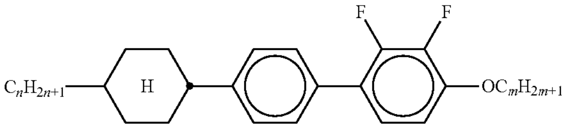
CPY-n-Om
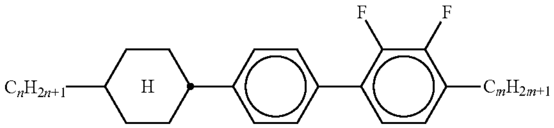
CPY-n-m
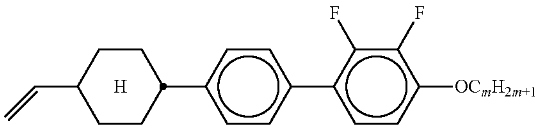
CPY-V-Om
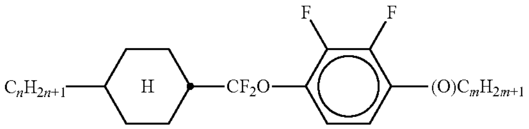
CQY-n-(O)m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
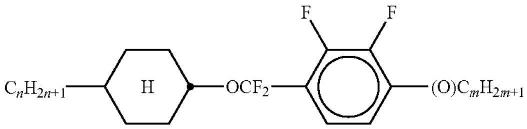
CQIY-n-(O)m
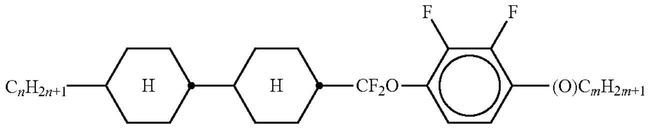
CCQY-n-(O)m
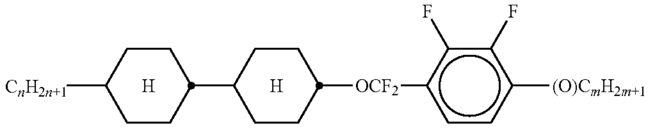
CCQIY-n-(O)m
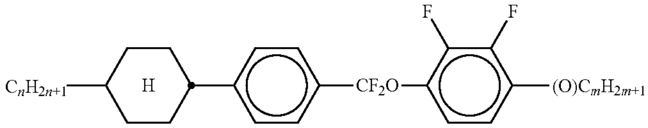
CPQY-n-(O)m
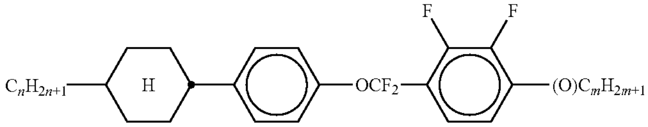
CPQIY-n-(O)m
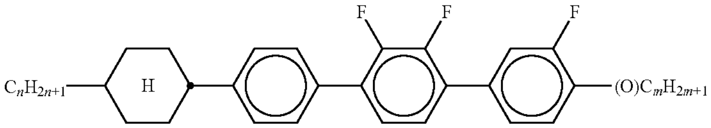
CPYG-n-(O)m
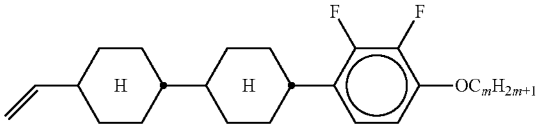
CCY-V-Om
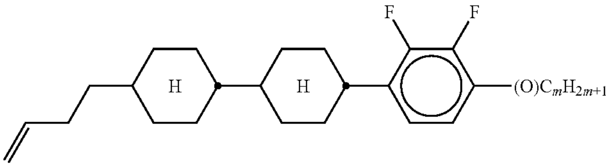
CCY-V2-(O)m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
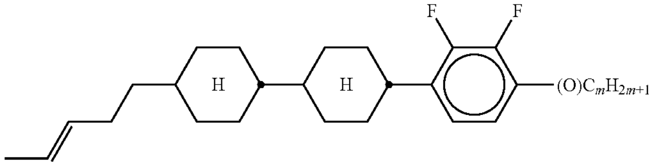
CCY-1V2-(O)m
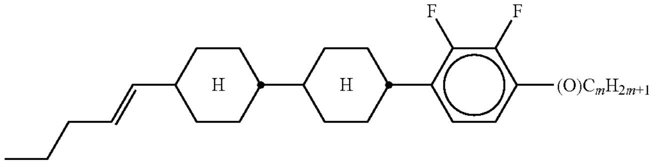
CCY-3V-(O)m
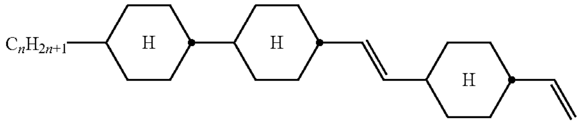
CCVC-n-V
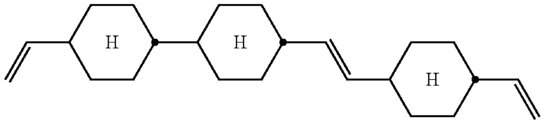
CCVC-V-V
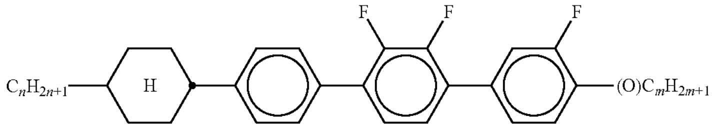
CPYG-n-(O)m
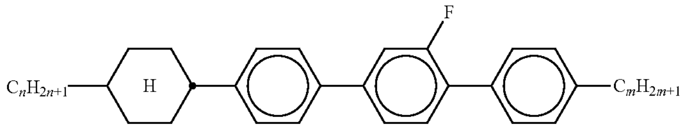
CPGP-n-m
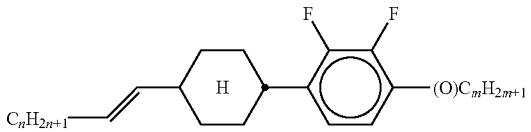
CY-nV-(O)m
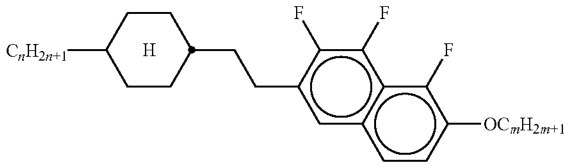
CENaph-n-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
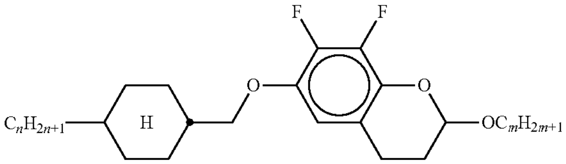
COChrom-n-Om
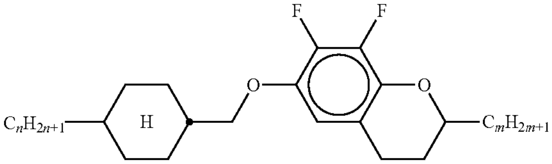
COChrom-n-m
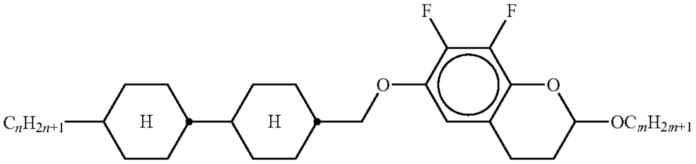
CCOChrom-n-Om
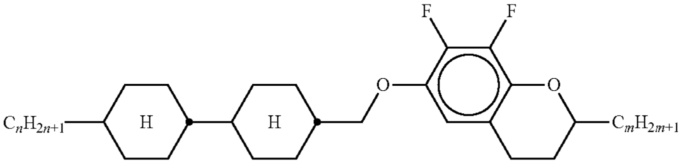
CCOChrom-n-m
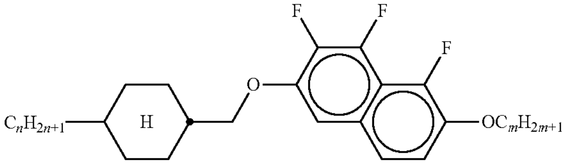
CONaph-n-Om
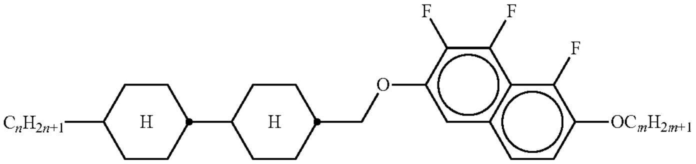
CCONaph-n-Om
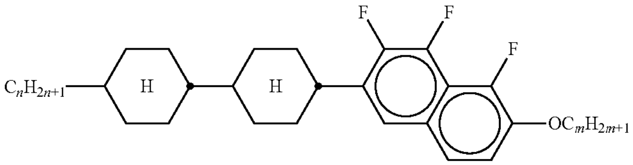
CCNaph-n-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
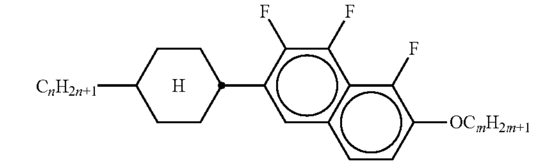
CNaph-n-Om
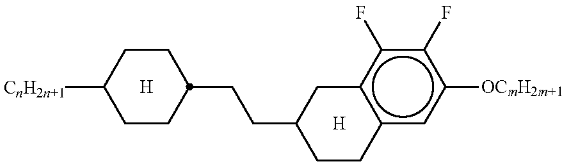
CETNaph-n-Om
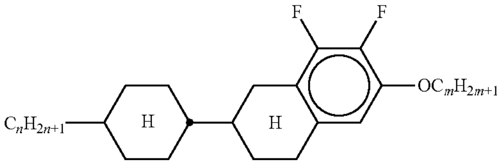
CTNaph-n-Om
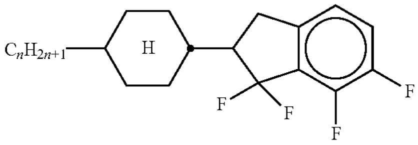
CK-n-F
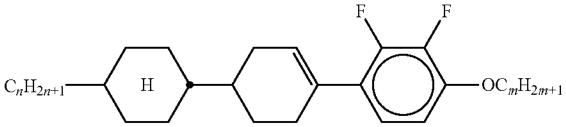
CLY-n-Om
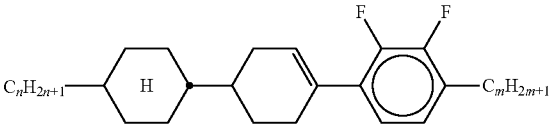
CLY-n-m
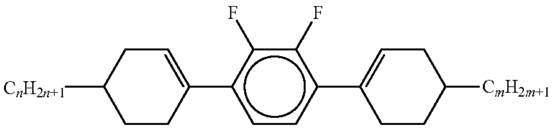
LYLI-n-m
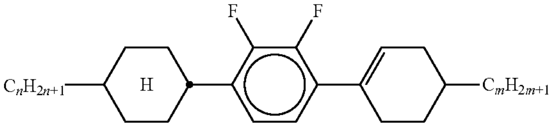
CYLI-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
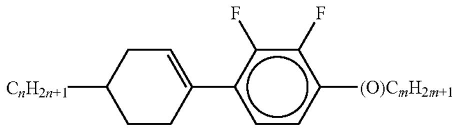
LY-n-(O)m
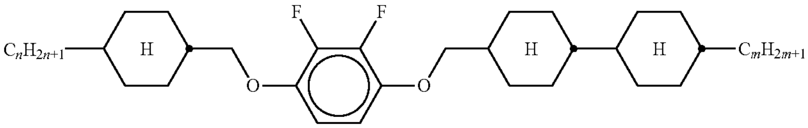
COYOICC-n-m
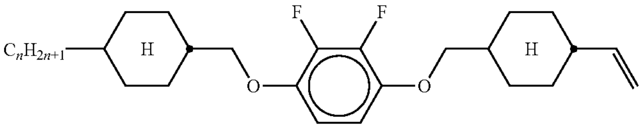
COYOIC-n-V
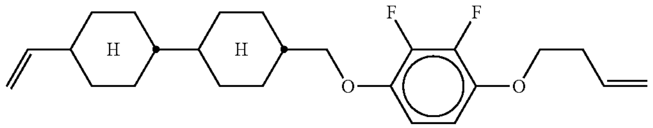
CCOY-V-O2V
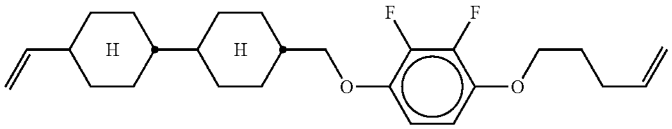
CCOY-V-O3V
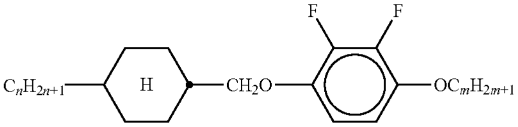
COY-n-Om
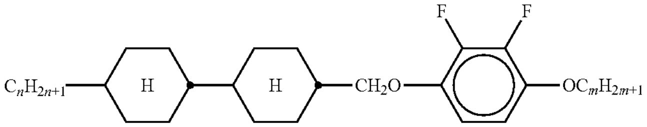
CCOY-n-Om
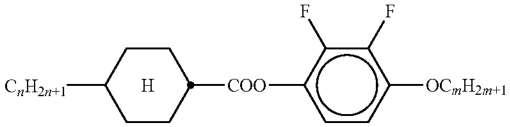
D-nOmFF
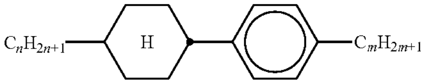
PCH-nm, CP-n-m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
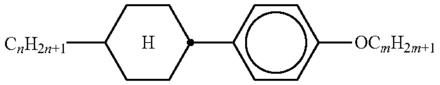
PCH-nOm, CP-n-Om
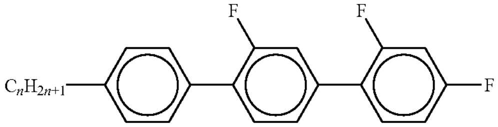
PGIGI-n-F
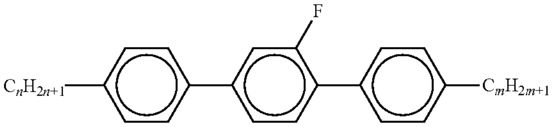
PGP-n-m
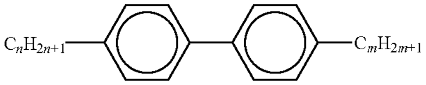
PP-n-m
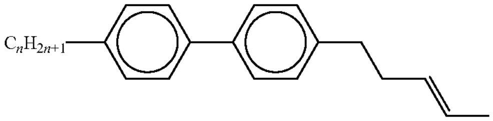
PP-n-2V1
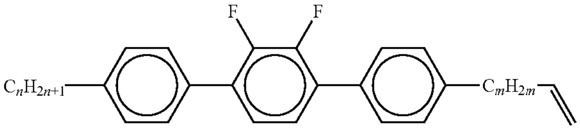
PYP-n-mV
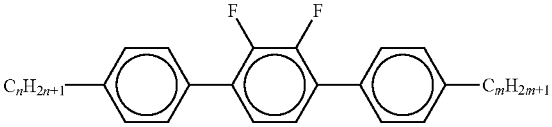
PYP-n-m
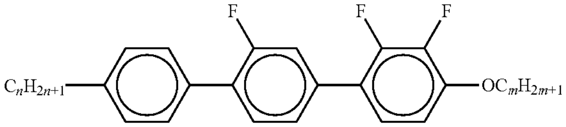
PGIY-n-Om
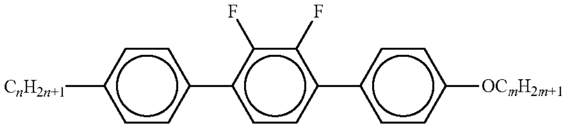
PYP-n-Om TABLE A-continued
| |
|---|
| In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$. |
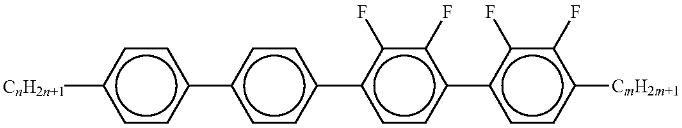
PPYY-n-m
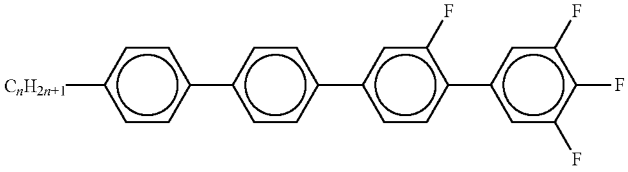
PPGU-n-F
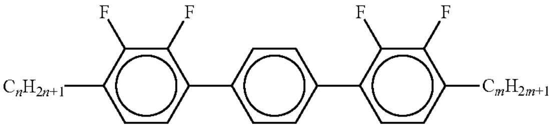
YPY-n-m
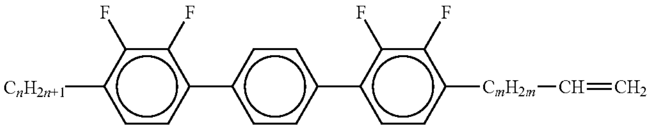
YPY-n-mV
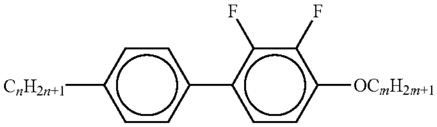
PY-n-Om
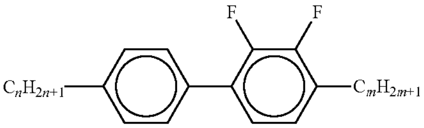
PY-n-m
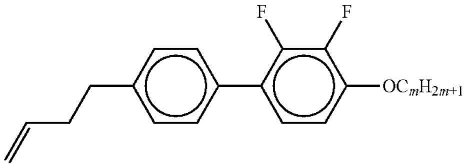
PY-V2-Om
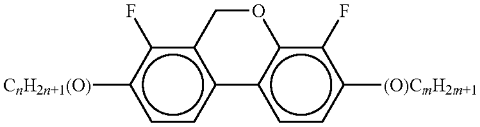
DFDBC-n(O)-(O)m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
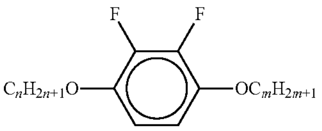
Y-nO-Om
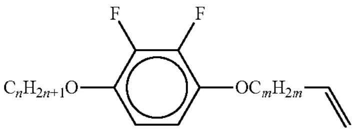
Y-nO-OmV
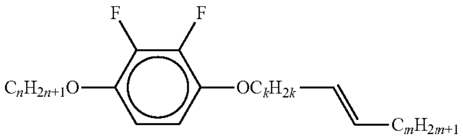
Y-nO-OkVm
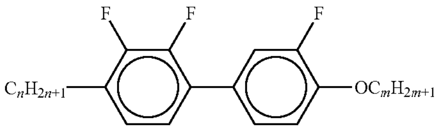
YG-n-Om
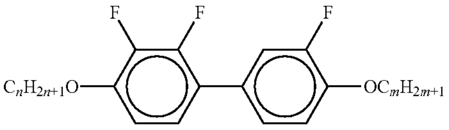
YG-nO-Om
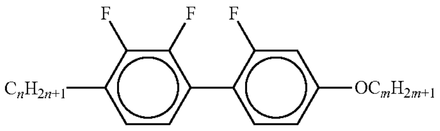
YGI-n-Om
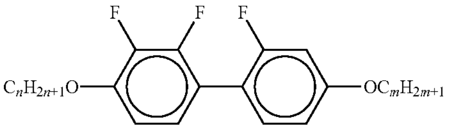
YGI-nO-Om
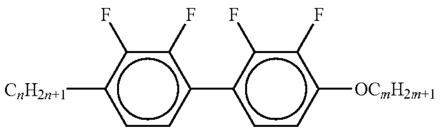
YY-n-Om TABLE A-continued In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.

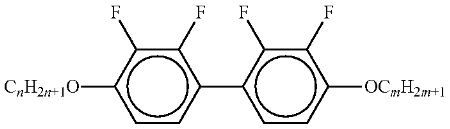

YY-nO-Om

In a first preferred embodiment of the present invention, the LC media according to the invention, especially those with positive dielectric anisotropy, comprise one or more compounds selected from the group consisting of compounds from Table A1.

In a second preferred embodiment of the present invention, the LC media according to the invention, especially those with negative dielectric anisotropy, comprise one or more compounds selected from the group consisting of compounds from Table A2.

TABLE B

Table B shows possible chiral dopants that can be added to the LC media according to the invention.

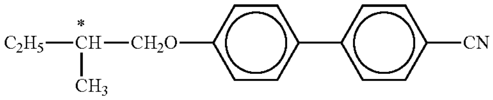

C 15

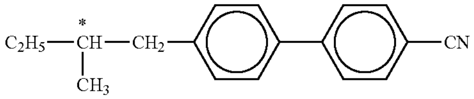

CB 15

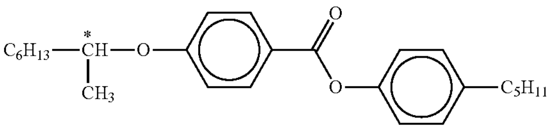

CM 21

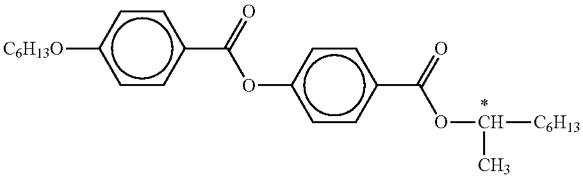

R/S-811

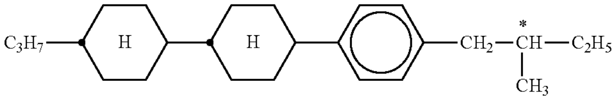

CM 44

TABLE B-continued
| Table B shows possible chiral dopants that can be added to the LC media according to the invention. |
|---|
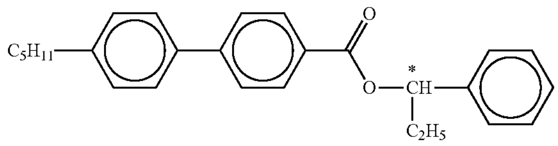
CM 45
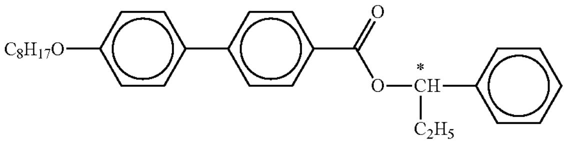
CM 47
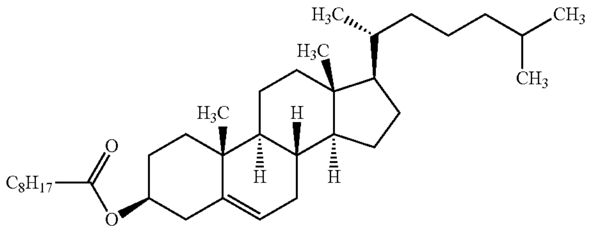
CN
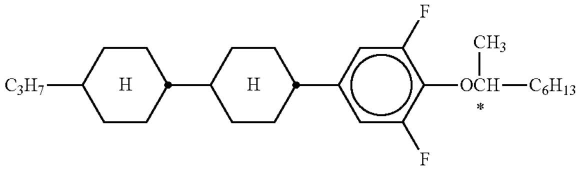
R/S-2011
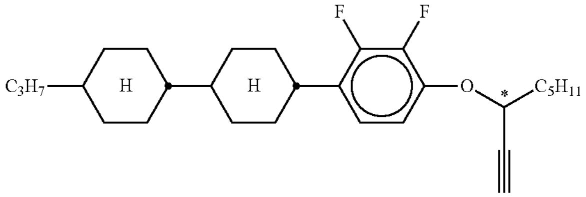
R/S-3011
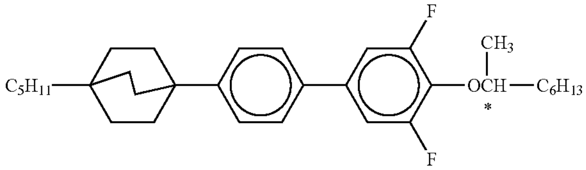
R/S-4011
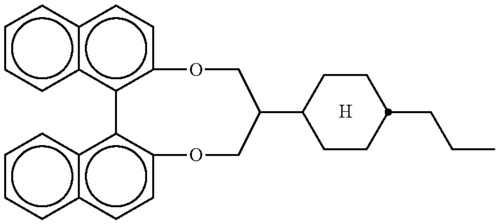
R/S-5011

TABLE B-continued

Table B shows possible chiral dopants that can be added to the LC media according to the invention.

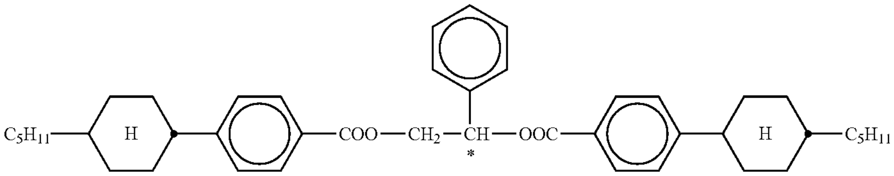

R/S-1011

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

Table C shows possible stabilizers that can be added to the LC media according to the invention. Therein n denotes an integer from 1 to 12, preferably 1, 2, 3, 4, 5, 6, 7 or 8, and terminal methyl groups are not shown.

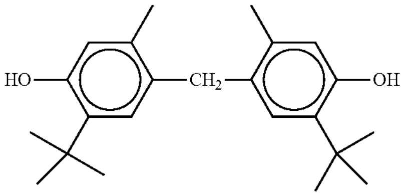

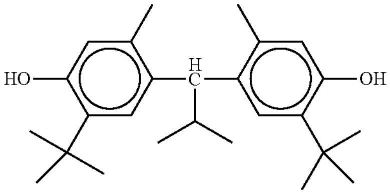

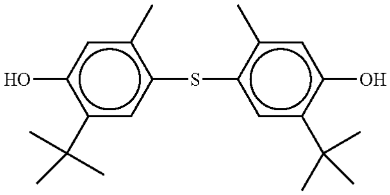

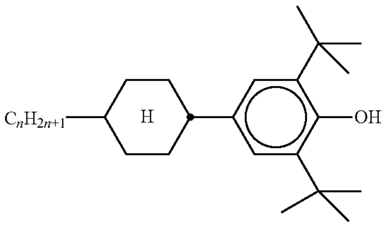

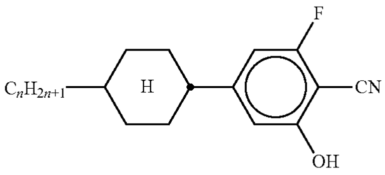

TABLE C-continued
| Table C shows possible stabilizers that can be added to the LC media according to the invention. Therein n denotes an integer from 1 to 12, preferably 1, 2, 3, 4, 5, 6, 7 or 8, and terminal methyl groups are not shown. |
| --- |
| 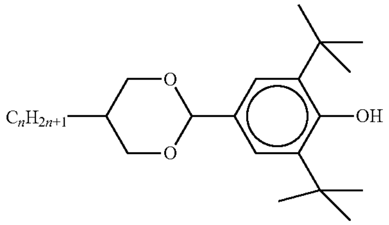 |
| 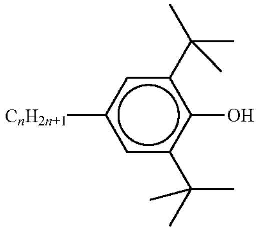 |
| 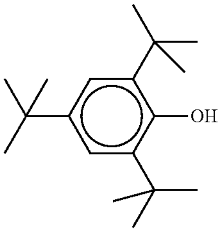 |
| 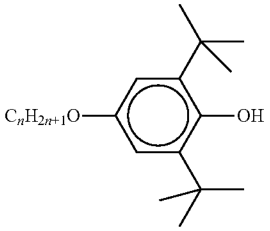 |
| 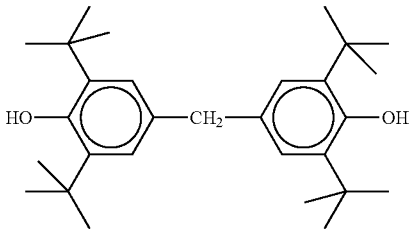 |
| 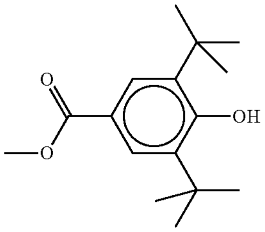 |

TABLE C-continued
Table C shows possible stabilizers that can be added to the LC media according to the invention. Therein n denotes an integer from 1 to 12, preferably 1, 2, 3, 4, 5, 6, 7 or 8, and terminal methyl groups are not shown.
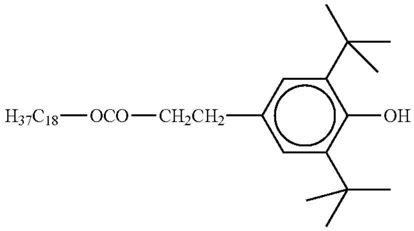
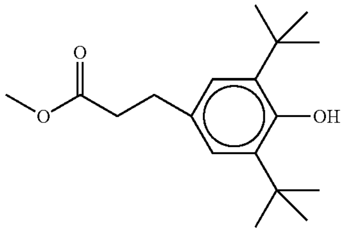
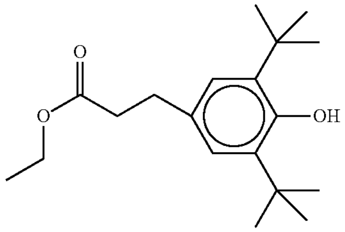
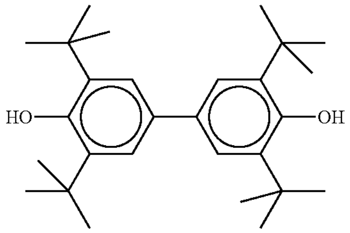
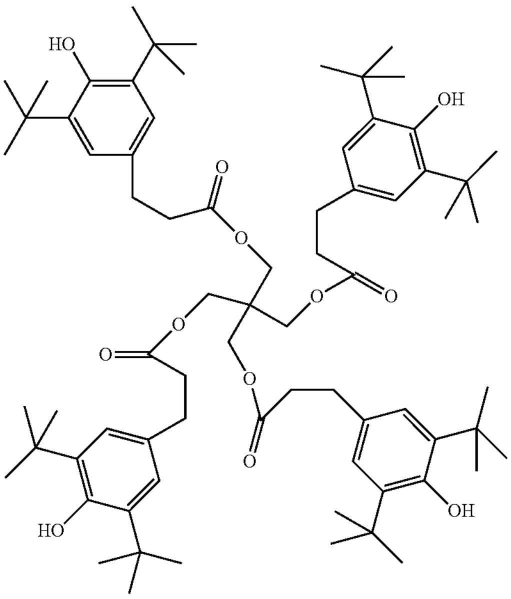 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
| Table C shows possible stabilizers that can be added to the LC media according to the invention. Therein n denotes an integer from 1 to 12, preferably 1, 2, 3, 4, 5, 6, 7 or 8, and terminal methyl groups are not shown. |
|---|
| 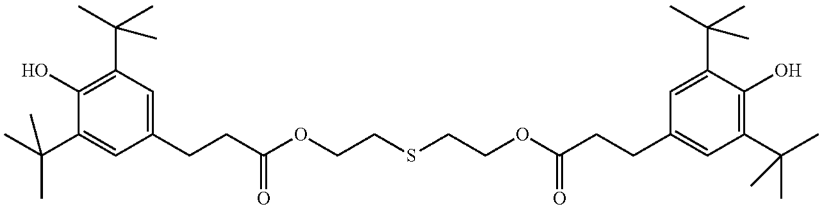 [SMILES: CC(C)(C)c1cc(CCC(=O)OCCSCCOC(=O)CCc2cc(C(C)(C)C)c(O)c(C(C)(C)C)c2)cc(C(C)(C)C)c1O] |
| 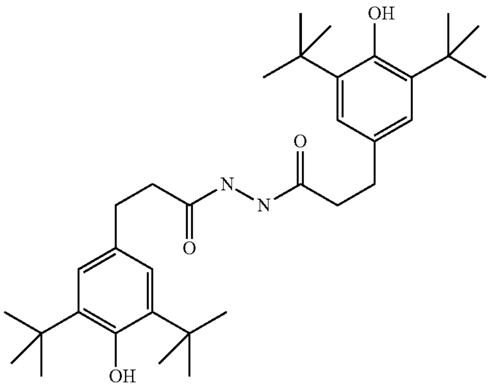 [SMILES: CC(C)(C)c1cc(CCC(=O)NNC(=O)CCc2cc(C(C)(C)C)c(O)c(C(C)(C)C)c2)cc(C(C)(C)C)c1O] |
| 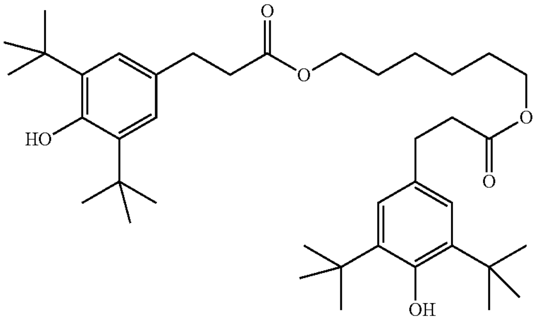 [SMILES: CC(C)(C)c1cc(CCC(=O)OCCCCCCOC(=O)CCc2cc(C(C)(C)C)c(O)c(C(C)(C)C)c2)cc(C(C)(C)C)c1O] |
| 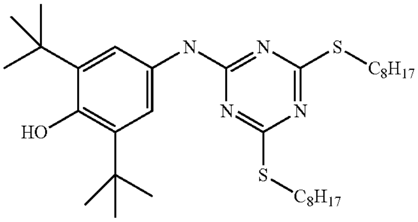 |

TABLE C-continued
Table C shows possible stabilizers that can be added to the LC media according to the invention. Therein n denotes an integer from 1 to 12, preferably 1, 2, 3, 4, 5, 6, 7 or 8, and terminal methyl groups are not shown.
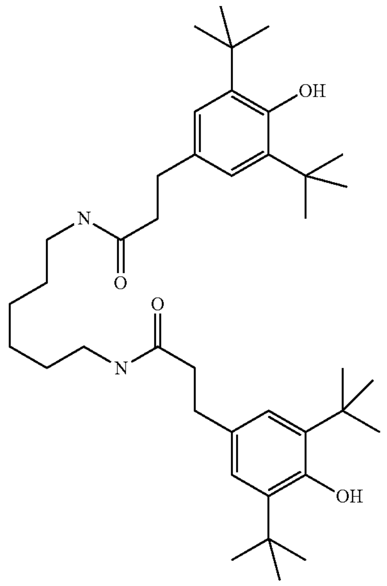 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
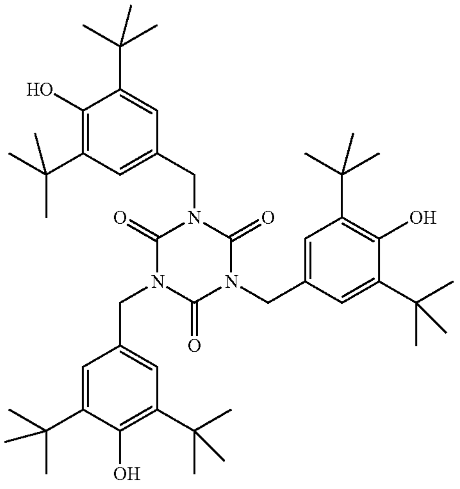 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
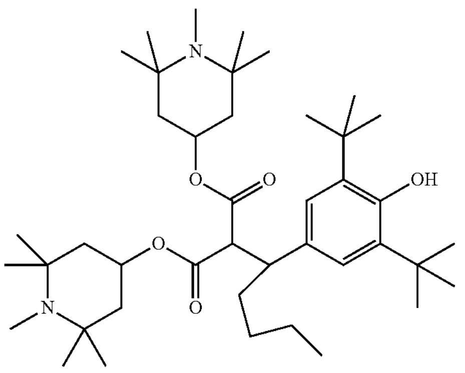 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
| Table C shows possible stabilizers that can be added to the LC media according to the invention. Therein n denotes an integer from 1 to 12, preferably 1, 2, 3, 4, 5, 6, 7 or 8, and terminal methyl groups are not shown. |
| --- |
| 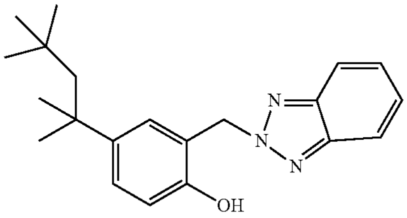 [SMILES: CC(C)(C)CC(C)(C)c1ccc(O)c(Cn2nc3ccccc3n2)c1] |
| 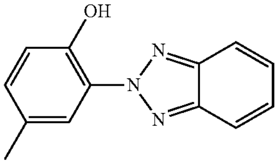 [SMILES: Cc1ccc(O)c(-n2nc3ccccc3n2)c1] |
| 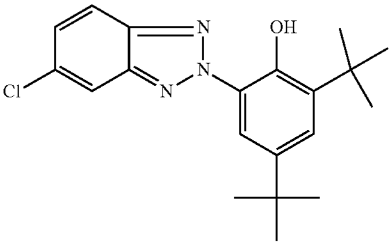 [SMILES: CC(C)(C)c1cc(-n2nc3ccc(Cl)cc3n2)c(O)c(C(C)(C)C)c1] |
| 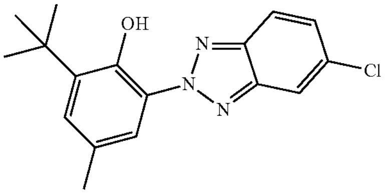 [SMILES: Cc1cc(-n2nc3ccc(Cl)cc3n2)c(O)c(C(C)(C)C)c1] |
| 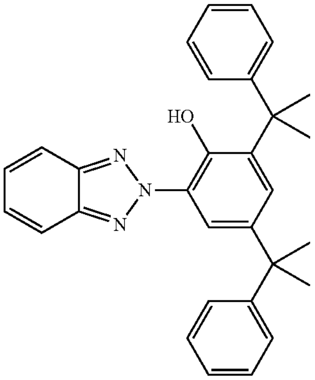 [SMILES: CC(C)(c1ccccc1)c1cc(-n2nc3ccccc3n2)c(O)c(C(C)(C)c2ccccc2)c1] |
| 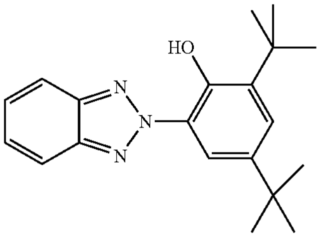 [SMILES: CC(C)(C)c1cc(-n2nc3ccccc3n2)c(O)c(C(C)(C)C)c1] |

TABLE C-continued
| Table C shows possible stabilizers that can be added to the LC media according to the invention. Therein n denotes an integer from 1 to 12, preferably 1, 2, 3, 4, 5, 6, 7 or 8, and terminal methyl groups are not shown. |
| --- |
| 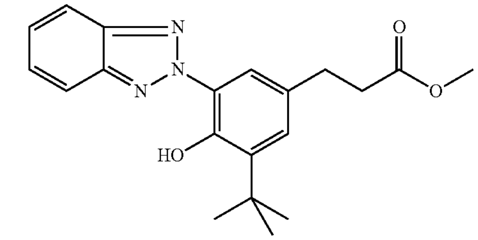 [SMILES: COC(=O)CCc1cc(-n2nc3ccccc3n2)c(O)c(C(C)(C)C)c1] |
| 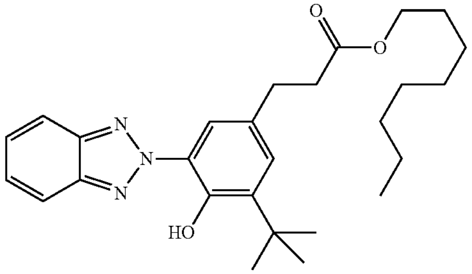 [SMILES: CCCCCCCCOC(=O)CCc1cc(-n2nc3ccccc3n2)c(O)c(C(C)(C)C)c1] |
| 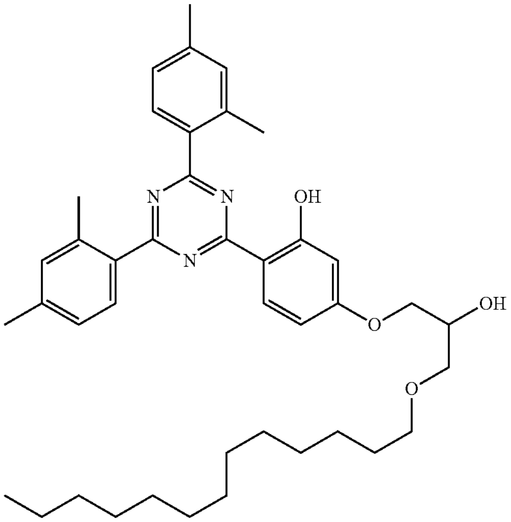 [SMILES: CCCCCCCCCCCCCOCC(O)COc1ccc(-c2nc(-c3ccc(C)cc3C)nc(-c3ccc(C)cc3C)n2)c(O)c1] |
| 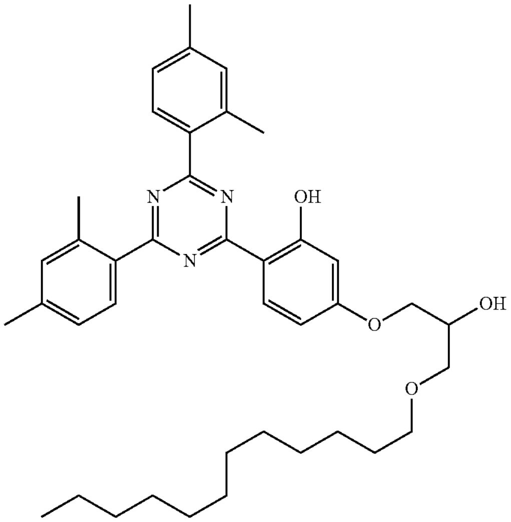 [SMILES: CCCCCCCCCCCCOCC(O)COc1ccc(-c2nc(-c3ccc(C)cc3C)nc(-c3ccc(C)cc3C)n2)c(O)c1] |

TABLE C-continued
| Table C shows possible stabilizers that can be added to the LC media according to the invention. Therein n denotes an integer from 1 to 12, preferably 1, 2, 3, 4, 5, 6, 7 or 8, and terminal methyl groups are not shown. |
|---|
| 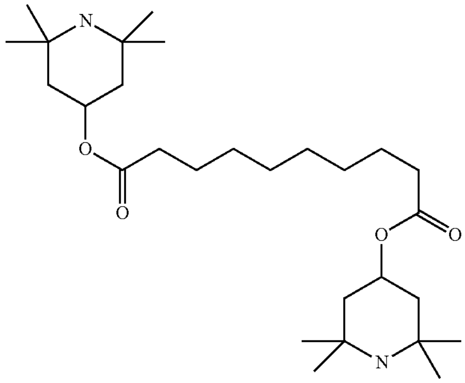 |
| 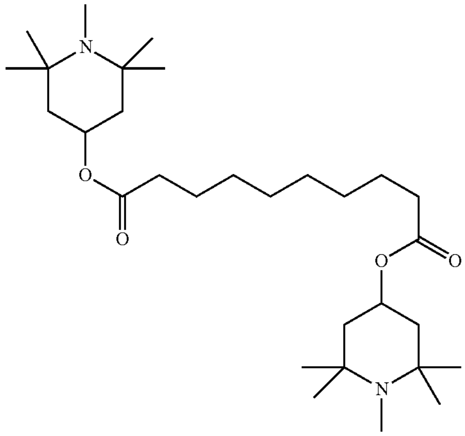 |
| 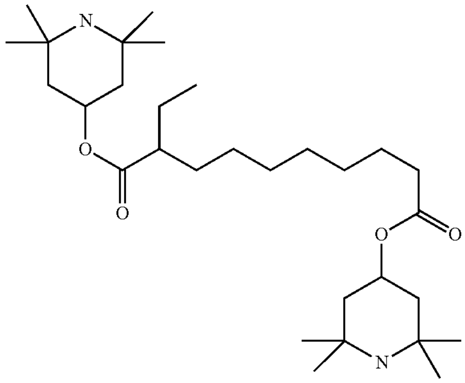 |

TABLE C-continued
| Table C shows possible stabilizers that can be added to the LC media according to the invention. Therein n denotes an integer from 1 to 12, preferably 1, 2, 3, 4, 5, 6, 7 or 8, and terminal methyl groups are not shown. |
| --- |
| 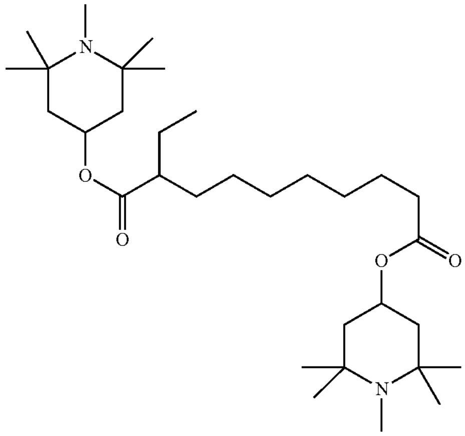 |
| 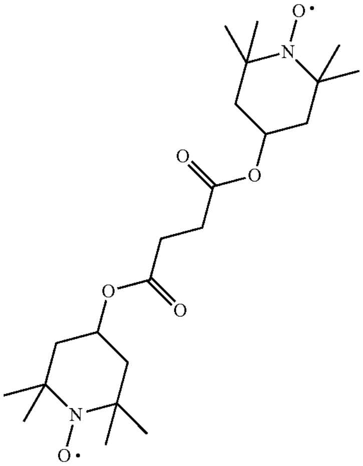 |
| 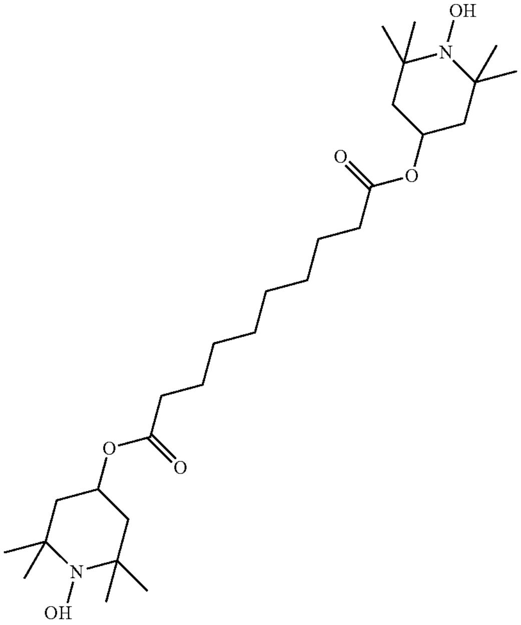 |

TABLE C-continued
| Table C shows possible stabilizers that can be added to the LC media according to the invention. Therein n denotes an integer from 1 to 12, preferably 1, 2, 3, 4, 5, 6, 7 or 8, and terminal methyl groups are not shown. |
| --- |
| 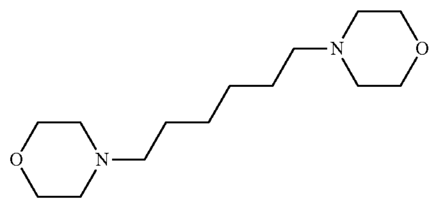 [SMILES: C(CCCN1CCOCC1)CCN1CCOCC1] |
| 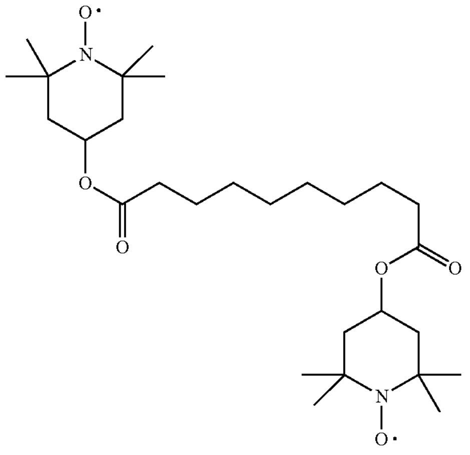 |
| 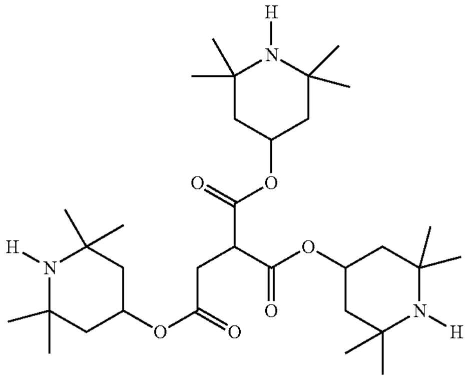 |
| 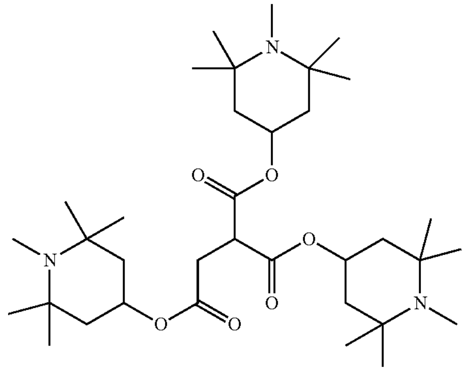 |

TABLE C-continued
| Table C shows possible stabilizers that can be added to the LC media according to the invention. Therein n denotes an integer from 1 to 12, preferably 1, 2, 3, 4, 5, 6, 7 or 8, and terminal methyl groups are not shown. |
| --- |
| 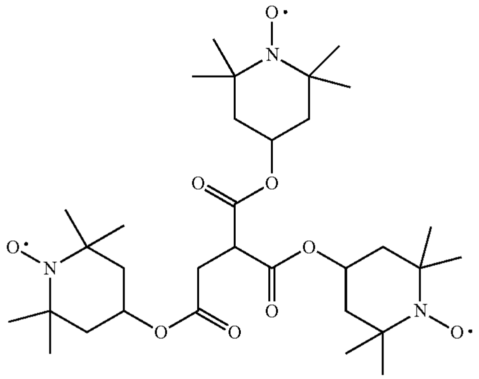 |
| 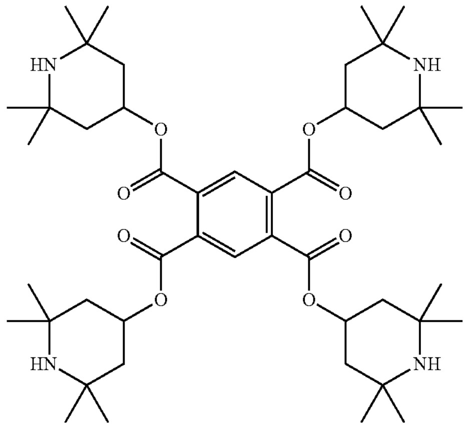 |
| 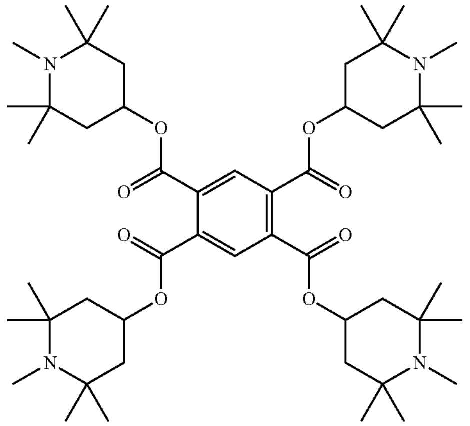 |

TABLE C-continued

Table C shows possible stabilizers that can be added to the LC media according to the invention. Therein n denotes an integer from 1 to 12, preferably 1, 2, 3, 4, 5, 6, 7 or 8, and terminal methyl groups are not shown.

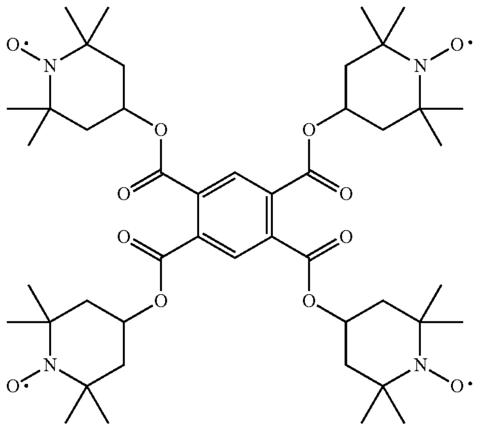

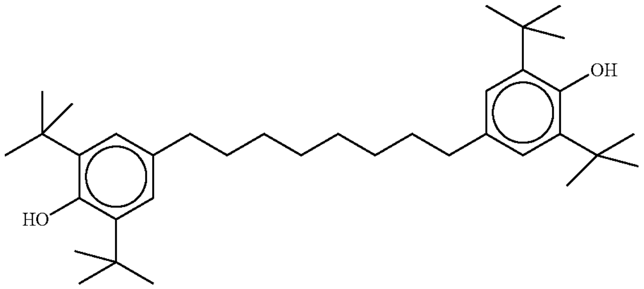

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

Table D shows illustrative reactive mesogenic compounds which can be used in the LC media in accordance with the present invention.

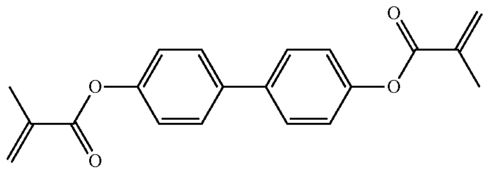 [SMILES: C=C(C)C(=O)Oc1ccc(-c2ccc(OC(=O)C(=C)C)cc2)cc1]
RM-1

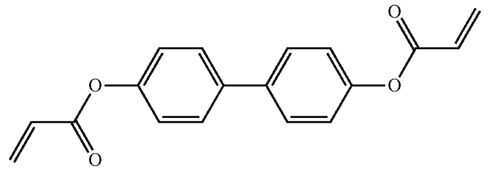 [SMILES: C=CC(=O)Oc1ccc(-c2ccc(OC(=O)C=C)cc2)cc1]
RM-2

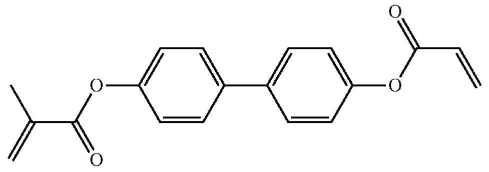 [SMILES: C=CC(=O)Oc1ccc(-c2ccc(OC(=O)C(=C)C)cc2)cc1]
RM-3

TABLE D-continued
| Table D shows illustrative reactive mesogenic compounds which can be used in the LC media in accordance with the present invention. |
|---|
RM-4
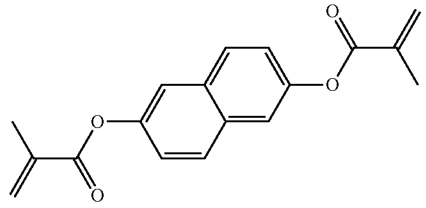 [SMILES: C=C(C)C(=O)Oc1ccc2cc(OC(=O)C(=C)C)ccc2c1]
RM-5
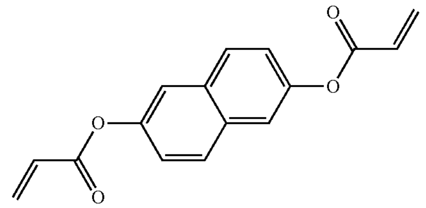 [SMILES: C=CC(=O)Oc1ccc2cc(OC(=O)C=C)ccc2c1]
RM-6
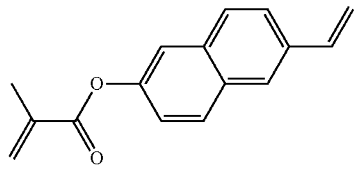 [SMILES: C=Cc1ccc2cc(OC(=O)C(=C)C)ccc2c1]
RM-7
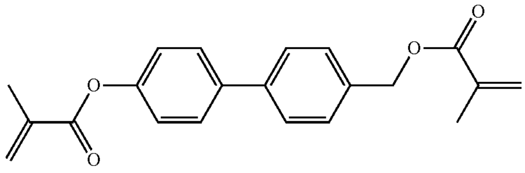 [SMILES: C=C(C)C(=O)OCc1ccc(-c2ccc(OC(=O)C(=C)C)cc2)cc1]
RM-8
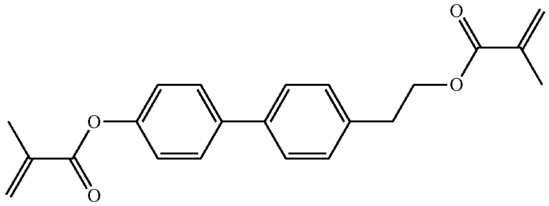 [SMILES: C=C(C)C(=O)OCCc1ccc(-c2ccc(OC(=O)C(=C)C)cc2)cc1]
RM-9
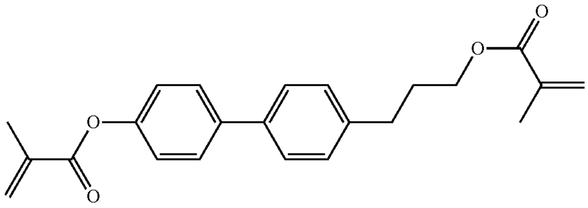 [SMILES: C=C(C)C(=O)OCCCc1ccc(-c2ccc(OC(=O)C(=C)C)cc2)cc1]
RM-10
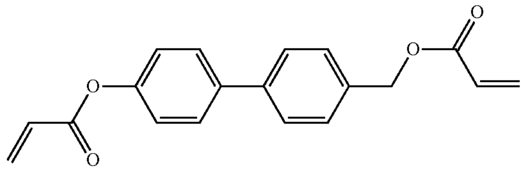 [SMILES: C=CC(=O)OCc1ccc(-c2ccc(OC(=O)C=C)cc2)cc1]

TABLE D-continued
Table D shows illustrative reactive mesogenic compounds which can be used in the LC media in accordance with the present invention.
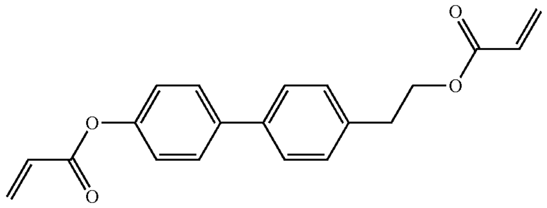 [SMILES: C=CC(=O)OCCc1ccc(-c2ccc(OC(=O)C=C)cc2)cc1]
RM-11
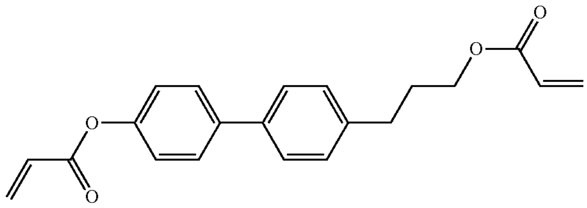 [SMILES: C=CC(=O)OCCCc1ccc(-c2ccc(OC(=O)C=C)cc2)cc1]
RM-12
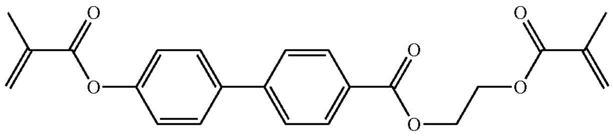 [SMILES: C=C(C)C(=O)OCCOC(=O)c1ccc(-c2ccc(OC(=O)C(=C)C)cc2)cc1]
RM-13
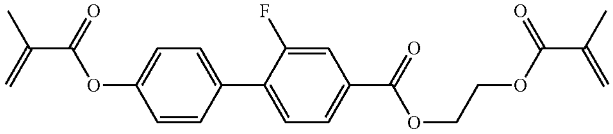 [SMILES: C=C(C)C(=O)OCCOC(=O)c1ccc(-c2ccc(OC(=O)C(=C)C)cc2)c(F)c1]
RM-14
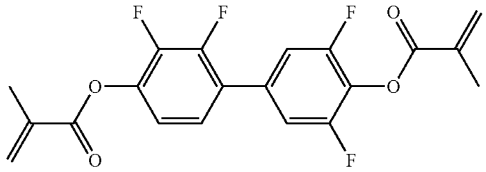 [SMILES: C=C(C)C(=O)Oc1ccc(-c2cc(F)c(OC(=O)C(=C)C)c(F)c2)c(F)c1F]
RM-15
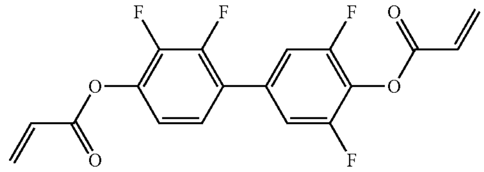 [SMILES: C=CC(=O)Oc1ccc(-c2cc(F)c(OC(=O)C=C)c(F)c2)c(F)c1F]
RM-16
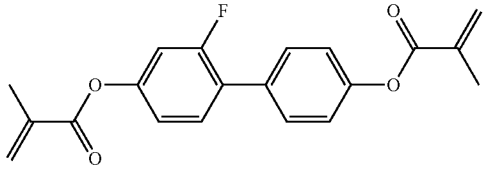 [SMILES: C=C(C)C(=O)Oc1ccc(-c2ccc(OC(=O)C(=C)C)cc2F)cc1]
RM-17
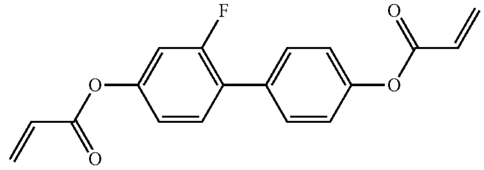 [SMILES: C=CC(=O)Oc1ccc(-c2ccc(OC(=O)C=C)cc2F)cc1]
RM-18

TABLE D-continued
Table D shows illustrative reactive mesogenic compounds which can be used in the LC media in accordance with the present invention.
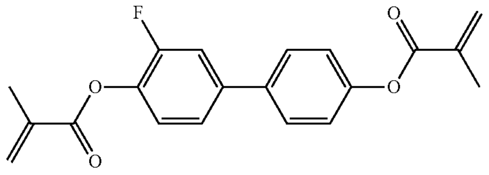 [SMILES: C=C(C)C(=O)Oc1ccc(-c2ccc(OC(=O)C(=C)C)c(F)c2)cc1]
RM-19
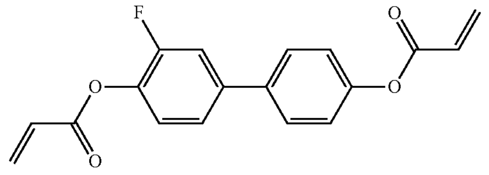 [SMILES: C=CC(=O)Oc1ccc(-c2ccc(OC(=O)C=C)c(F)c2)cc1]
RM-20
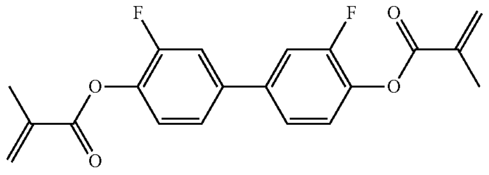 [SMILES: C=C(C)C(=O)Oc1ccc(-c2ccc(OC(=O)C(=C)C)c(F)c2)cc1F]
RM-21
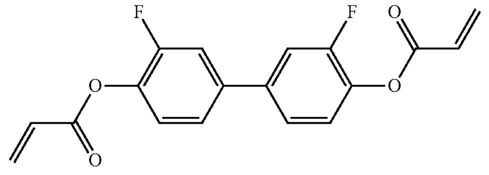 [SMILES: C=CC(=O)Oc1ccc(-c2ccc(OC(=O)C=C)c(F)c2)cc1F]
RM-22
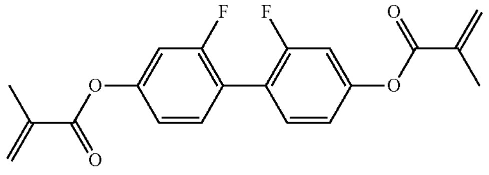 [SMILES: C=C(C)C(=O)Oc1ccc(-c2ccc(OC(=O)C(=C)C)cc2F)c(F)c1]
RM-23
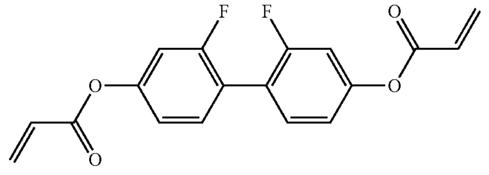 [SMILES: C=CC(=O)Oc1ccc(-c2ccc(OC(=O)C=C)cc2F)c(F)c1]
RM-24
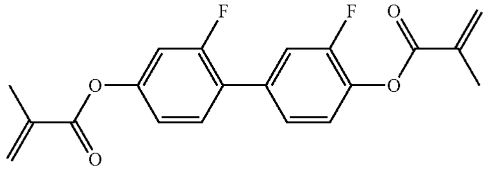 [SMILES: C=C(C)C(=O)Oc1ccc(-c2ccc(OC(=O)C(=C)C)c(F)c2)c(F)c1]
RM-25
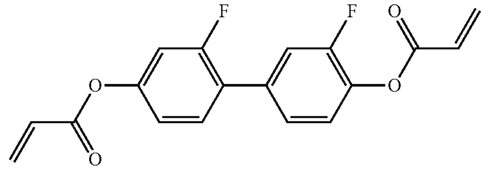
RM-26

TABLE D-continued
| Table D shows illustrative reactive mesogenic compounds which can be used in the LC media in accordance with the present invention. | |
|---|---|
| 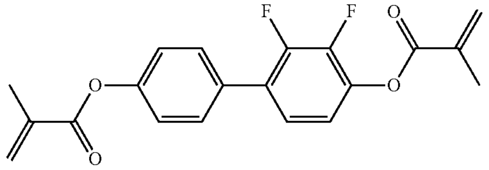 [SMILES: C=C(C)C(=O)Oc1ccc(-c2ccc(OC(=O)C(=C)C)c(F)c2F)cc1] | RM-27 |
| 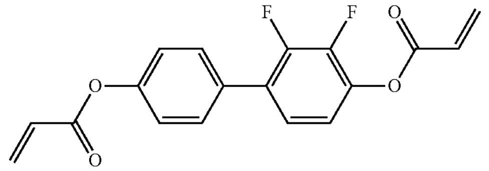 | RM-28 |
| 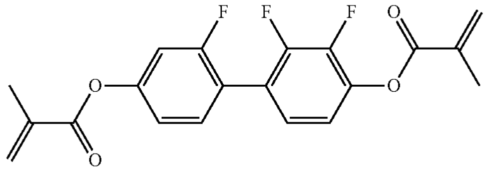 [SMILES: C=C(C)C(=O)Oc1ccc(-c2ccc(OC(=O)C(=C)C)c(F)c2F)c(F)c1] | RM-29 |
| 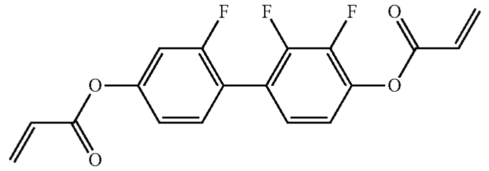 [SMILES: C=CC(=O)Oc1ccc(-c2ccc(OC(=O)C=C)c(F)c2F)c(F)c1] | RM-30 |
| 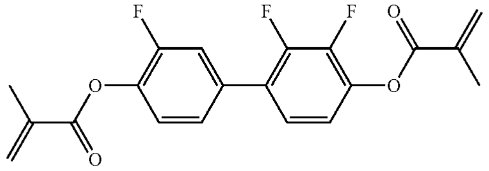 [SMILES: C=C(C)C(=O)Oc1ccc(-c2ccc(OC(=O)C(=C)C)c(F)c2F)cc1F] | RM-31 |
| 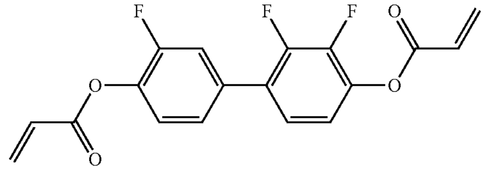 [SMILES: C=CC(=O)Oc1ccc(-c2ccc(OC(=O)C=C)c(F)c2F)cc1F] | RM-32 |
| 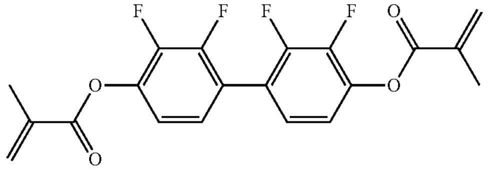 [SMILES: C=C(C)C(=O)Oc1ccc(-c2ccc(OC(=O)C(=C)C)c(F)c2F)c(F)c1F] | RM-33 |
| 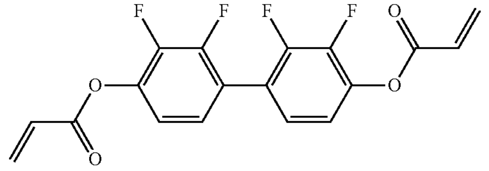 [SMILES: C=CC(=O)Oc1ccc(-c2ccc(OC(=O)C=C)c(F)c2F)c(F)c1F] | RM-34 |

TABLE D-continued
Table D shows illustrative reactive mesogenic compounds which can be used in the LC media in accordance with the present invention.
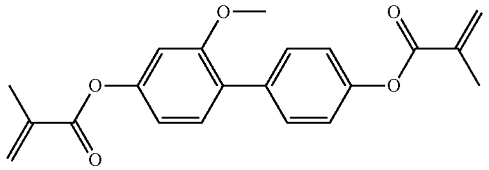 [SMILES: C=C(C)C(=O)Oc1ccc(-c2ccc(OC(=O)C(=C)C)cc2OC)cc1]
RM-35
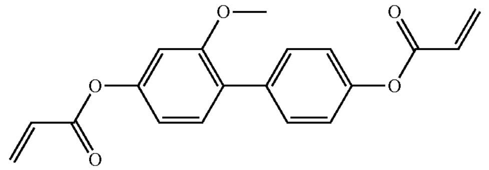 [SMILES: C=CC(=O)Oc1ccc(-c2ccc(OC(=O)C=C)cc2OC)cc1]
RM-36
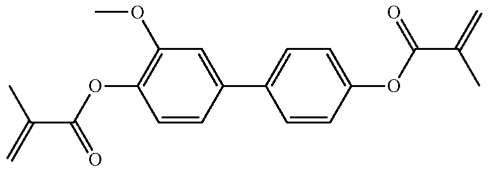 [SMILES: C=C(C)C(=O)Oc1ccc(-c2ccc(OC(=O)C(=C)C)c(OC)c2)cc1]
RM-37
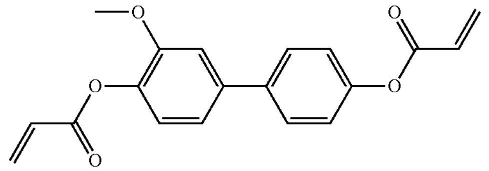 [SMILES: C=CC(=O)Oc1ccc(-c2ccc(OC(=O)C=C)c(OC)c2)cc1]
RM-38
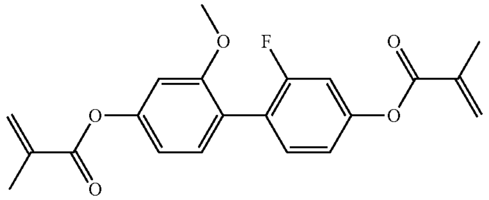 [SMILES: C=C(C)C(=O)Oc1ccc(-c2ccc(OC(=O)C(=C)C)cc2OC)c(F)c1]
RM-39
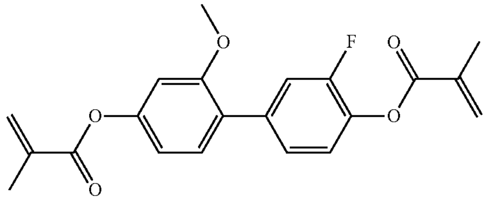 [SMILES: C=C(C)C(=O)Oc1ccc(-c2ccc(OC(=O)C(=C)C)c(F)c2)c(OC)c1]
RM-40
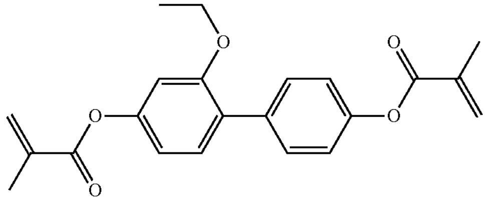 [SMILES: C=C(C)C(=O)Oc1ccc(-c2ccc(OC(=O)C(=C)C)cc2OCC)cc1]
RM-41
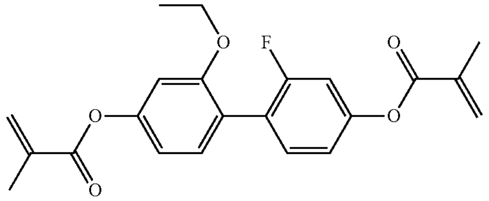 [SMILES: C=C(C)C(=O)Oc1ccc(-c2ccc(OC(=O)C(=C)C)cc2OCC)c(F)c1]
RM-42

TABLE D-continued
| Table D shows illustrative reactive mesogenic compounds which can be used in the LC media in accordance with the present invention. |
| --- |
RM-43
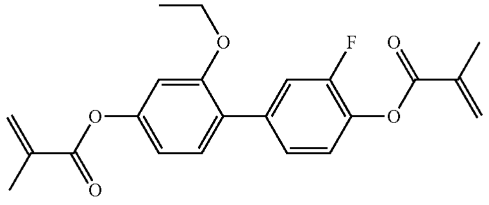 [SMILES: C=C(C)C(=O)Oc1ccc(-c2ccc(OC(=O)C(=C)C)c(F)c2)c(OCC)c1]
RM-44
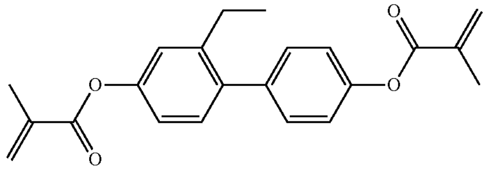 [SMILES: C=C(C)C(=O)Oc1ccc(-c2ccc(OC(=O)C(=C)C)cc2CC)cc1]
RM-45
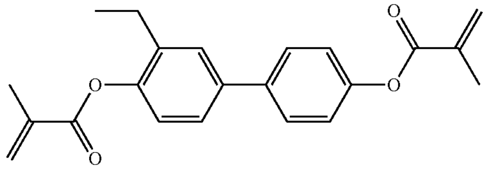 [SMILES: C=C(C)C(=O)Oc1ccc(-c2ccc(OC(=O)C(=C)C)c(CC)c2)cc1]
RM-46
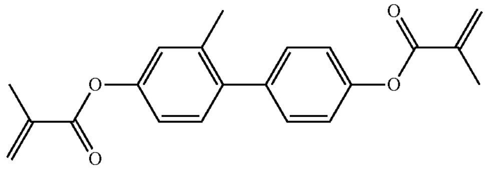 [SMILES: C=C(C)C(=O)Oc1ccc(-c2ccc(OC(=O)C(=C)C)cc2C)cc1]
RM-47
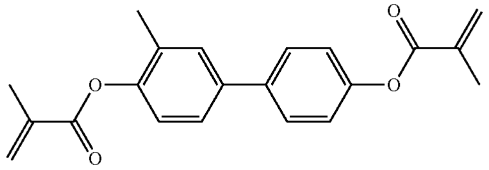 [SMILES: C=C(C)C(=O)Oc1ccc(-c2ccc(OC(=O)C(=C)C)c(C)c2)cc1]
RM-48
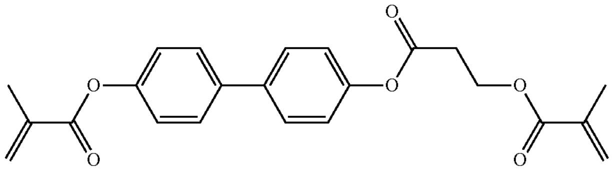
RM-49
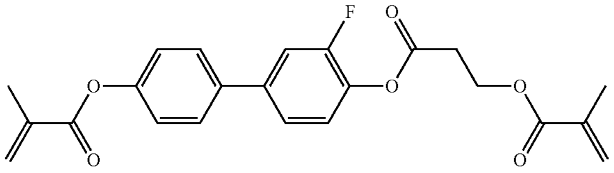 [SMILES: C=C(C)C(=O)OCCC(=O)Oc1ccc(-c2ccc(OC(=O)C(=C)C)cc2)cc1F]
RM-50
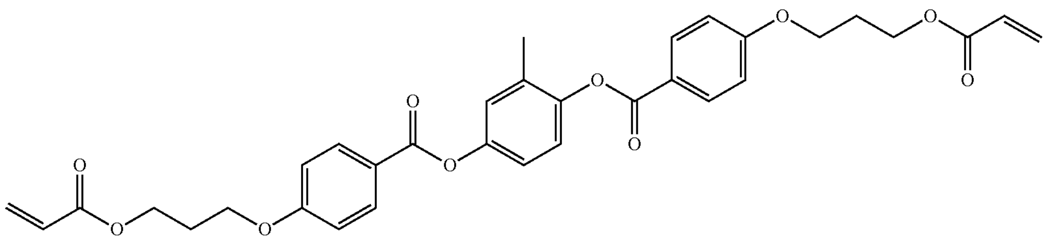 [SMILES: C=CC(=O)OCCCOc1ccc(C(=O)Oc2ccc(OC(=O)c3ccc(OCCCOC(=O)C=C)cc3)c(C)c2)cc1]

TABLE D-continued
| Table D shows illustrative reactive mesogenic compounds which can be used in the LC media in accordance with the present invention. |
|---|
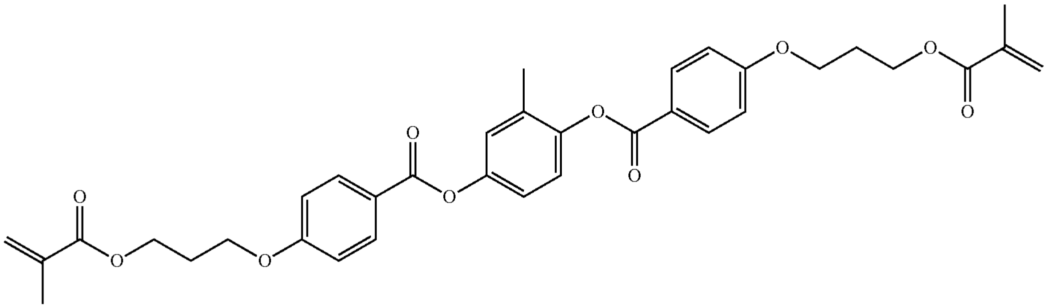 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
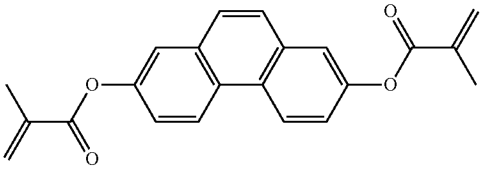 [SMILES: C=C(C)C(=O)Oc1ccc2c(ccc3cc(OC(=O)C(=C)C)ccc32)c1]
RM-52
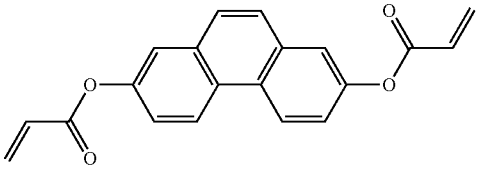 [SMILES: C=CC(=O)Oc1ccc2c(ccc3cc(OC(=O)C=C)ccc32)c1]
RM-53
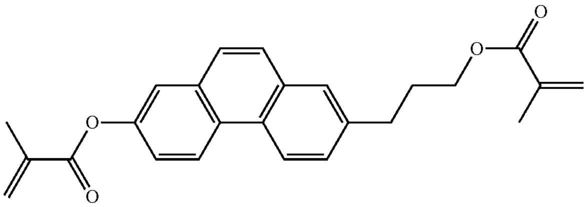 [SMILES: C=C(C)C(=O)OCCCc1ccc2c(ccc3cc(OC(=O)C(=C)C)ccc32)c1]
RM-54
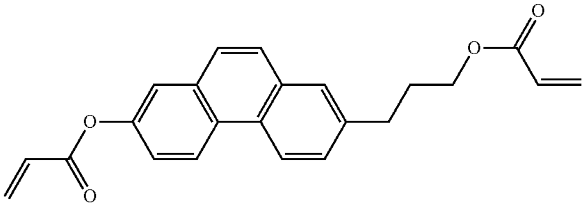 [SMILES: C=CC(=O)OCCCc1ccc2c(ccc3cc(OC(=O)C=C)ccc32)c1]
RM-55
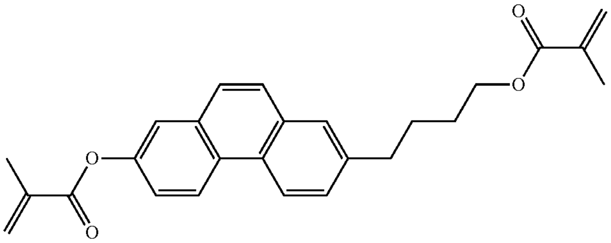 [SMILES: C=C(C)C(=O)OCCCCc1ccc2c(ccc3cc(OC(=O)C(=C)C)ccc32)c1]
RM-56
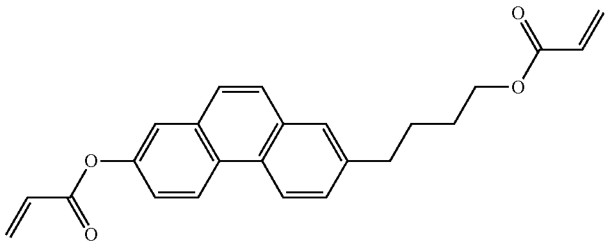 [SMILES: C=CC(=O)OCCCCc1ccc2c(ccc3cc(OC(=O)C=C)ccc32)c1]
RM-57

TABLE D-continued
Table D shows illustrative reactive mesogenic compounds which can be used in the LC media in accordance with the present invention.
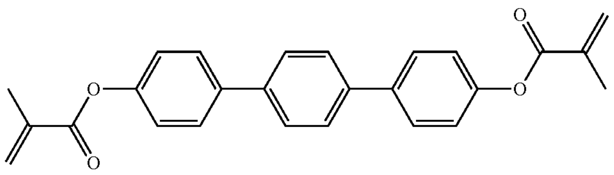 [SMILES: C=C(C)C(=O)Oc1ccc(-c2ccc(-c3ccc(OC(=O)C(=C)C)cc3)cc2)cc1]
RM-58
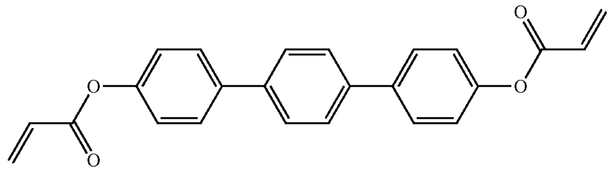 [SMILES: C=CC(=O)Oc1ccc(-c2ccc(-c3ccc(OC(=O)C=C)cc3)cc2)cc1]
RM-59
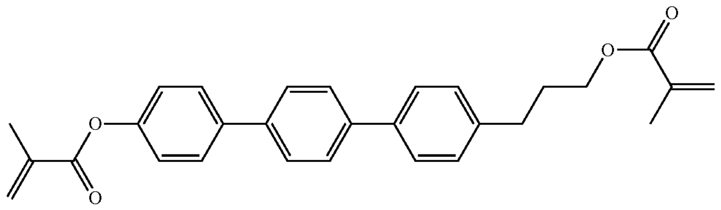 [SMILES: C=C(C)C(=O)OCCCc1ccc(-c2ccc(-c3ccc(OC(=O)C(=C)C)cc3)cc2)cc1]
RM-60
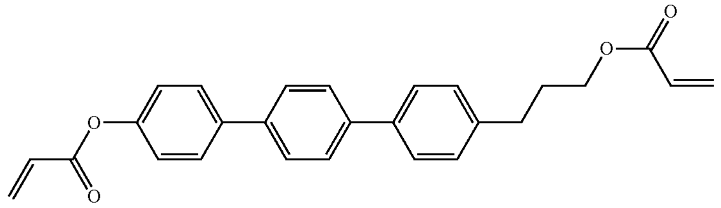 [SMILES: C=CC(=O)OCCCc1ccc(-c2ccc(-c3ccc(OC(=O)C=C)cc3)cc2)cc1]
RM-61
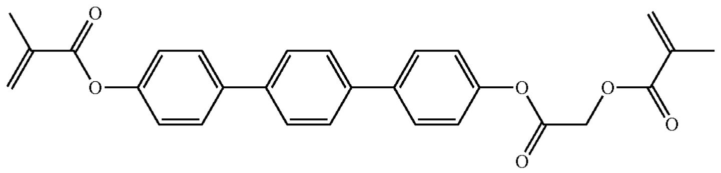 [SMILES: C=C(C)C(=O)OCC(=O)Oc1ccc(-c2ccc(-c3ccc(OC(=O)C(=C)C)cc3)cc2)cc1]
RM-62
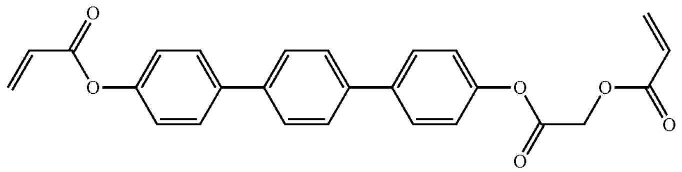 [SMILES: C=CC(=O)OCC(=O)Oc1ccc(-c2ccc(-c3ccc(OC(=O)C=C)cc3)cc2)cc1]
RM-63
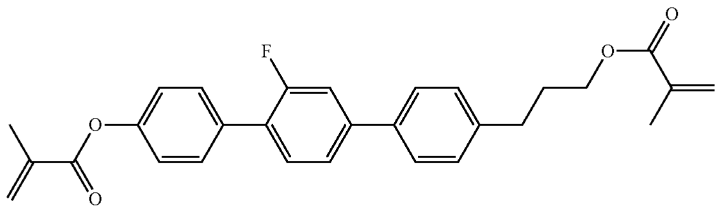 [SMILES: C=C(C)C(=O)OCCCc1ccc(-c2ccc(-c3ccc(OC(=O)C(=C)C)cc3)c(F)c2)cc1]
RM-64
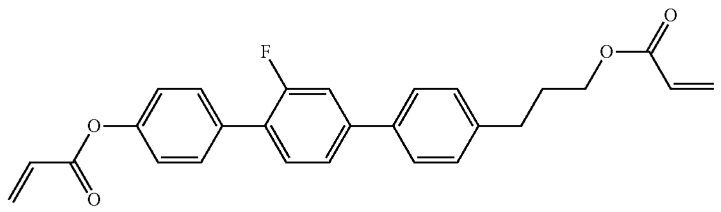 [SMILES: C=CC(=O)OCCCc1ccc(-c2ccc(-c3ccc(OC(=O)C=C)cc3)c(F)c2)cc1]
RM-65

TABLE D-continued
Table D shows illustrative reactive mesogenic compounds which can be used in the LC media in accordance with the present invention.
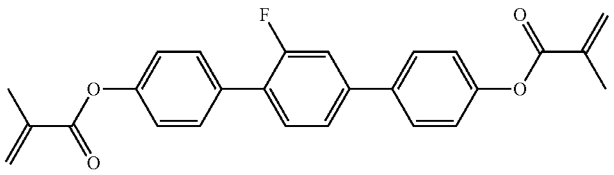 [SMILES: C=C(C)C(=O)Oc1ccc(-c2ccc(-c3ccc(OC(=O)C(=C)C)cc3)c(F)c2)cc1]
RM-66
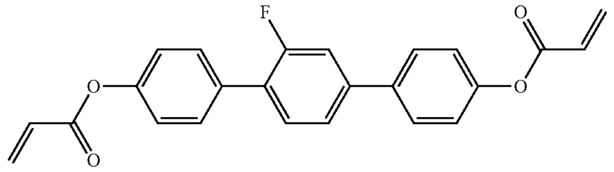 [SMILES: C=CC(=O)Oc1ccc(-c2ccc(-c3ccc(OC(=O)C=C)cc3)c(F)c2)cc1]
RM-67
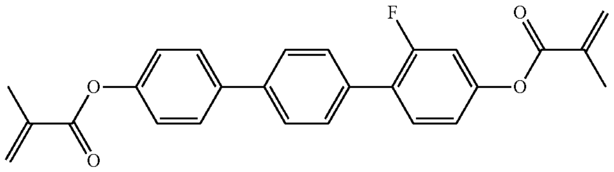 [SMILES: C=C(C)C(=O)Oc1ccc(-c2ccc(-c3ccc(OC(=O)C(=C)C)cc3F)cc2)cc1]
RM-68
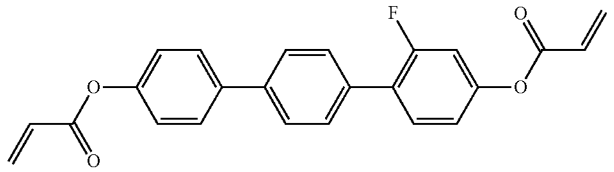 [SMILES: C=CC(=O)Oc1ccc(-c2ccc(-c3ccc(OC(=O)C=C)cc3F)cc2)cc1]
RM-69
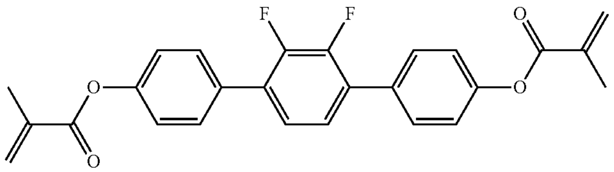 [SMILES: C=C(C)C(=O)Oc1ccc(-c2ccc(-c3ccc(OC(=O)C(=C)C)cc3)c(F)c2F)cc1]
RM-70
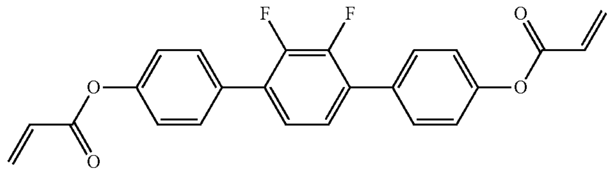 [SMILES: C=CC(=O)Oc1ccc(-c2ccc(-c3ccc(OC(=O)C=C)cc3)c(F)c2F)cc1]
RM-71
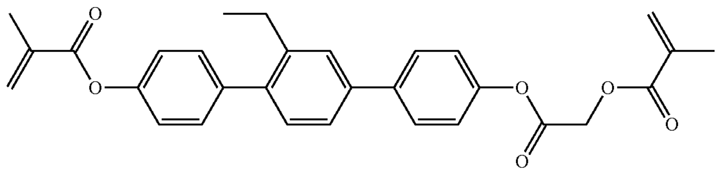 [SMILES: C=C(C)C(=O)OCC(=O)Oc1ccc(-c2ccc(-c3ccc(OC(=O)C(=C)C)cc3)c(CC)c2)cc1]
RM-72
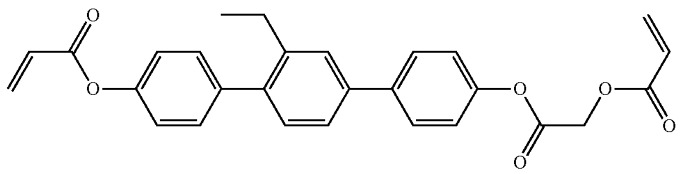 [SMILES: C=CC(=O)OCC(=O)Oc1ccc(-c2ccc(-c3ccc(OC(=O)C=C)cc3)c(CC)c2)cc1]
RM-73
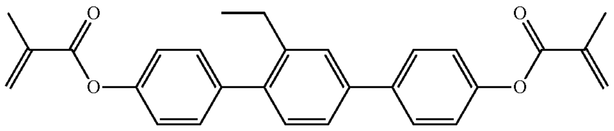 [SMILES: C=C(C)C(=O)Oc1ccc(-c2ccc(-c3ccc(OC(=O)C(=C)C)cc3)c(CC)c2)cc1]
RM-74

TABLE D-continued
| Table D shows illustrative reactive mesogenic compounds which can be used in the LC media in accordance with the present invention. |
| --- |
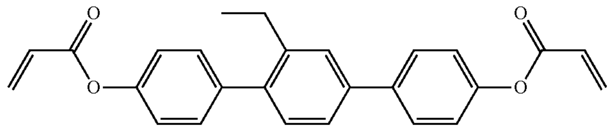 [SMILES: C=CC(=O)Oc1ccc(-c2ccc(-c3ccc(OC(=O)C=C)cc3)c(CC)c2)cc1]
RM-75
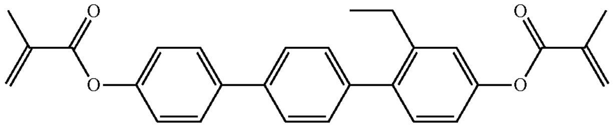 [SMILES: C=C(C)C(=O)Oc1ccc(-c2ccc(-c3ccc(OC(=O)C(=C)C)cc3CC)cc2)cc1]
RM-76
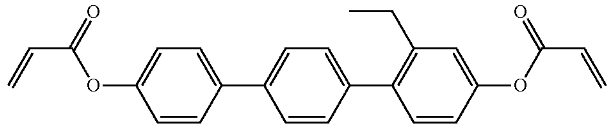
RM-77
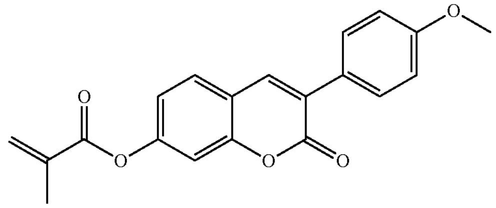 [SMILES: C=C(C)C(=O)Oc1ccc2cc(-c3ccc(OC)cc3)c(=O)oc2c1]
RM-78
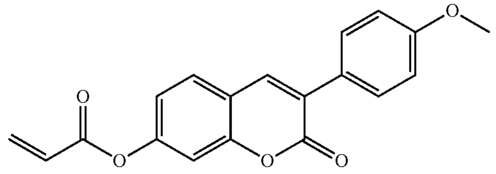 [SMILES: C=CC(=O)Oc1ccc2cc(-c3ccc(OC)cc3)c(=O)oc2c1]
RM-79
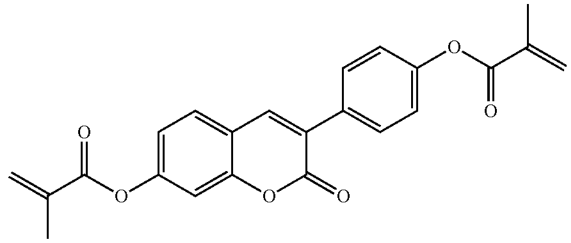 [SMILES: C=C(C)C(=O)Oc1ccc(-c2cc3ccc(OC(=O)C(=C)C)cc3oc2=O)cc1]
RM-80
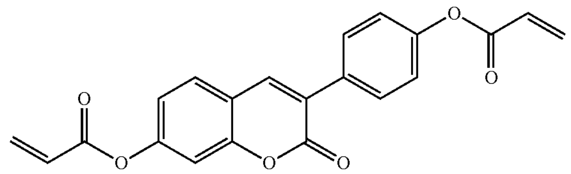 [SMILES: C=CC(=O)Oc1ccc(-c2cc3ccc(OC(=O)C=C)cc3oc2=O)cc1]
RM-81
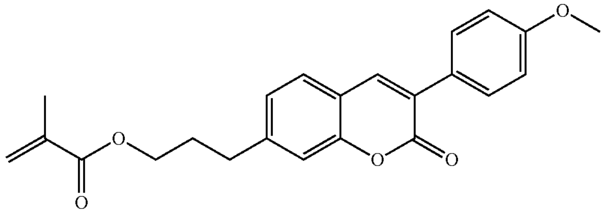 [SMILES: C=C(C)C(=O)OCCCc1ccc2cc(-c3ccc(OC)cc3)c(=O)oc2c1]
RM-82

TABLE D-continued
Table D shows illustrative reactive mesogenic compounds which can be used in the LC media in accordance with the present invention.
RM-83
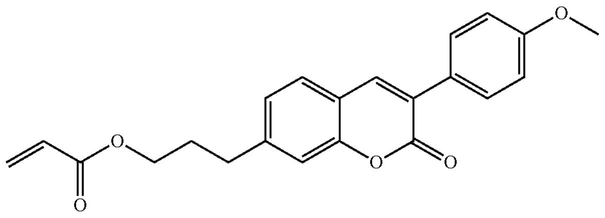 [SMILES: C=CC(=O)OCCCc1ccc2cc(-c3ccc(OC)cc3)c(=O)oc2c1]
RM-84
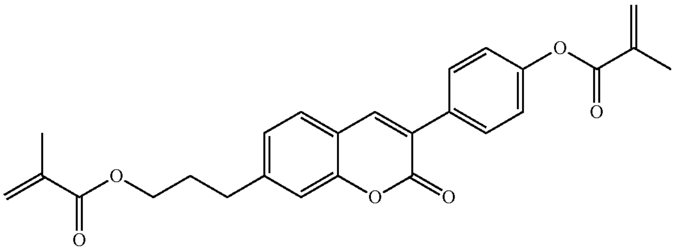 [SMILES: C=C(C)C(=O)OCCCc1ccc2cc(-c3ccc(OC(=O)C(=C)C)cc3)c(=O)oc2c1]
RM-85
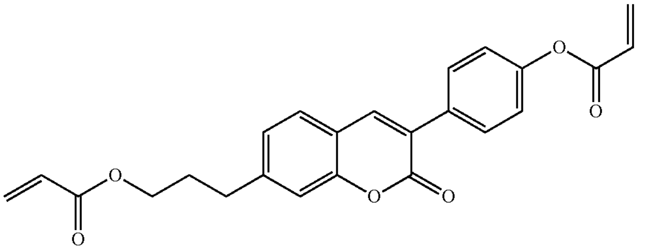 [SMILES: C=CC(=O)OCCCc1ccc2cc(-c3ccc(OC(=O)C=C)cc3)c(=O)oc2c1]
RM-86
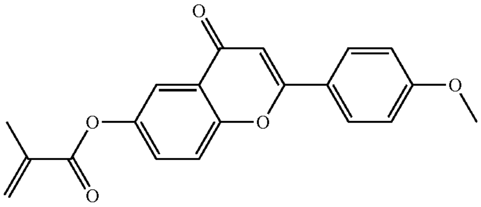 [SMILES: C=C(C)C(=O)Oc1ccc2oc(-c3ccc(OC)cc3)cc(=O)c2c1]
RM-87
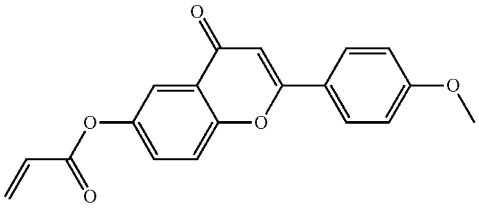 [SMILES: C=CC(=O)Oc1ccc2oc(-c3ccc(OC)cc3)cc(=O)c2c1]
RM-88
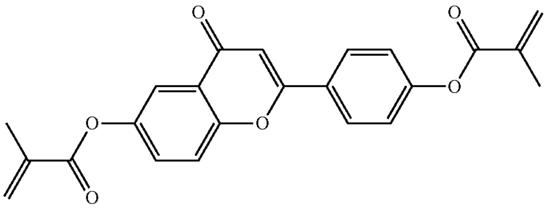 [SMILES: C=C(C)C(=O)Oc1ccc(-c2cc(=O)c3cc(OC(=O)C(=C)C)ccc3o2)cc1]
RM-89
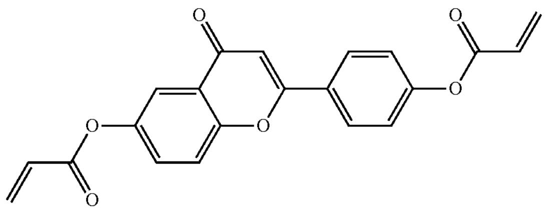 [SMILES: C=CC(=O)Oc1ccc(-c2cc(=O)c3cc(OC(=O)C=C)ccc3o2)cc1]

TABLE D-continued
Table D shows illustrative reactive mesogenic compounds which can be used in the LC media in accordance with the present invention.
RM-90
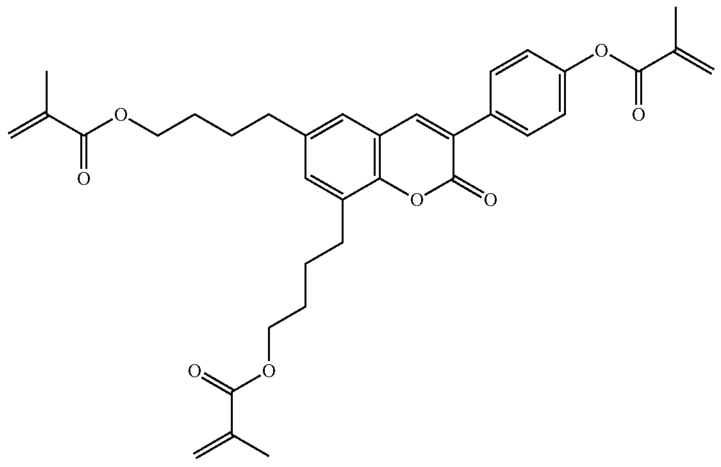 [SMILES: C=C(C)C(=O)OCCCCc1cc(CCCCOC(=O)C(=C)C)c2oc(=O)c(-c3ccc(OC(=O)C(=C)C)cc3)cc2c1]
RM-91
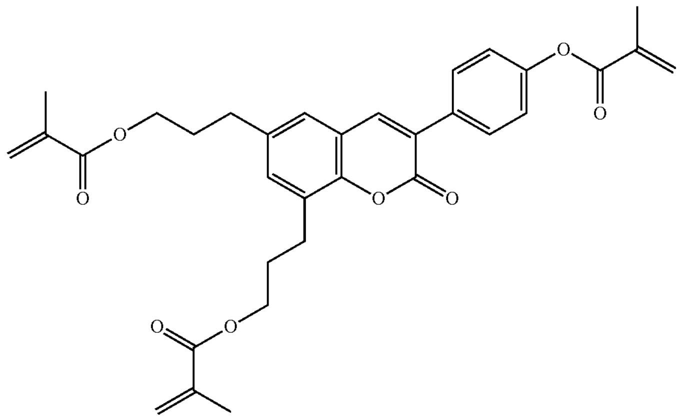 [SMILES: C=C(C)C(=O)OCCCc1cc(CCCOC(=O)C(=C)C)c2oc(=O)c(-c3ccc(OC(=O)C(=C)C)cc3)cc2c1]
RM-92
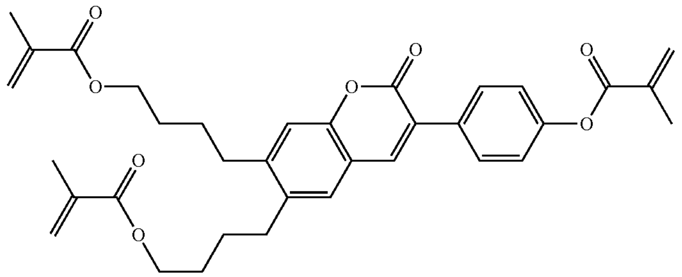 [SMILES: C=C(C)C(=O)OCCCCc1cc2cc(-c3ccc(OC(=O)C(=C)C)cc3)c(=O)oc2cc1CCCCOC(=O)C(=C)C]
RM-93
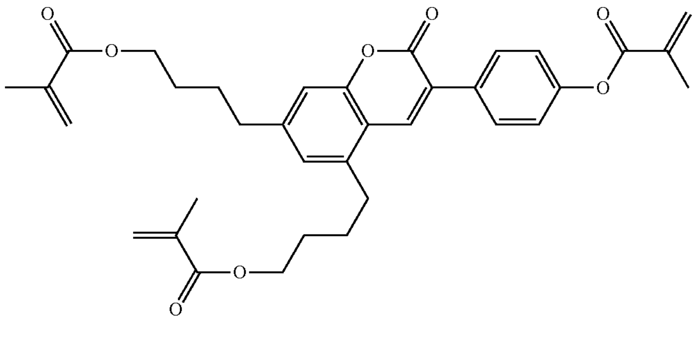 [SMILES: C=C(C)C(=O)OCCCCc1cc(CCCCOC(=O)C(=C)C)c2cc(-c3ccc(OC(=O)C(=C)C)cc3)c(=O)oc2c1]

TABLE D-continued
| Table D shows illustrative reactive mesogenic compounds which can be used in the LC media in accordance with the present invention. |
|---|
RM-94
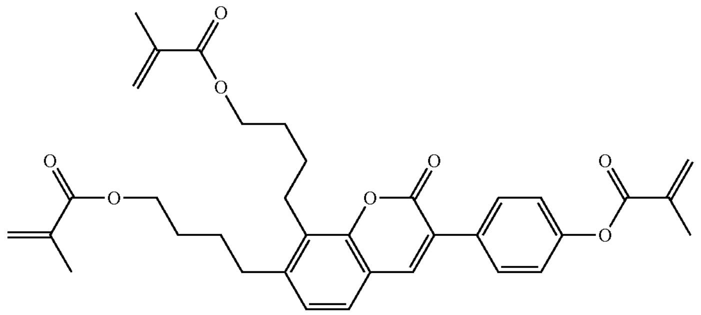 [SMILES: C=C(C)C(=O)OCCCCc1ccc2cc(-c3ccc(OC(=O)C(=C)C)cc3)c(=O)oc2c1CCCCOC(=O)C(=C)C]
RM-95
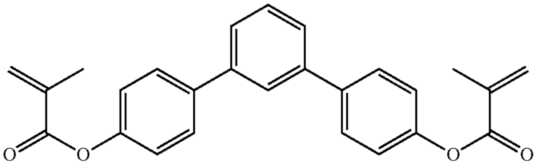 [SMILES: C=C(C)C(=O)Oc1ccc(-c2cccc(-c3ccc(OC(=O)C(=C)C)cc3)c2)cc1]
RM-96
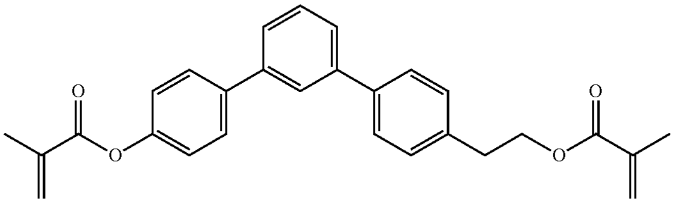 [SMILES: C=C(C)C(=O)OCCc1ccc(-c2cccc(-c3ccc(OC(=O)C(=C)C)cc3)c2)cc1]
RM-97
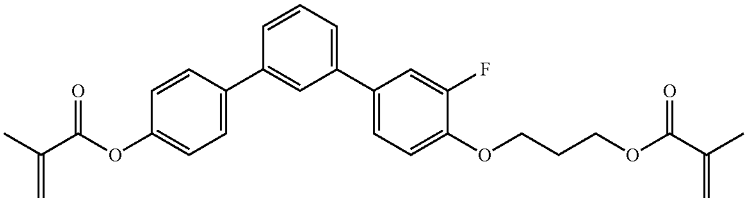 [SMILES: C=C(C)C(=O)OCCCOc1ccc(-c2cccc(-c3ccc(OC(=O)C(=C)C)cc3)c2)cc1F]
RM-98
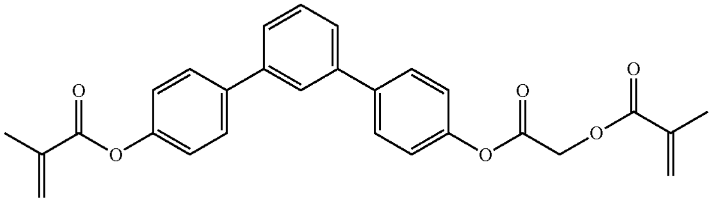 [SMILES: C=C(C)C(=O)OCC(=O)Oc1ccc(-c2cccc(-c3ccc(OC(=O)C(=C)C)cc3)c2)cc1]
RM-99
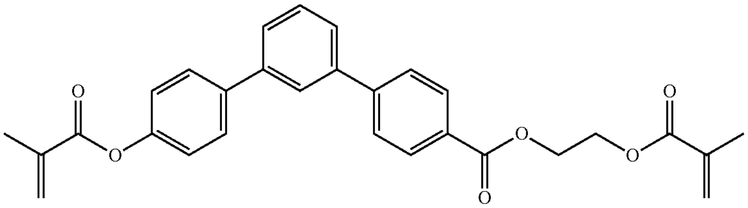 [SMILES: C=C(C)C(=O)OCCOC(=O)c1ccc(-c2cccc(-c3ccc(OC(=O)C(=C)C)cc3)c2)cc1]

TABLE D-continued
Table D shows illustrative reactive mesogenic compounds which can be used in the LC media in accordance with the present invention.
RM-100
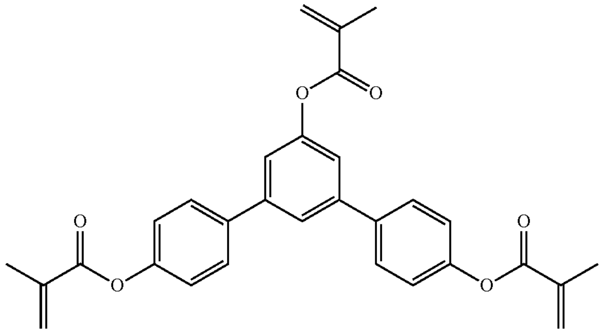 [SMILES: C=C(C)C(=O)Oc1ccc(-c2cc(OC(=O)C(=C)C)cc(-c3ccc(OC(=O)C(=C)C)cc3)c2)cc1]
RM-101
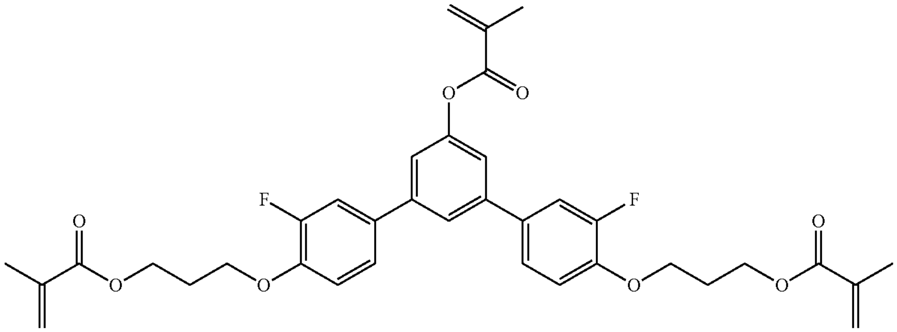 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-102
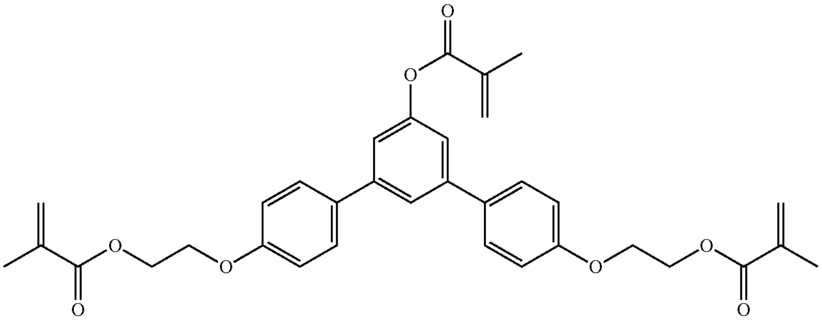 [SMILES: C=C(C)C(=O)OCCOc1ccc(-c2cc(OC(=O)C(=C)C)cc(-c3ccc(OCCOC(=O)C(=C)C)cc3)c2)cc1]
RM-103
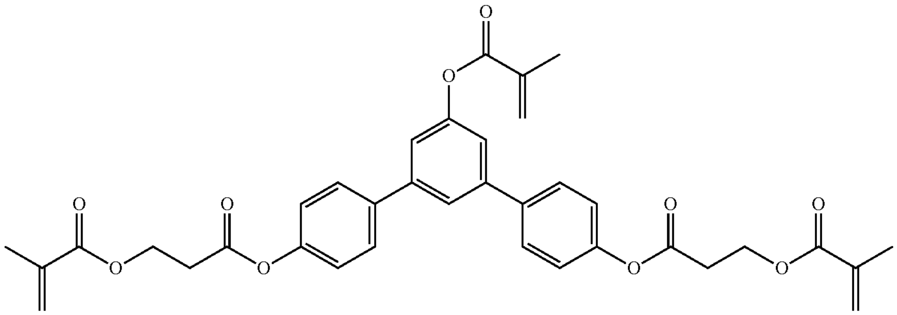 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]

TABLE D-continued
| Table D shows illustrative reactive mesogenic compounds which can be used in the LC media in accordance with the present invention. |
| --- |
| RM-104 |
| 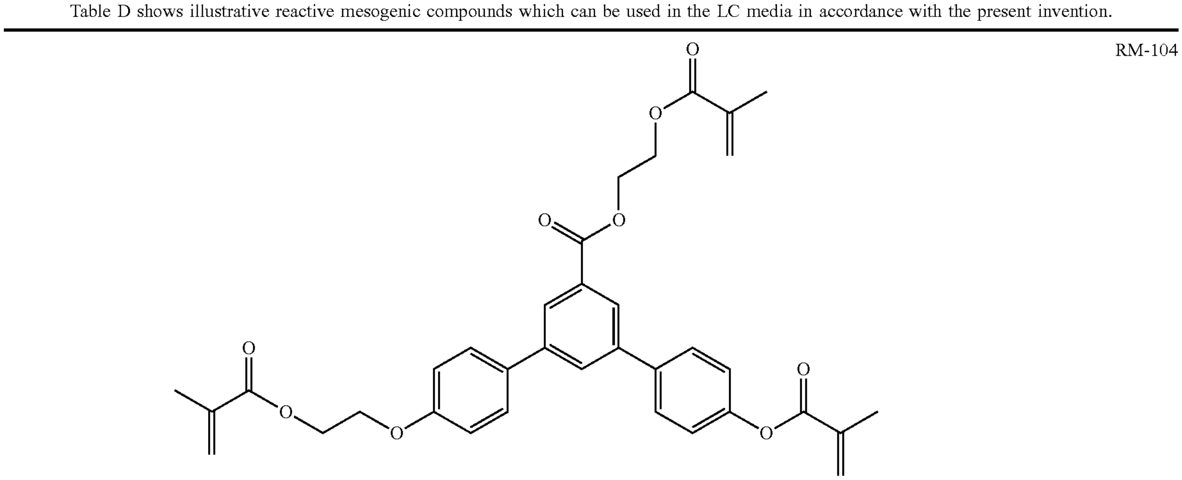 |
| RM-105 |
| 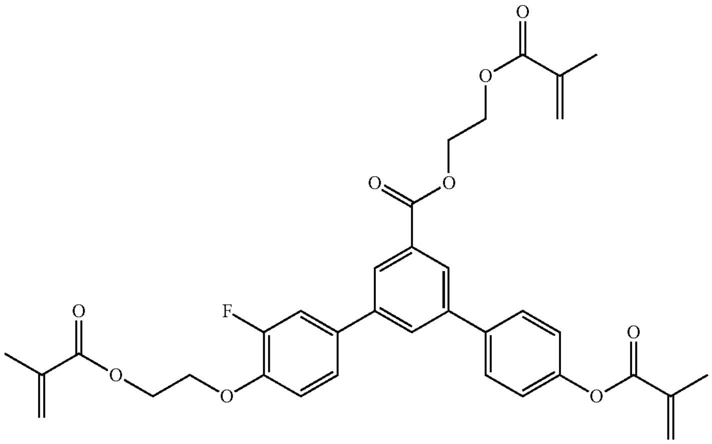 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1] |
| RM-106 |
| 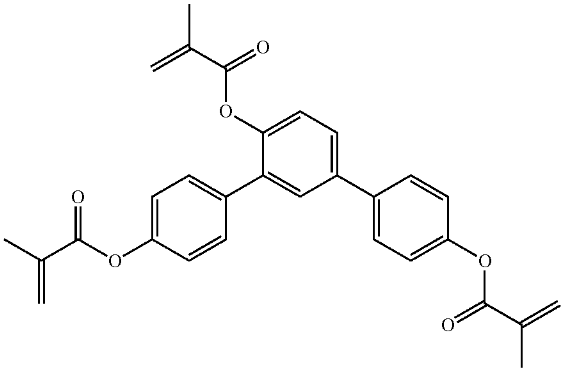 [SMILES: C=C(C)C(=O)Oc1ccc(-c2ccc(OC(=O)C(=C)C)c(-c3ccc(OC(=O)C(=C)C)cc3)c2)cc1] |

TABLE D-continued
Table D shows illustrative reactive mesogenic compounds which can be used in the LC media in accordance with the present invention.
RM-107
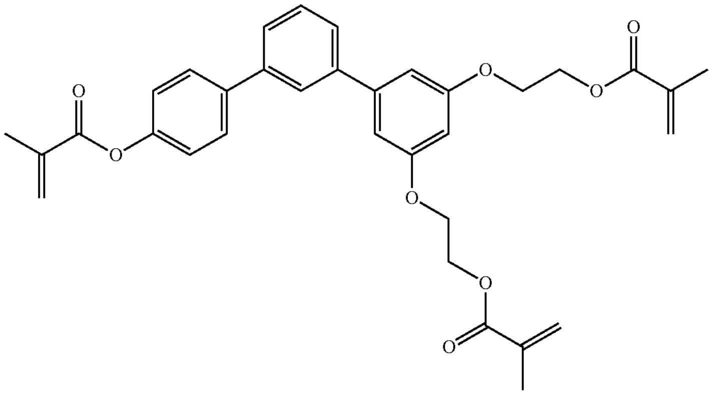 [SMILES: C=C(C)C(=O)OCCOc1cc(OCCOC(=O)C(=C)C)cc(-c2cccc(-c3ccc(OC(=O)C(=C)C)cc3)c2)c1]
RM-108
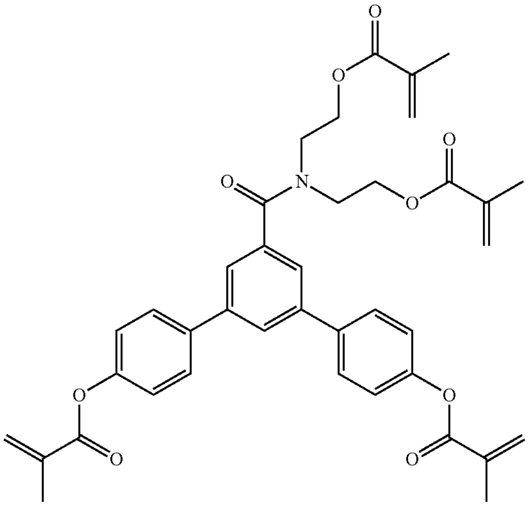 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-109
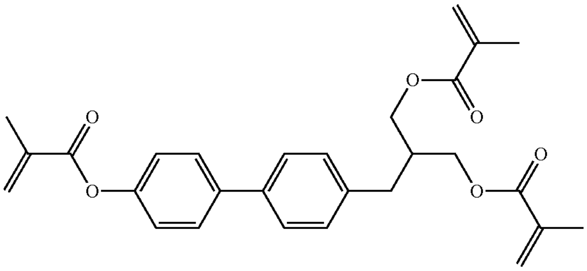 [SMILES: C=C(C)C(=O)OCC(COC(=O)C(=C)C)Cc1ccc(-c2ccc(OC(=O)C(=C)C)cc2)cc1]
RM-110
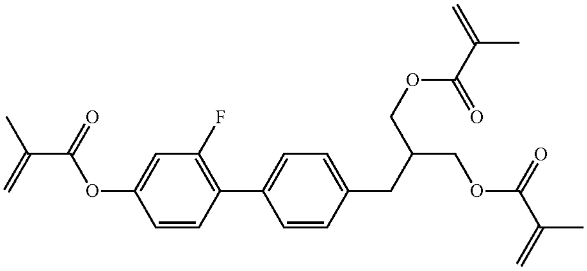 [SMILES: C=C(C)C(=O)OCC(COC(=O)C(=C)C)Cc1ccc(-c2ccc(OC(=O)C(=C)C)cc2F)cc1]

TABLE D-continued
| Table D shows illustrative reactive mesogenic compounds which can be used in the LC media in accordance with the present invention. |
| --- |
RM-111
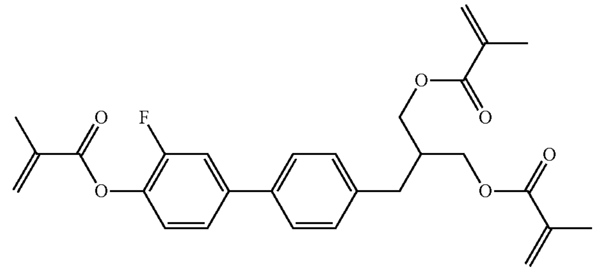 [SMILES: C=C(C)C(=O)OCC(COC(=O)C(=C)C)Cc1ccc(-c2ccc(OC(=O)C(=C)C)c(F)c2)cc1]
RM-112
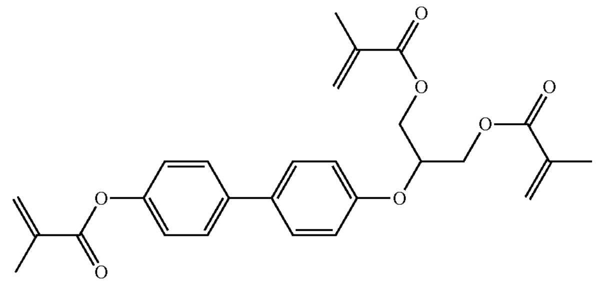 [SMILES: C=C(C)C(=O)OCC(COC(=O)C(=C)C)Oc1ccc(-c2ccc(OC(=O)C(=C)C)cc2)cc1]
RM-113
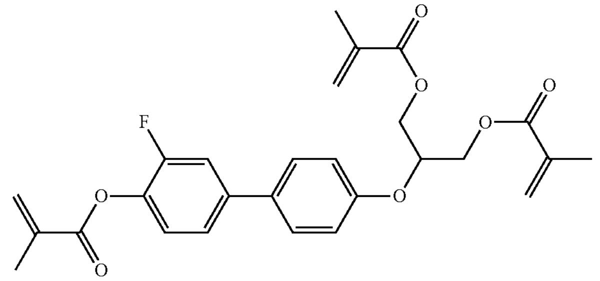 [SMILES: C=C(C)C(=O)OCC(COC(=O)C(=C)C)Oc1ccc(-c2ccc(OC(=O)C(=C)C)c(F)c2)cc1]
RM-114
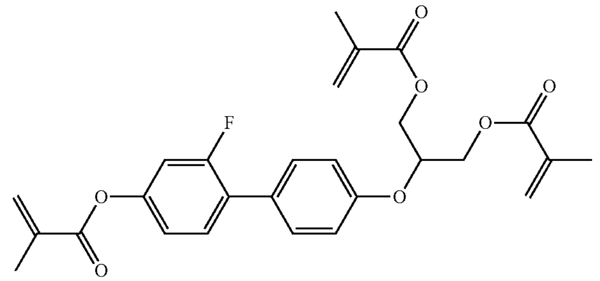 [SMILES: C=C(C)C(=O)OCC(COC(=O)C(=C)C)Oc1ccc(-c2ccc(OC(=O)C(=C)C)cc2F)cc1]
RM-115
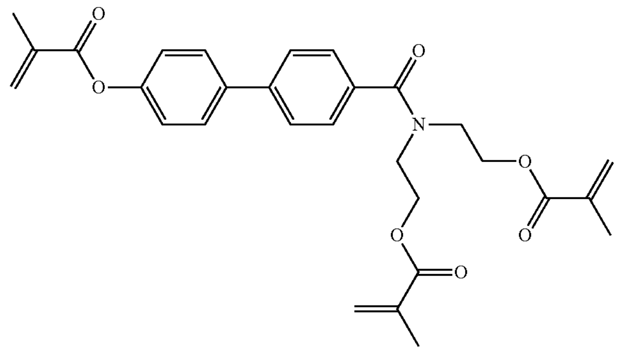 [SMILES: C=C(C)C(=O)OCCN(CCOC(=O)C(=C)C)C(=O)c1ccc(-c2ccc(OC(=O)C(=C)C)cc2)cc1]

TABLE D-continued
Table D shows illustrative reactive mesogenic compounds which can be used in the LC media in accordance with the present invention.
RM-116
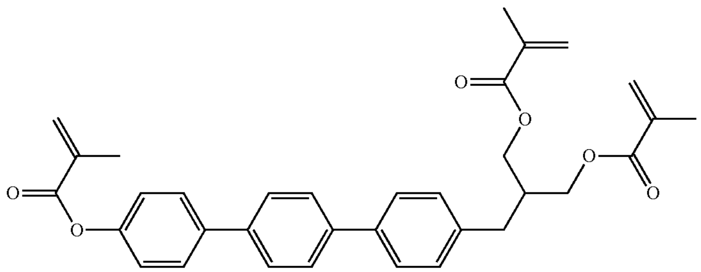 [SMILES: C=C(C)C(=O)OCC(COC(=O)C(=C)C)Cc1ccc(-c2ccc(-c3ccc(OC(=O)C(=C)C)cc3)cc2)cc1]
RM-117
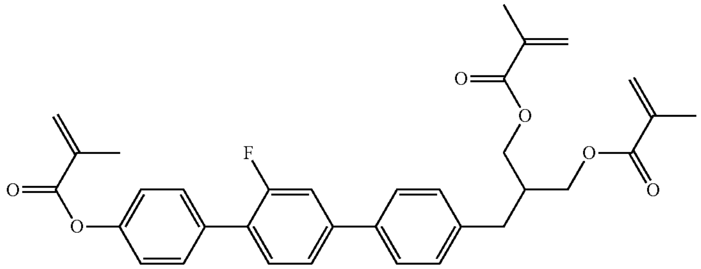 [SMILES: C=C(C)C(=O)OCC(COC(=O)C(=C)C)Cc1ccc(-c2ccc(-c3ccc(OC(=O)C(=C)C)cc3)c(F)c2)cc1]
RM-118
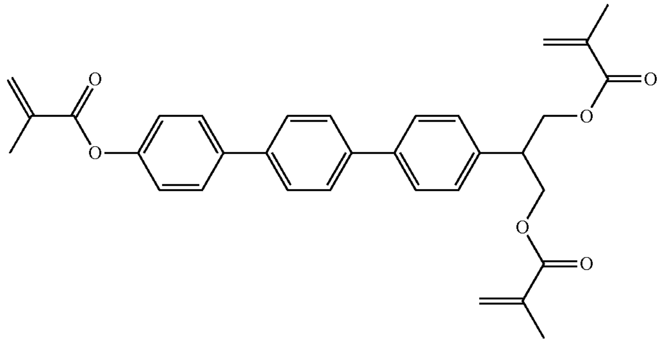 [SMILES: C=C(C)C(=O)OCC(COC(=O)C(=C)C)c1ccc(-c2ccc(-c3ccc(OC(=O)C(=C)C)cc3)cc2)cc1]
RM-119
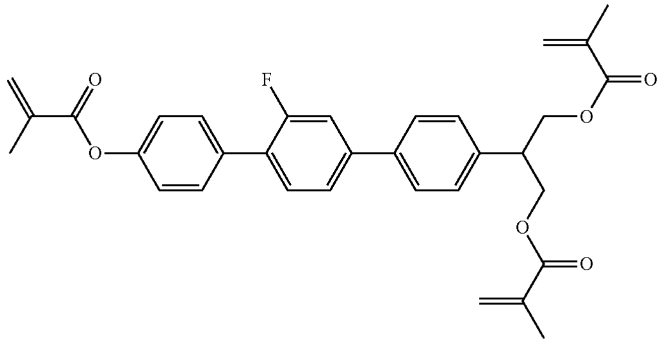 [SMILES: C=C(C)C(=O)OCC(COC(=O)C(=C)C)c1ccc(-c2ccc(-c3ccc(OC(=O)C(=C)C)cc3)c(F)c2)cc1]
RM-120
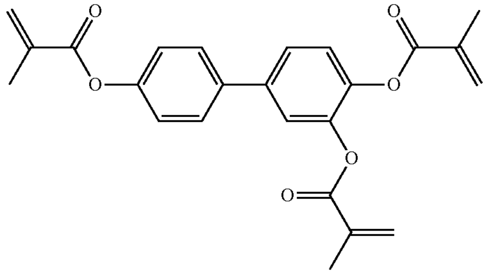 [SMILES: C=C(C)C(=O)Oc1ccc(-c2ccc(OC(=O)C(=C)C)c(OC(=O)C(=C)C)c2)cc1]

TABLE D-continued
| Table D shows illustrative reactive mesogenic compounds which can be used in the LC media in accordance with the present invention. |
|---|
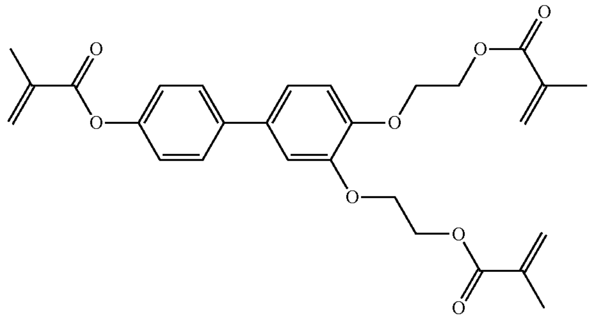 [SMILES: C=C(C)C(=O)OCCOc1ccc(-c2ccc(OC(=O)C(=C)C)cc2)cc1OCCOC(=O)C(=C)C]
RM-121
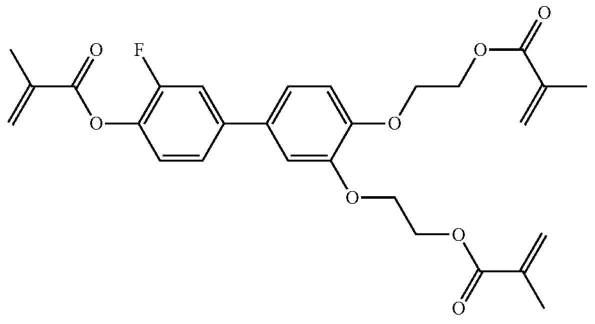 [SMILES: C=C(C)C(=O)OCCOc1ccc(-c2ccc(OC(=O)C(=C)C)c(F)c2)cc1OCCOC(=O)C(=C)C]
RM-122
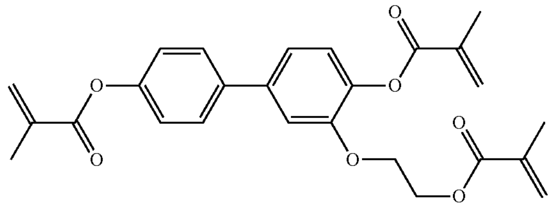 [SMILES: C=C(C)C(=O)OCCOc1cc(-c2ccc(OC(=O)C(=C)C)cc2)ccc1OC(=O)C(=C)C]
RM-123
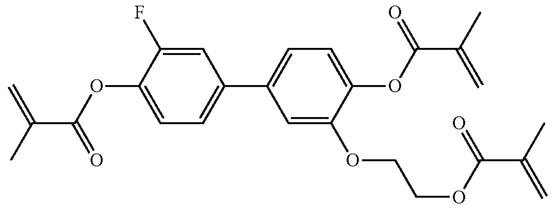 [SMILES: C=C(C)C(=O)OCCOc1cc(-c2ccc(OC(=O)C(=C)C)c(F)c2)ccc1OC(=O)C(=C)C]
RM-124
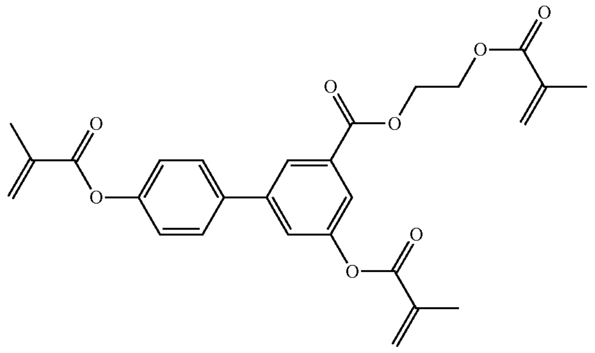 [SMILES: C=C(C)C(=O)OCCOC(=O)c1cc(OC(=O)C(=C)C)cc(-c2ccc(OC(=O)C(=C)C)cc2)c1]
RM-125

TABLE D-continued
Table D shows illustrative reactive mesogenic compounds which can be used in the LC media in accordance with the present invention.
RM-126
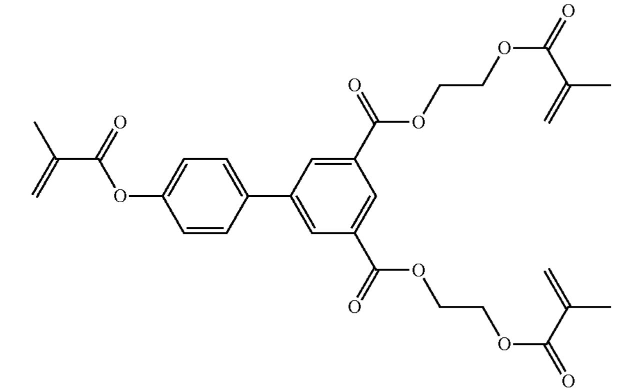 [SMILES: C=C(C)C(=O)OCCOC(=O)c1cc(C(=O)OCCOC(=O)C(=C)C)cc(-c2ccc(OC(=O)C(=C)C)cc2)c1]
RM-127
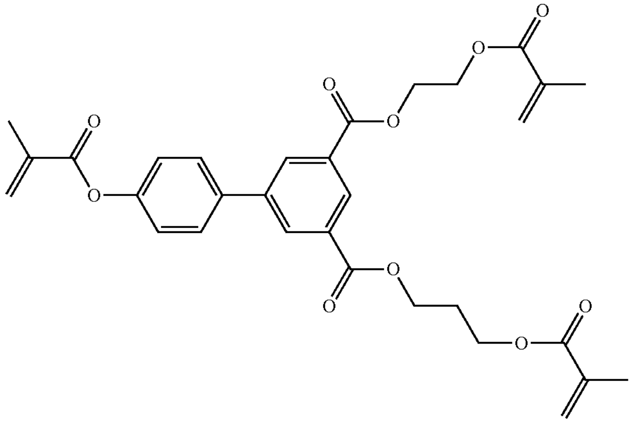 [SMILES: C=C(C)C(=O)OCCCOC(=O)c1cc(C(=O)OCCOC(=O)C(=C)C)cc(-c2ccc(OC(=O)C(=C)C)cc2)c1]
RM-128
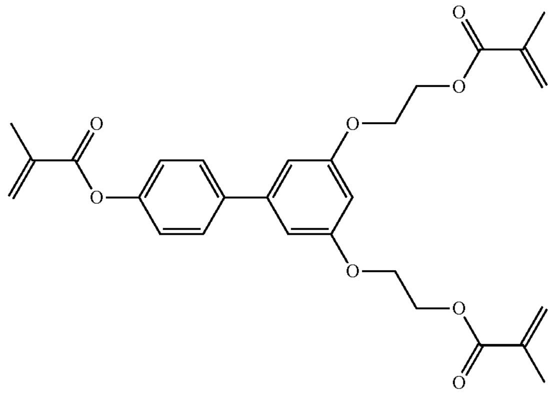 [SMILES: C=C(C)C(=O)OCCOc1cc(OCCOC(=O)C(=C)C)cc(-c2ccc(OC(=O)C(=C)C)cc2)c1]
RM-129
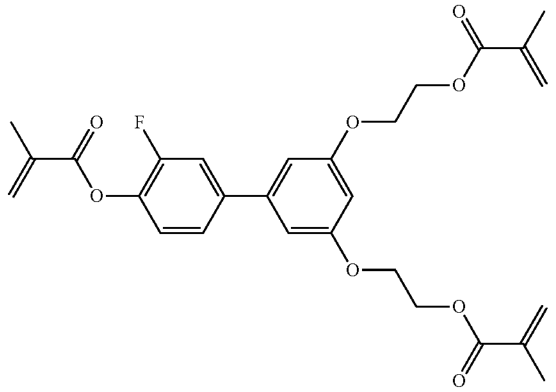 [SMILES: C=C(C)C(=O)OCCOc1cc(OCCOC(=O)C(=C)C)cc(-c2ccc(OC(=O)C(=C)C)c(F)c2)c1]

TABLE D-continued
Table D shows illustrative reactive mesogenic compounds which can be used in the LC media in accordance with the present invention.
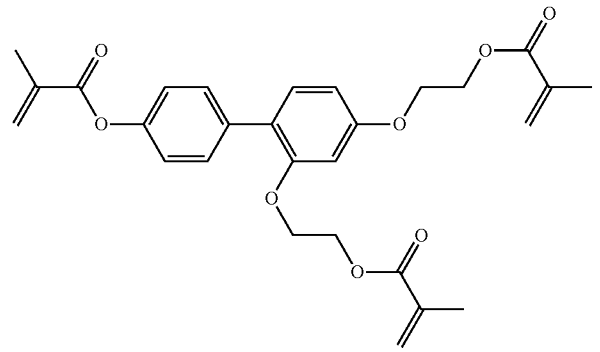 [SMILES: C=C(C)C(=O)OCCOc1ccc(-c2ccc(OC(=O)C(=C)C)cc2)c(OCCOC(=O)C(=C)C)c1]
RM-130
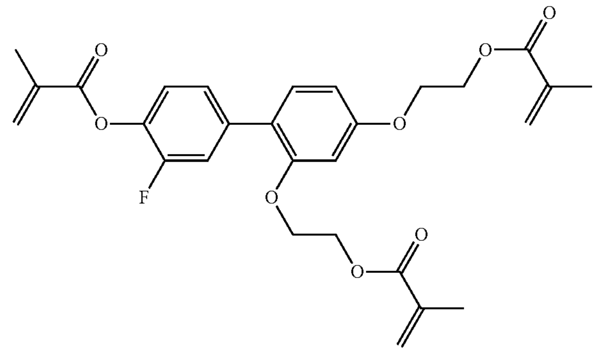 [SMILES: C=C(C)C(=O)OCCOc1ccc(-c2ccc(OC(=O)C(=C)C)c(F)c2)c(OCCOC(=O)C(=C)C)c1]
RM-131
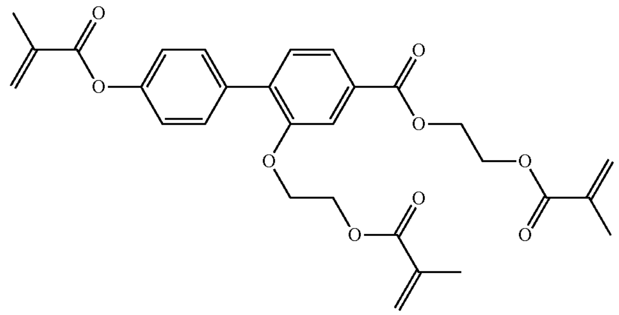 [SMILES: C=C(C)C(=O)OCCOC(=O)c1ccc(-c2ccc(OC(=O)C(=C)C)cc2)c(OCCOC(=O)C(=C)C)c1]
RM-132
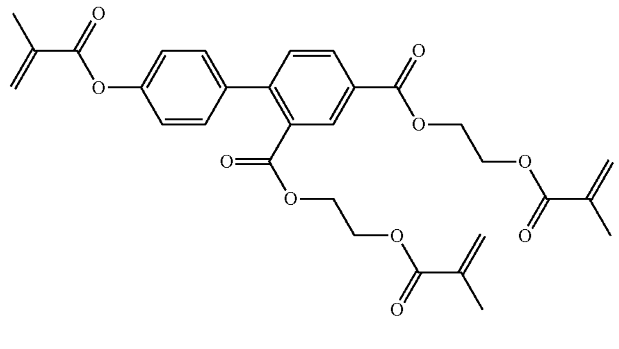 [SMILES: C=C(C)C(=O)OCCOC(=O)c1ccc(-c2ccc(OC(=O)C(=C)C)cc2)c(C(=O)OCCOC(=O)C(=C)C)c1]
RM-133

TABLE D-continued
Table D shows illustrative reactive mesogenic compounds which can be used in the LC media in accordance with the present invention.
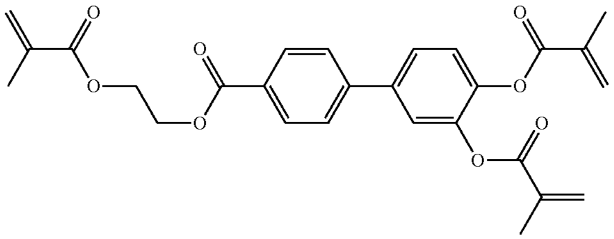 [SMILES: C=C(C)C(=O)OCCOC(=O)c1ccc(-c2ccc(OC(=O)C(=C)C)c(OC(=O)C(=C)C)c2)cc1]
RM-134
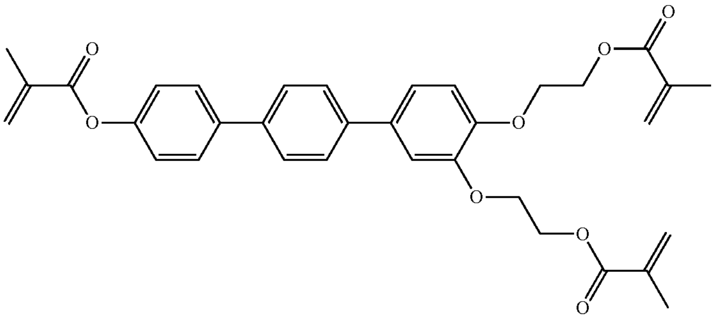 [SMILES: C=C(C)C(=O)OCCOc1ccc(-c2ccc(-c3ccc(OC(=O)C(=C)C)cc3)cc2)cc1OCCOC(=O)C(=C)C]
RM-135
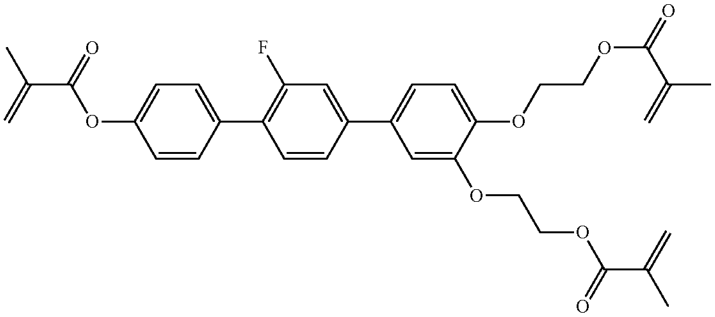 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136
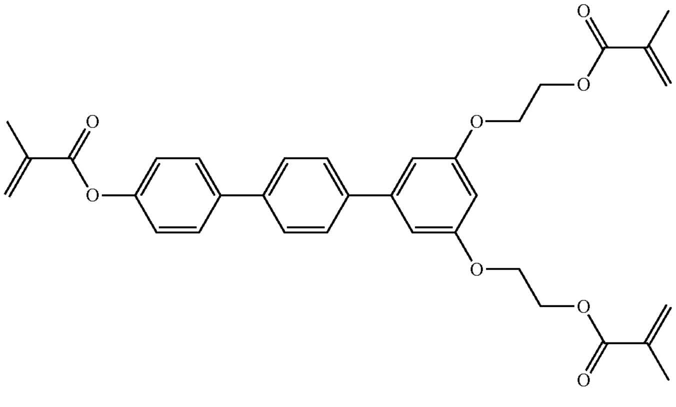 [SMILES: C=C(C)C(=O)OCCOc1cc(OCCOC(=O)C(=C)C)cc(-c2ccc(-c3ccc(OC(=O)C(=C)C)cc3)cc2)c1]
RM-137

TABLE D-continued
Table D shows illustrative reactive mesogenic compounds which can be used in the LC media in accordance with the present invention.
RM-138
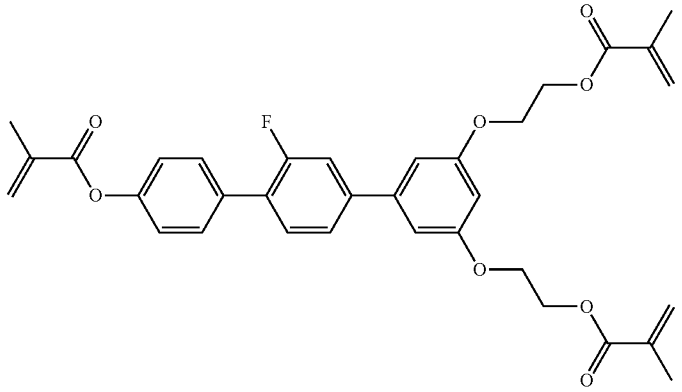 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-139
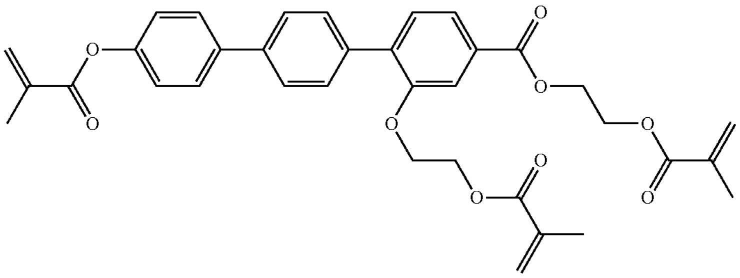 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-140
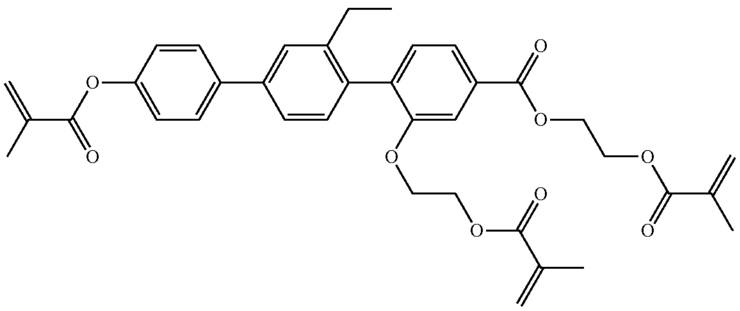 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-141
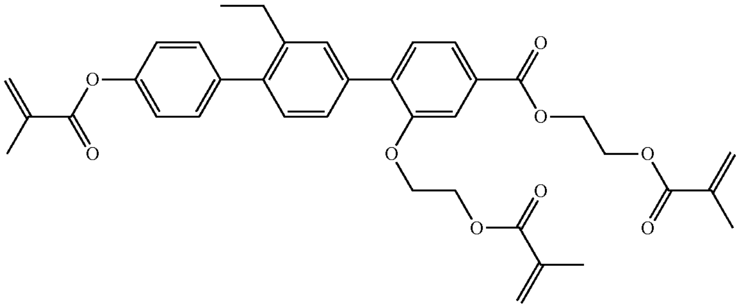 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-142
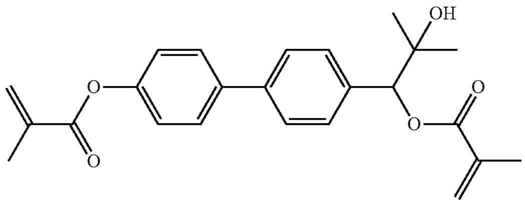 [SMILES: C=C(C)C(=O)Oc1ccc(-c2ccc(C(OC(=O)C(=C)C)C(C)(C)O)cc2)cc1]

TABLE D-continued
Table D shows illustrative reactive mesogenic compounds which can be used in the LC media in accordance with the present invention.
RM-143
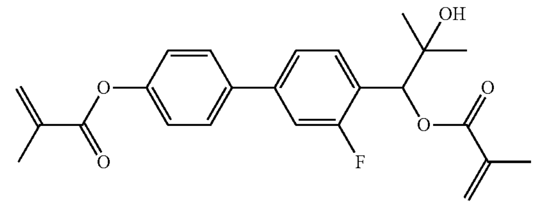 [SMILES: C=C(C)C(=O)Oc1ccc(-c2ccc(C(OC(=O)C(=C)C)C(C)(C)O)c(F)c2)cc1]
RM-144
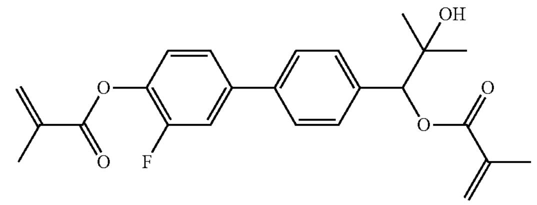 [SMILES: C=C(C)C(=O)Oc1ccc(-c2ccc(C(OC(=O)C(=C)C)C(C)(C)O)cc2)cc1F]
RM-145
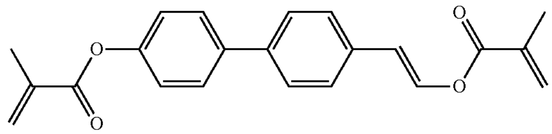 [SMILES: C=C(C)C(=O)O/C=C/c1ccc(-c2ccc(OC(=O)C(=C)C)cc2)cc1]
RM-146
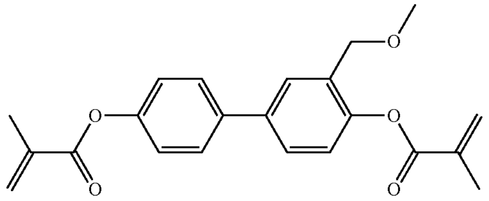 [SMILES: C=C(C)C(=O)Oc1ccc(-c2ccc(OC(=O)C(=C)C)c(COC)c2)cc1]
RM-147
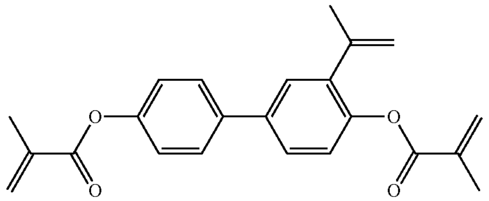 [SMILES: C=C(C)C(=O)Oc1ccc(-c2ccc(OC(=O)C(=C)C)c(C(=C)C)c2)cc1]
RM-148
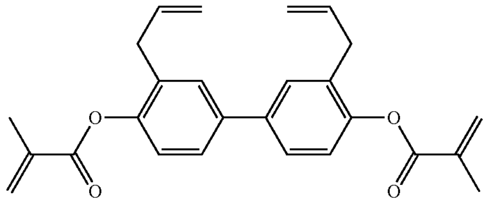 [SMILES: C=CCc1cc(-c2ccc(OC(=O)C(=C)C)c(CC=C)c2)ccc1OC(=O)C(=C)C]
RM-149
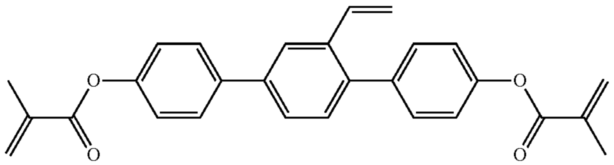 [SMILES: C=Cc1cc(-c2ccc(OC(=O)C(=C)C)cc2)ccc1-c1ccc(OC(=O)C(=C)C)cc1]
RM-150
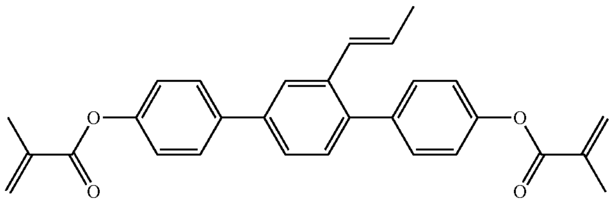 [SMILES: C=C(C)C(=O)Oc1ccc(-c2ccc(-c3ccc(OC(=O)C(=C)C)cc3)c(/C=C/C)c2)cc1]

TABLE D-continued

| Table D shows illustrative reactive mesogenic compounds which can be used in the LC media in accordance with the present invention. | |
|---|---|
| 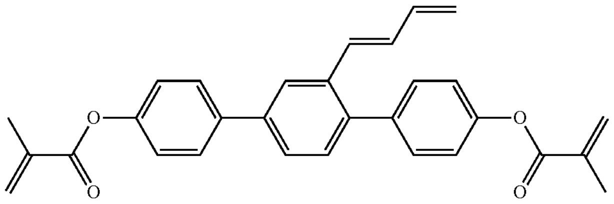 [SMILES: C=C/C=C/c1cc(-c2ccc(OC(=O)C(=C)C)cc2)ccc1-c1ccc(OC(=O)C(=C)C)cc1] | RM-151 |
| 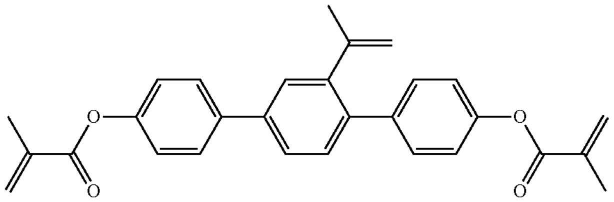 [SMILES: C=C(C)C(=O)Oc1ccc(-c2ccc(-c3ccc(OC(=O)C(=C)C)cc3)c(C(=C)C)c2)cc1] | RM-152 |

In a preferred embodiment, the mixtures according to the invention comprise one or more polymerizable compounds, preferably selected from the polymerizable compounds of the formulae RM-1 to RM-144. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122 and RM-145 to RM-152 are particularly preferred.

In another preferred embodiment, the mixtures according to the invention comprise one or more polymerizable compounds selected from the formulae RM-145 to RM-152, very preferably from the formulae RM-147 to RM-152.

TABLE E

| Table E shows self-alignment additives for vertical alignment that can be used in LC media for SA-VA and SA-FFS displays according to the present invention together with the polymerizable compounds of formula I: | |
|---|---|
| 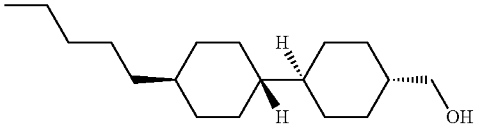 [SMILES: CCCCC[C@H]1CC[C@H]([C@H]2CC[C@H](CO)CC2)CC1] | SA-1 |
| 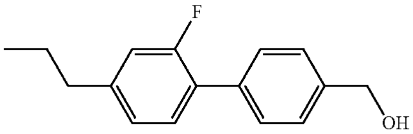 [SMILES: CCCc1ccc(-c2ccc(CO)cc2)c(F)c1] | SA-2 |
| 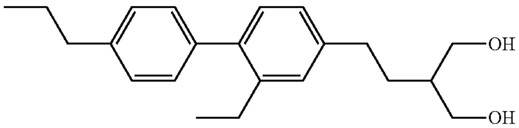 [SMILES: CCCc1ccc(-c2ccc(CCC(CO)CO)cc2CC)cc1] | SA-3 |
| 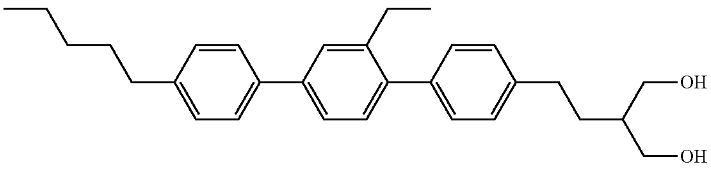 [SMILES: CCCCCc1ccc(-c2ccc(-c3ccc(CCC(CO)CO)cc3)c(CC)c2)cc1] | SA-4 |
| 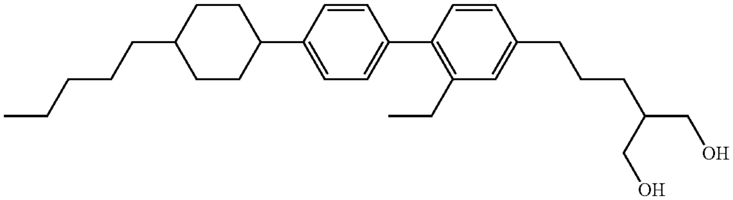 [SMILES: CCCCCC1CCC(c2ccc(-c3ccc(CCCC(CO)CO)cc3CC)cc2)CC1] | SA-5 |

TABLE E-continued
| Table E shows self-alignment additives for vertical alignment that can be used in LC media for SA-VA and SA-FFS displays according to the present invention together with the polymerizable compounds of formula I: | |
|---|---|
| 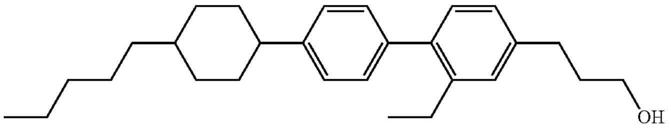 [SMILES: CCCCCC1CCC(c2ccc(-c3ccc(CCCO)cc3CC)cc2)CC1] | SA-6 |
| 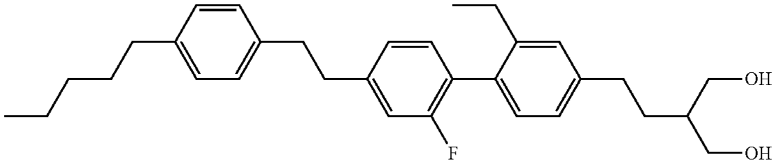 [SMILES: CCCCCc1ccc(CCc2ccc(-c3ccc(CCC(CO)CO)cc3CC)c(F)c2)cc1] | SA-7 |
| 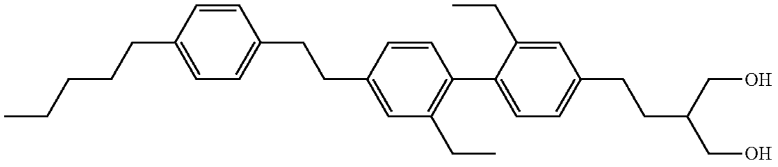 | SA-8 |
| 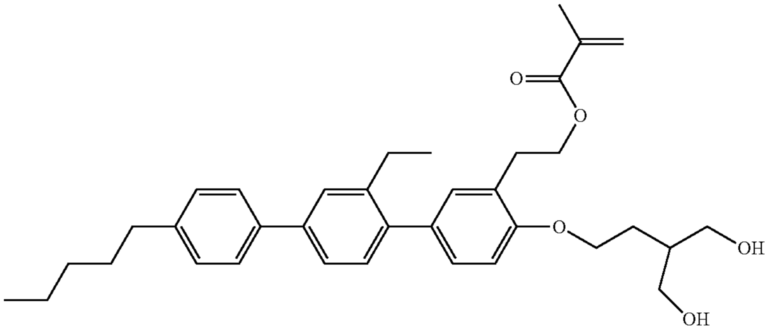 [SMILES: C=C(C)C(=O)OCCc1cc(-c2ccc(-c3ccc(CCCCC)cc3)cc2CC)ccc1OCCC(CO)CO] | SA-9 |
| 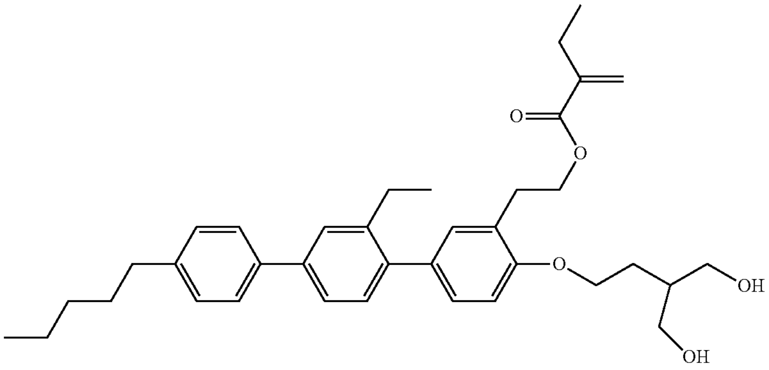 [SMILES: C=C(CC)C(=O)OCCc1cc(-c2ccc(-c3ccc(CCCCC)cc3)cc2CC)ccc1OCCC(CO)CO] | SA-10 |
| 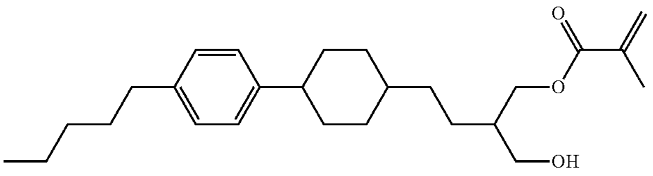 [SMILES: C=C(C)C(=O)OCC(CO)CCC1CCC(c2ccc(CCCCC)cc2)CC1] | SA-11 |
| 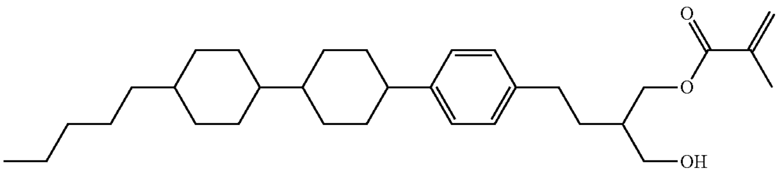 [SMILES: C=C(C)C(=O)OCC(CO)CCc1ccc(C2CCC(C3CCC(CCCCC)CC3)CC2)cc1] | SA-12 |

TABLE E-continued
| Table E shows self-alignment additives for vertical alignment that can be used in LC media for SA-VA and SA-FFS displays according to the present invention together with the polymerizable compounds of formula I: |
|---|
| 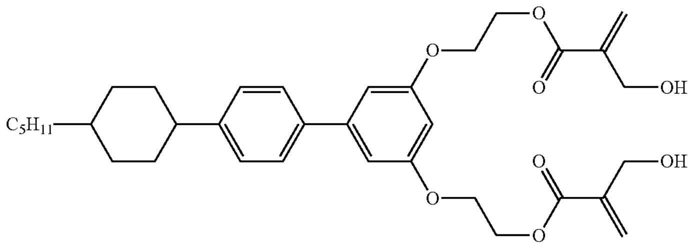 SA-13 |
| 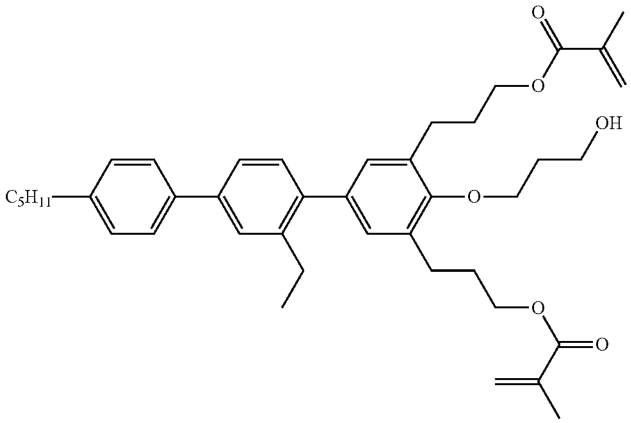 SA-14 |
| 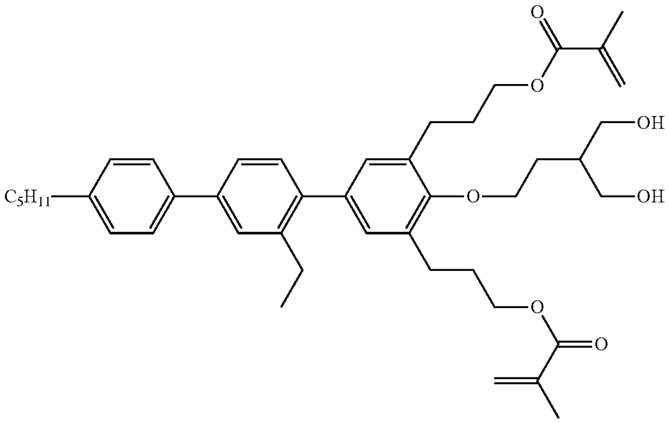 SA-15 |
| 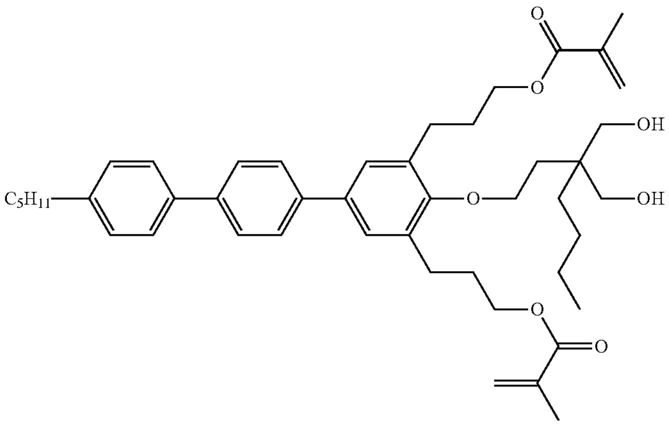 SA-16 |

TABLE E-continued
Table E shows self-alignment additives for vertical alignment that can be used in LC media for SA-VA and SA-FFS displays according to the present invention together with the polymerizable compounds of formula I:
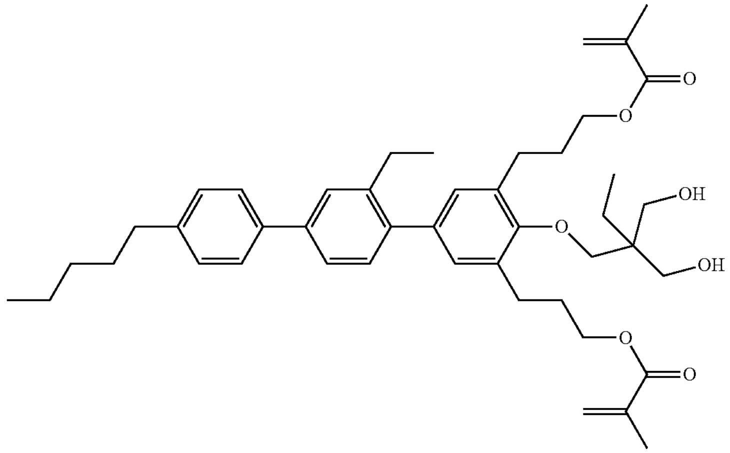 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-17
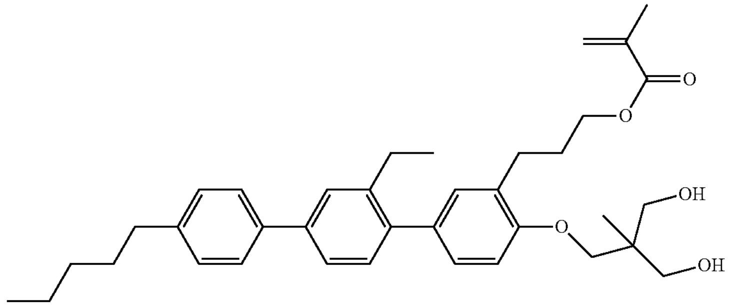 [SMILES: C=C(C)C(=O)OCCCc1cc(-c2ccc(-c3ccc(CCCCC)cc3)cc2CC)ccc1OCC(C)(CO)CO]
SA-18
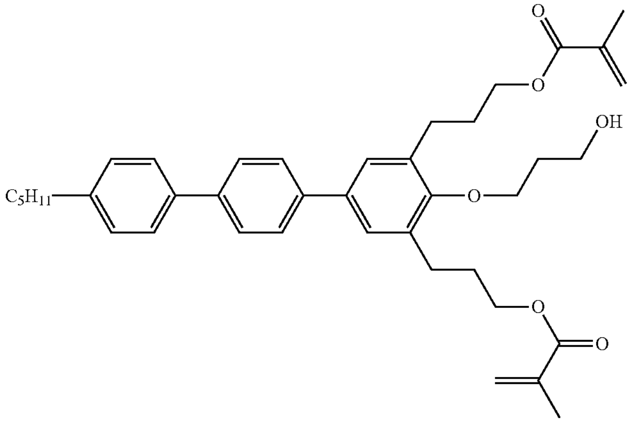
SA-19

TABLE E-continued
Table E shows self-alignment additives for vertical alignment that can be used in LC media for SA-VA and SA-FFS displays according to the present invention together with the polymerizable compounds of formula I:
SA-20
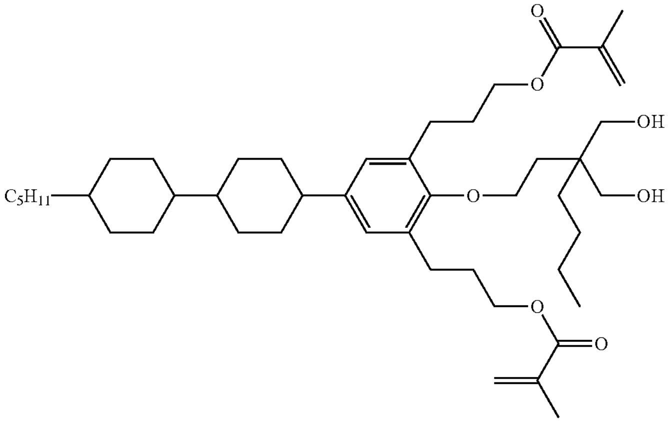
SA-21
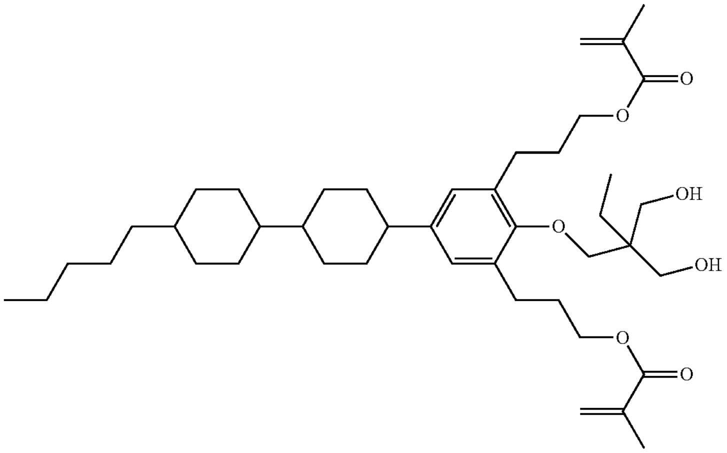 [SMILES: C=C(C)C(=O)OCCCc1cc(C2CCC(C3CCC(CCCCC)CC3)CC2)cc(CCCOC(=O)C(=C)C)c1OCC(CC)(CO)CO]
SA-22
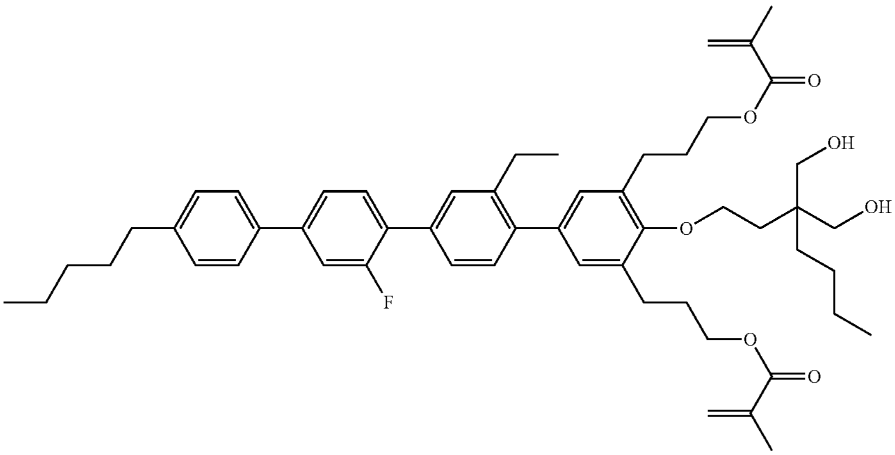 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]

TABLE E-continued
Table E shows self-alignment additives for vertical alignment that can be used in LC media for SA-VA and SA-FFS displays according to the present invention together with the polymerizable compounds of formula I:
SA-23
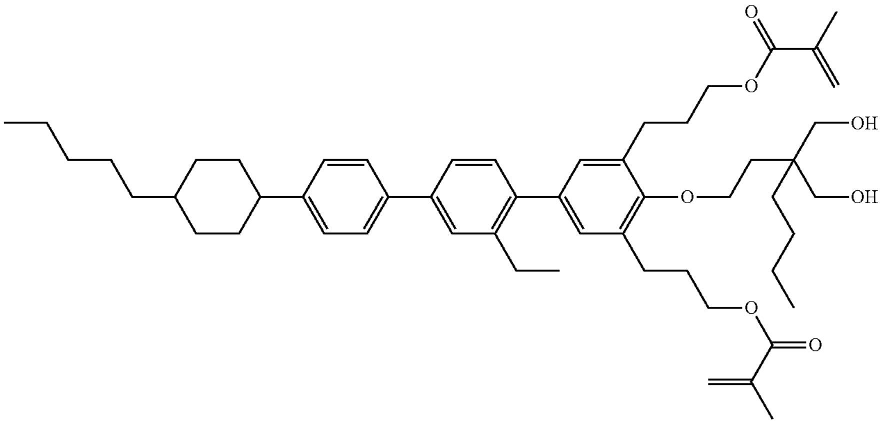 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-24
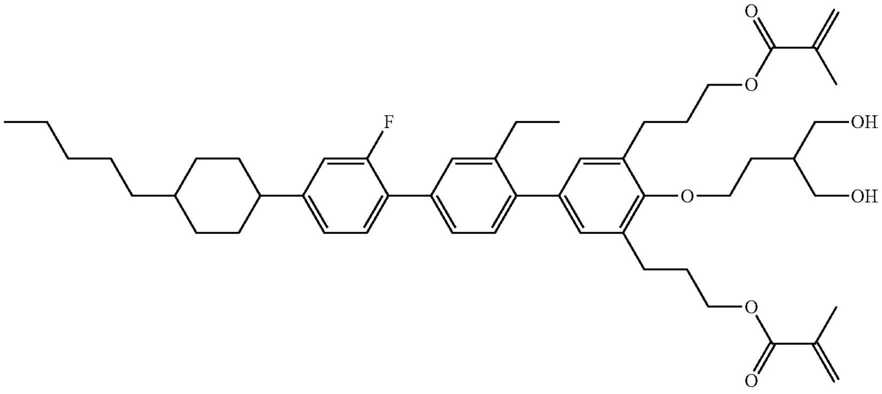 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-25
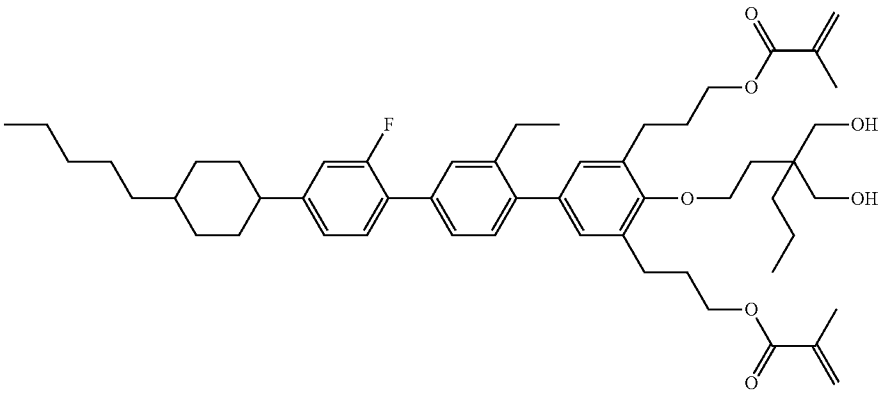 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]

TABLE E-continued
Table E shows self-alignment additives for vertical alignment that can be used in LC media for SA-VA and SA-FFS displays according to the present invention together with the polymerizable compounds of formula I:
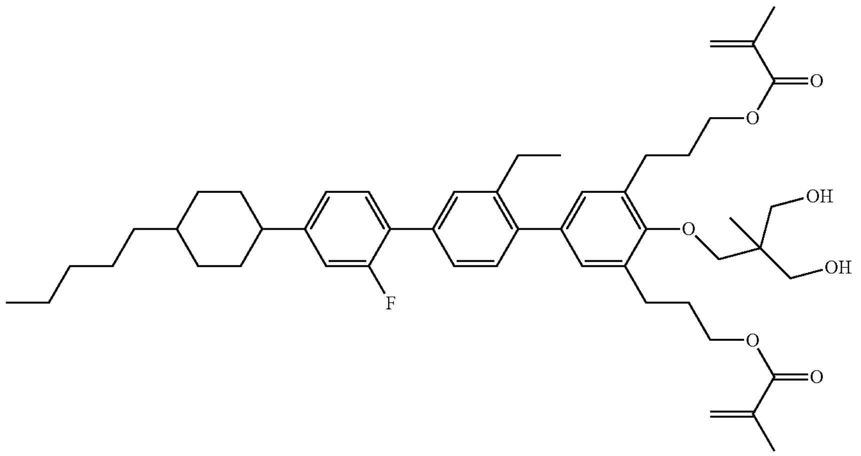 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO]
SA-26
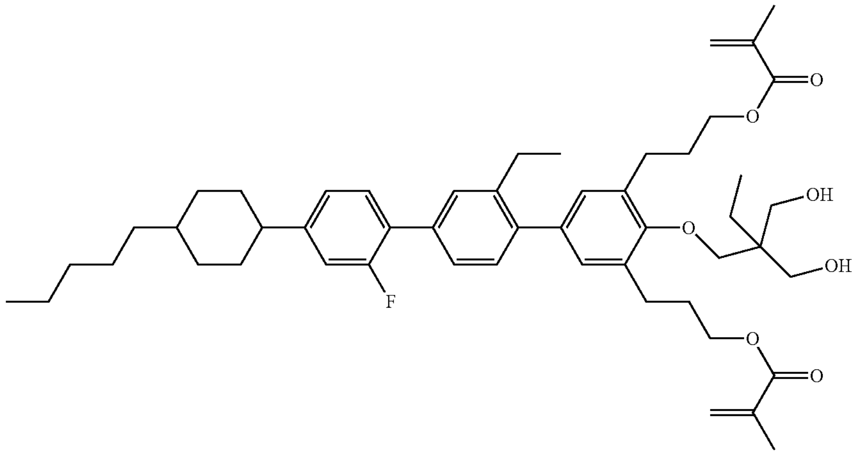 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]
SA-27
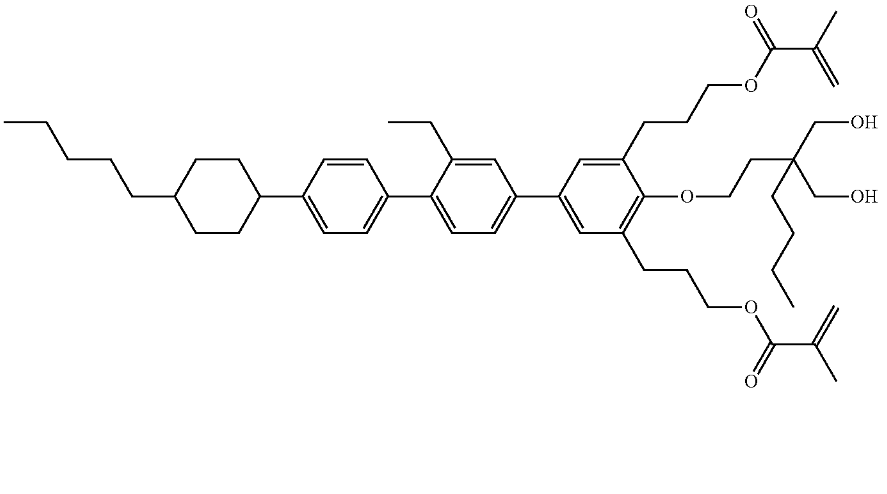 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-28

TABLE E-continued
Table E shows self-alignment additives for vertical alignment that can be used in LC media for SA-VA and SA-FFS displays according to the present invention together with the polymerizable compounds of formula I:
SA-29
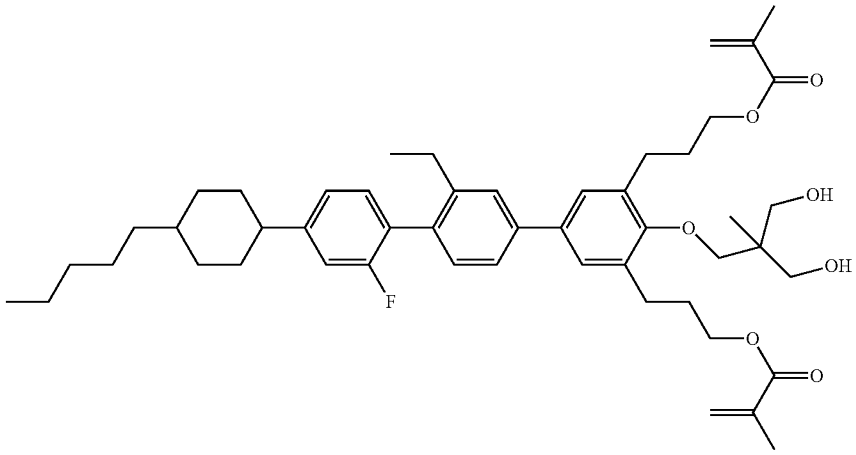 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]
SA-30
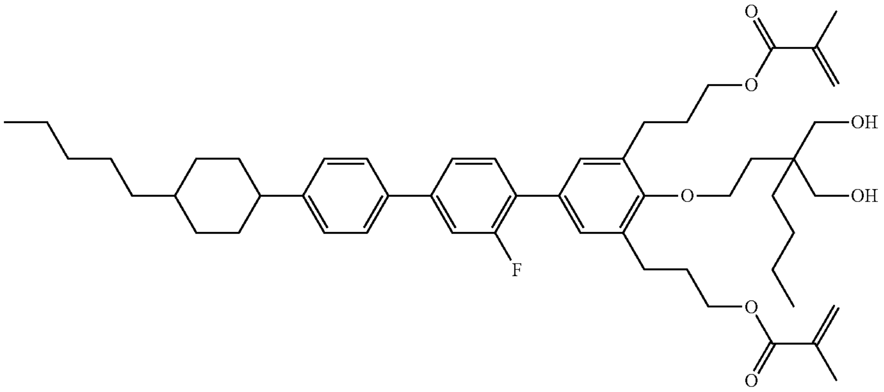 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-31
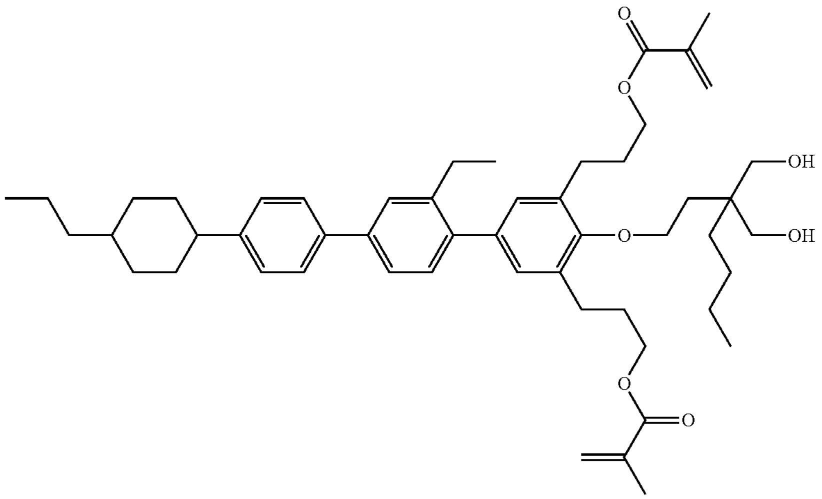 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]

TABLE E-continued
| Table E shows self-alignment additives for vertical alignment that can be used in LC media for SA-VA and SA-FFS displays according to the present invention together with the polymerizable compounds of formula I: |
|---|
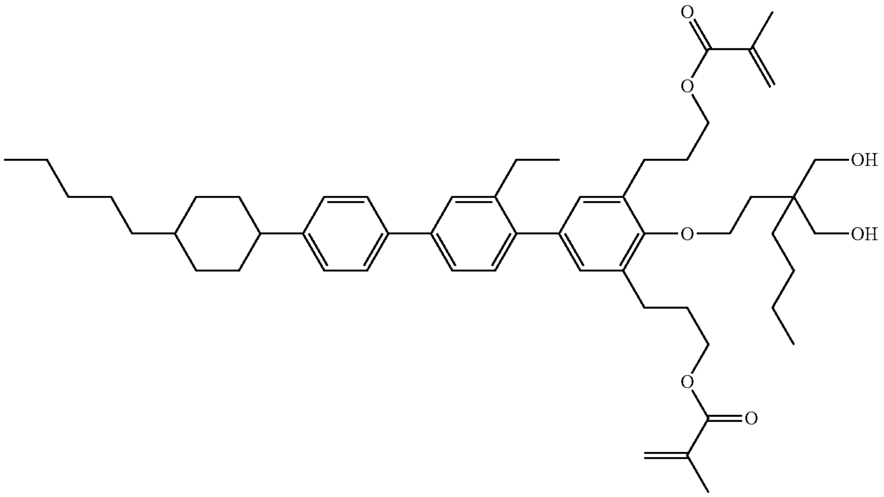 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-32
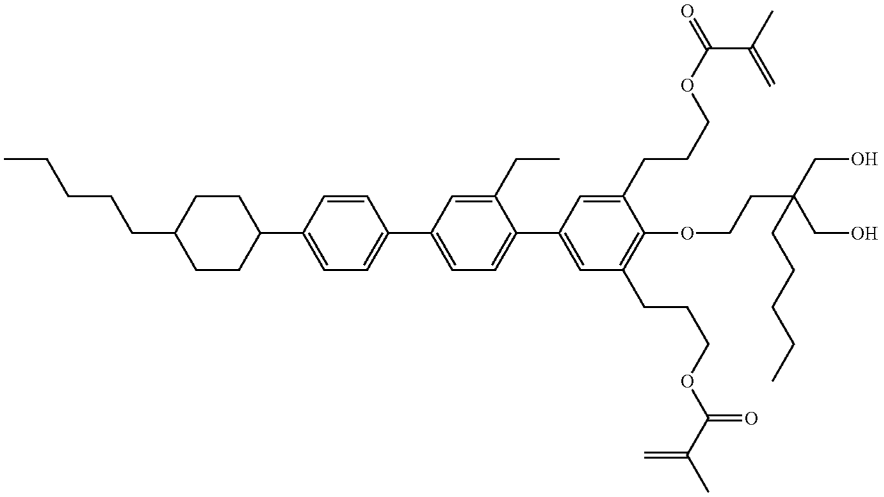 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-33
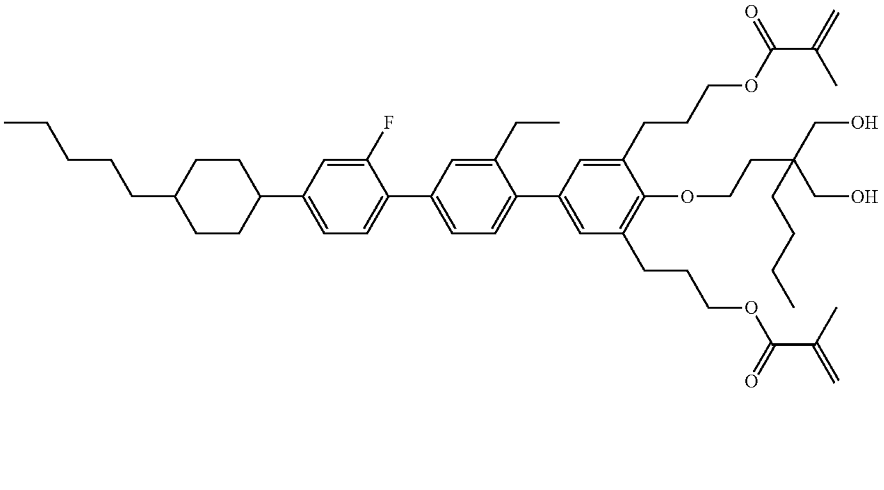 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]
SA-34

TABLE E-continued
Table E shows self-alignment additives for vertical alignment that can be used in LC media for SA-VA and SA-FFS displays according to the present invention together with the polymerizable compounds of formula I:
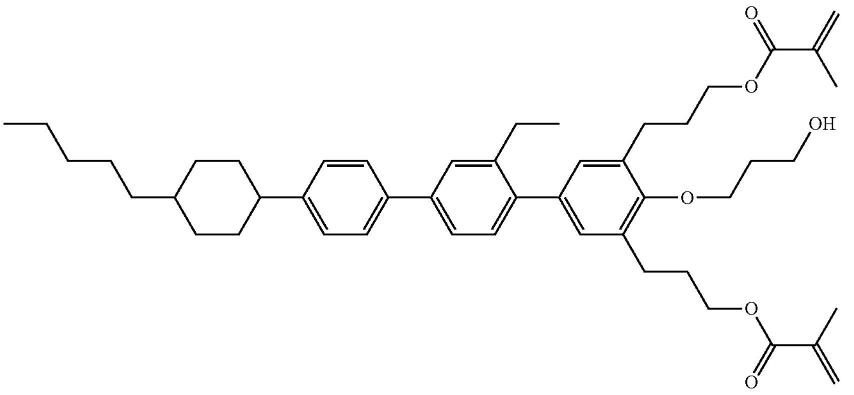 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-35
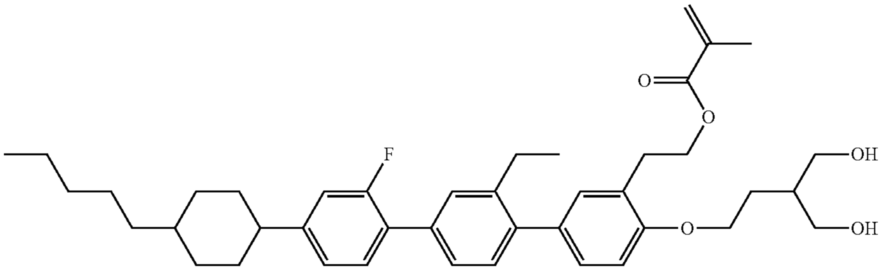 [SMILES: C=C(C)C(=O)OCCc1cc(-c2ccc(-c3ccc(C4CCC(CCCCC)CC4)cc3F)cc2CC)ccc1OCCC(CO)CO]
SA-36
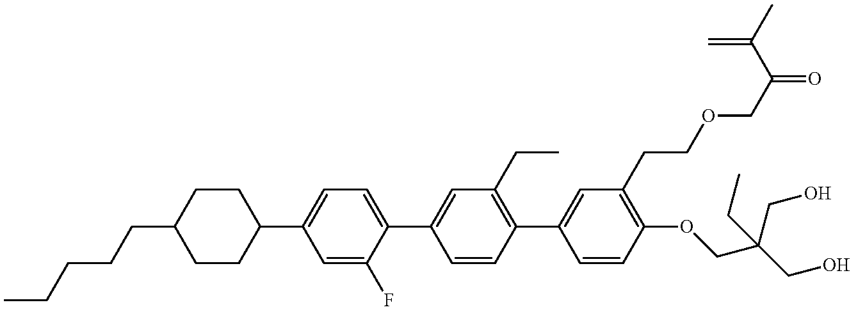 [SMILES: C=C(C)C(=O)COCCc1cc(-c2ccc(-c3ccc(C4CCC(CCCCC)CC4)cc3F)cc2CC)ccc1OCC(CC)(CO)CO]
SA-37
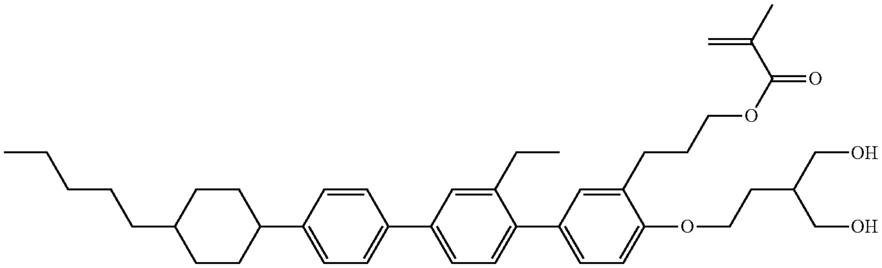 [SMILES: C=C(C)C(=O)OCCCc1cc(-c2ccc(-c3ccc(C4CCC(CCCCC)CC4)cc3)cc2CC)ccc1OCCC(CO)CO]
SA-38
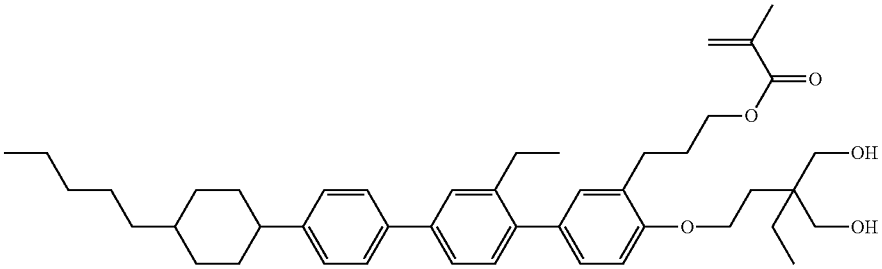 [SMILES: C=C(C)C(=O)OCCCc1cc(-c2ccc(-c3ccc(C4CCC(CCCCC)CC4)cc3)cc2CC)ccc1OCCC(CC)(CO)CO]
SA-39

TABLE E-continued
| Table E shows self-alignment additives for vertical alignment that can be used in LC media for SA-VA and SA-FFS displays according to the present invention together with the polymerizable compounds of formula I: |
| --- |
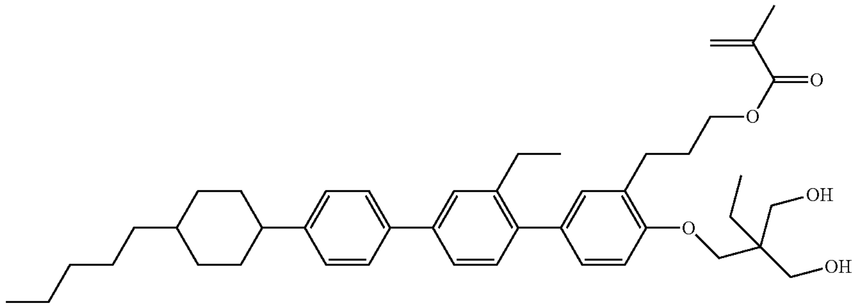 [SMILES: C=C(C)C(=O)OCCCc1cc(-c2ccc(-c3ccc(C4CCC(CCCCC)CC4)cc3)cc2CC)ccc1OCC(CC)(CO)CO]
SA-40
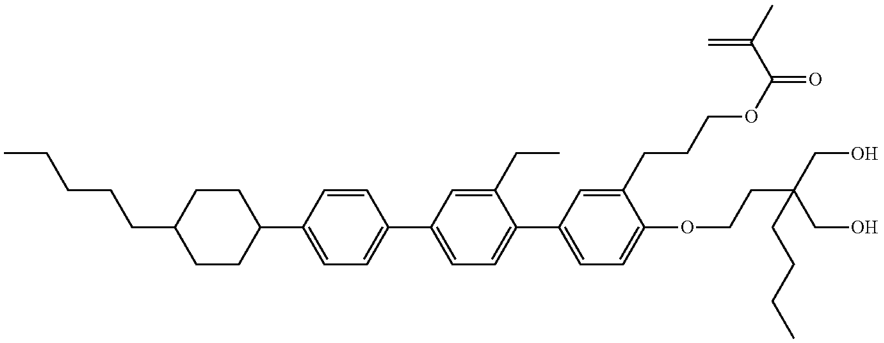 [SMILES: C=C(C)C(=O)OCCCc1cc(-c2ccc(-c3ccc(C4CCC(CCCCC)CC4)cc3)cc2CC)ccc1OCCC(CO)(CO)CCCC]
SA-41
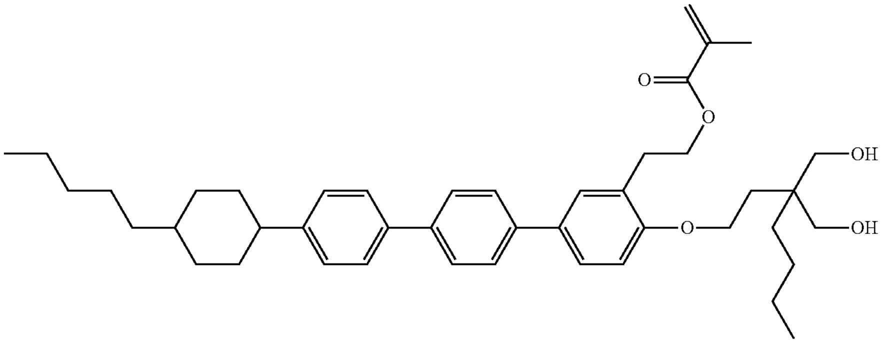 [SMILES: C=C(C)C(=O)OCCc1cc(-c2ccc(-c3ccc(C4CCC(CCCCC)CC4)cc3)cc2)ccc1OCCC(CO)(CO)CCCC]
SA-42
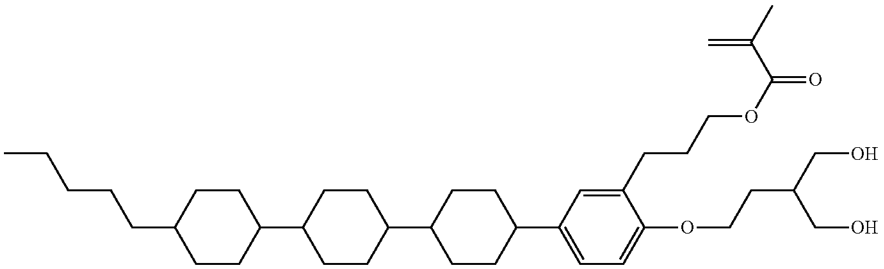 [SMILES: C=C(C)C(=O)OCCCc1cc(C2CCC(C3CCC(C4CCC(CCCCC)CC4)CC3)CC2)ccc1OCCC(CO)CO]
SA-43

TABLE E-continued
| Table E shows self-alignment additives for vertical alignment that can be used in LC media for SA-VA and SA-FFS displays according to the present invention together with the polymerizable compounds of formula I: |
|---|
| SA-44 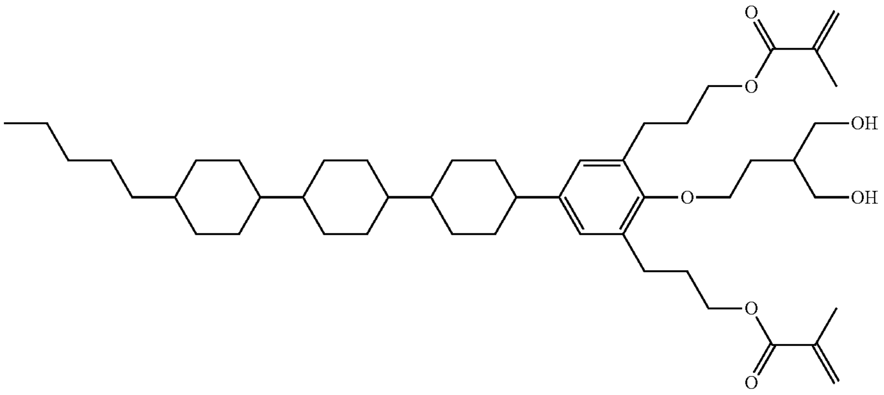 [SMILES: C=C(C)C(=O)OCCCc1cc(C2CCC(C3CCC(C4CCC(CCCCC)CC4)CC3)CC2)cc(CCCOC(=O)C(=C)C)c1OCCC(CO)CO] |
| SA-45 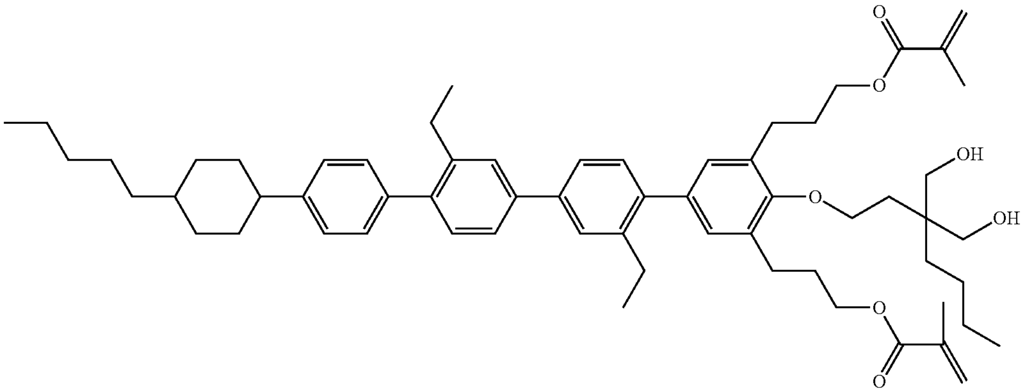 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC] |
| SA-46 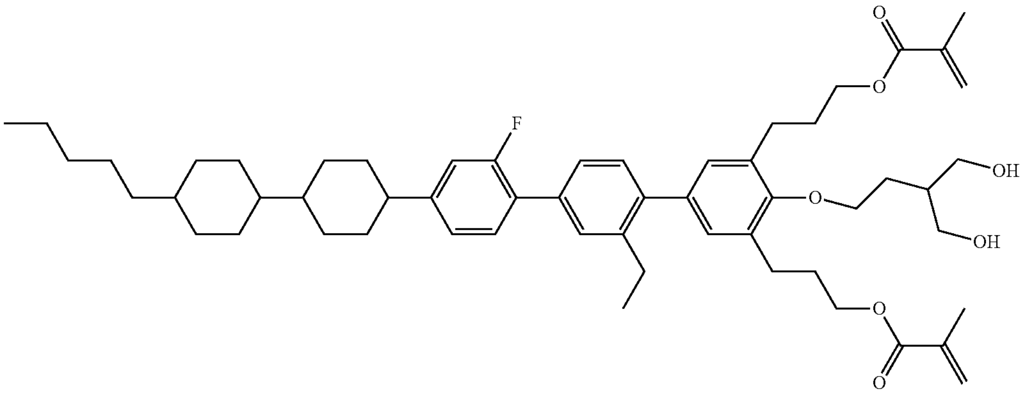 [SMILES: C=C(C)C(=O)OCCCc1cc(-c2ccc(-c3ccc(C4CCC(C5CCC(CCCCC)CC5)CC4)cc3F)cc2CC)cc(CCCOC(=O)C(=C)C)c1OCCC(CO)CO] |

TABLE E-continued

Table E shows self-alignment additives for vertical alignment that can be used in LC media for SA-VA and SA-FFS displays according to the present invention together with the polymerizable compounds of formula I:

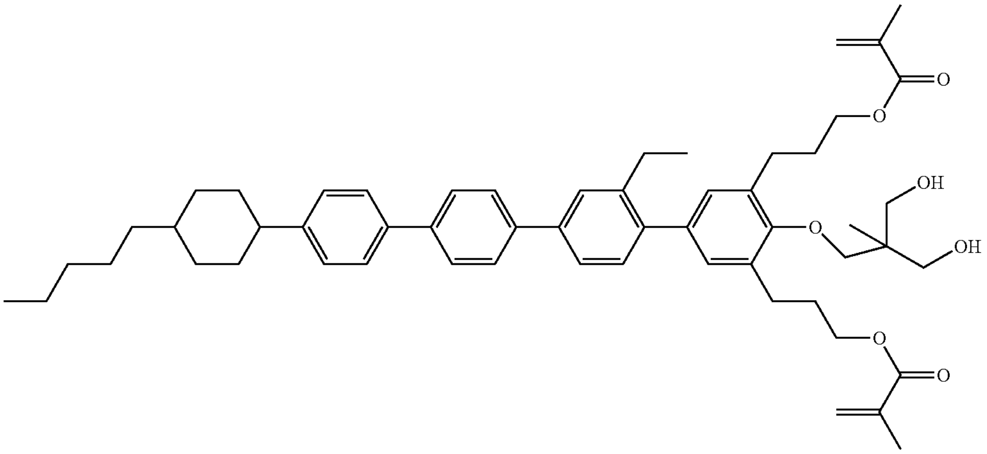 [SMILES: C=C(C)C(=O)OCCCc1cc(-c2ccc(-c3ccc(-c4ccc(C5CCC(CCCCC)CC5)cc4)cc3)cc2CC)cc(CCCOC(=O)C(=C)C)c1OCC(C)(CO)CO]

SA-47

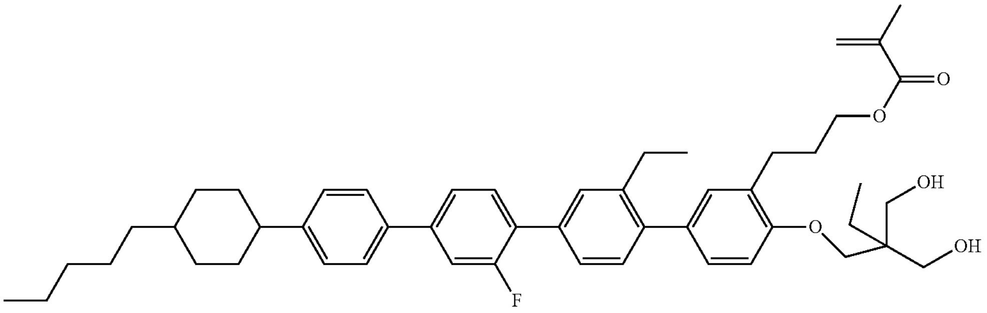 [SMILES: C=C(C)C(=O)OCCCc1cc(-c2ccc(-c3ccc(-c4ccc(C5CCC(CCCCC)CC5)cc4)cc3F)cc2CC)ccc1OCC(CC)(CO)CO]

SA-48

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, in combination with one or more RMs of formula I.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In Addition, the Following Abbreviations and Symbols are Used:

$V_0$ threshold voltage, capacitive [V] at 20° C., $n_e$ extraordinary refractive index at 20° C. and 589 nm, $n_0$ ordinary refractive index at 20° C. and 589 nm, $\Delta n$ optical anisotropy at 20° C. and 589 nm, $\varepsilon_\perp$ dielectric permittivity perpendicular to the director at 20° C. and 1 kHz, $\varepsilon_\parallel$ dielectric permittivity parallel to the director at 20° C. and 1 kHz, $\Delta\varepsilon$ dielectric anisotropy at 20° C. and 1 kHz, cl.p., T(N,I) clearing point [° C.], $\gamma_1$ rotational viscosity at 20° C. [mPa·s], $K_1$ elastic constant, "splay" deformation at 20° C. [pN], $K_2$ elastic constant, "twist" deformation at 20° C. [pN], $K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p. =clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\varepsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid-crystal molecules.

The PSVA display or PSVA test cell used for measurement of the tilt angles consists of two plane-parallel glass outer plates at a separation of 4 μm unless stated otherwise, each of which has on the inside an electrode layer and a polyimide alignment layer on top, where the two polyimide layers are rubbed antiparallel to one another and effect a homeotropic edge alignment of the liquid-crystal molecules. The SAVA display or test cell has the same structure but wherein one or both polyimide layers are omitted.

The polymerizable compounds are polymerized in the display or test cell by irradiation with UV light of defined intensity for a prespecified time, with a voltage simultaneously being applied to the display (usually 10 V to 30 V alternating current, 1 kHz). In the examples, unless indicated otherwise, a metal halide or high pressure Hg lamp and an intensity of 50 to 100 $mW/cm^2$ is used for polymerization. The intensity is measured using a standard meter (Hoenle UV-meter high end with UV sensor).

The tilt angle is determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Comparison Example 1

The nematic LC host mixture C1 is formulated as follows

| | | | |
|---|---|---|---|
| B(S)-2O-O4 | 4.00% | cl. p. | 73.6° C. |
| B(S)-2O-O5 | 5.00% | Δn | 0.1160 |
| BCH-32 | 11.50% | Δε | −2.7 |
| CC-3-V | 28.50% | $\varepsilon_{\|\|}$ | 3.6 |
| CC-3-V1 | 9.00% | $\gamma_1$ | 75 mPa · s |
| CCP-3-1 | 11.00% | $K_1$ | 14.2 |
| CCY-3-O2 | 5.50% | $K_3$ | 15.3 |
| CPY-3-O2 | 5.00% | $K_3/K_1$ | 1.08 |
| PY-1-O2 | 11.50% | $V_0$ | 2.58 V |
| PY-2-O2 | 9.00% | | |

The mixture contains compounds B(S)—2O—O4 and B(S)—2O—O5 of formula IA and compounds CC-3-V and CC-3-V1 of formula IC, but does not contain a compound of formula IB.

Example 1

The nematic LC host mixture N1 is formulated as follows

| | | | |
|---|---|---|---|
| B(S)-2O-O4 | 4.00% | cl. p. | 74.1° C. |
| B(S)-2O-O5 | 5.00% | Δn | 0.1168 |

-continued

| | | | |
|---|---|---|---|
| BCH-32 | 11.00% | Δε | −2.7 |
| CC-3-V | 28.50% | $\varepsilon_{\|\|}$ | 3.6 |
| CC-3-V1 | 9.00% | $\gamma_1$ | 75 mPa · s |
| CCP-3-1 | 11.50% | $K_1$ | 14.0 |
| CLY-3-O2 | 5.50% | $K_3$ | 14.9 |
| CPY-3-O2 | 5.00% | $K_3/K_1$ | 1.06 |
| PY-1-O2 | 11.00% | $V_0$ | 2.47 V |
| PY-2-O2 | 9.50% | | |

The mixture contains compounds B(S)—2O—O4 and B(S)—2O—O5 of formula IA, compound CLY-3-02 of formula IB and compounds CC-3-V and CC-3-V1 of formula IC.

Comparison Example 2

The nematic LC host mixture C2 is formulated as follows

| | | | |
|---|---|---|---|
| B(S)-2O-O4 | 4.00% | cl. p. | 73.9° C. |
| B(S)-2O-O5 | 5.00% | Δn | 0.1166 |
| B(S)-2O-O6 | 3.00% | Δε | −2.7 |
| BCH-32 | 11.50% | $\varepsilon_{\|\|}$ | 3.6 |
| CC-3-V | 31.00% | $\gamma_1$ | 76 mPa · s |
| CC-3-V1 | 8.00% | $K_1$ | 14.1 |
| CCP-3-1 | 11.50% | $K_3$ | 14.7 |
| CCY-3-O2 | 3.00% | $K_3/K_1$ | 1.04 |
| CPY-3-O2 | 5.00% | $V_0$ | 2.47 V |
| PY-1-O2 | 12.50% | | |
| PY-2-O2 | 5.50% | | |

The mixture contains compounds B(S)—2O—O4, B(S)—2O—O5 and B(S)—2O—O6 of formula IA and compounds CC-3-V and CC-3-V1 of formula IC, but does not contain a compound of formula IB.

Example 2

The nematic LC host mixture N2 is formulated as follows

| | | | |
|---|---|---|---|
| B(S)-2O-O4 | 4.00% | cl. p. | 74.1° C. |
| B(S)-2O-O5 | 5.00% | Δn | 0.1164 |
| B(S)-2O-O6 | 3.00% | Δε | −2.7 |
| BCH-32 | 11.00% | $\varepsilon_{\|\|}$ | 3.6 |
| CC-3-V | 31.00% | $\gamma_1$ | 72 mPa · s |
| CC-3-V1 | 8.00% | $K_1$ | 14.1 |
| CCP-3-1 | 12.00% | $K_3$ | 14.7 |
| CLY-3-O2 | 3.00% | $K_3/K_1$ | 1.04 |
| CPY-3-O2 | 5.00% | $V_0$ | 2.47 V |
| PY-1-O2 | 11.00% | | |
| PY-2-O2 | 7.00% | | |

The mixture contains compounds B(S)—2O—O4, B(S)—2O—O5 and B(S)—2O—O6 of formula IA, compound CLY-3-02 of formula IB and compounds CC-3-V and CC-3-V1 of formula IC.

Polymerizable Mixtures

Polymerizable mixtures are prepared by adding the polymerizable compound M1 and the stabilizer S1, to the nematic LC host mixtures as described above. The polymerizable mixture compositions are shown in Table 1 below.

TABLE 1

Polymerizable mixture compositions

| Mixture | PC1 | P1 | PC2 | P2 |
|---|---|---|---|---|
| Host | C1 | N1 | C2 | N2 |

TABLE 1-continued

| Polymerizable mixture compositions | | | | |
|---|---|---|---|---|
| % M1 | 0.4 | 0.4 | 0.4 | 0.4 |
| % S1 | 0.005 | 0.005 | 0.005 | 0.005 |

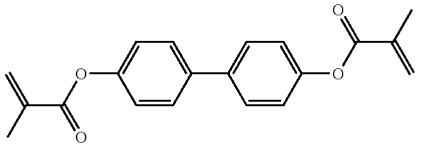

M1

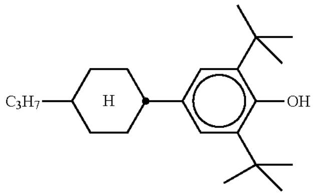

S1

VHR

The VHR of the polymerizable mixtures was measured at 60° C. with application of a voltage of 1 V/60 Hz before and after UV illumination for certain periods of time, and after backlight load (BL) for certain periods of time.

Light stress usually causes the decrease of VHR in LC mixtures, therefore the smaller the absolute decrease of VHR value after stress, the better performance for display applications. The results are shown in Table 2.

TABLE 2

| VHR | | | | |
|---|---|---|---|---|
| Mixture | VHR (%) Initial | VHR (%) 80 min UV | VHR (%) BL 1 day | VHR (%) BL 5 days |
| PC1 | 99.5 | 92.5 | 96.1 | 94.3 |
| P1 | 99.6 | 94.5 | 98.2 | 97.5 |
| PC2 | 99.6 | 90.5 | 96.0 | 91.4 |
| P2 | 99.5 | 91.3 | 97.7 | 96.8 |

From Table 2 it can be seen that the VHR values of the polymerizable mixtures P1 and 2 according to the invention are significantly higher compared to the polymerizable reference mixtures PC1 and PC2.

Tilt Stability

Tilt stability, i.e. the change of the tilt angle after repeated electric stress, is a criterion for evaluating the risk of image sticking. A low value for the change of the tilt angle indicates a high tilt stability and a low potential risk of image sticking.

For determining the tilt stability the polymerizable mixtures were polymerized in VA-tilt test cells with a cell thickness of approximately 4 μm and two substrates with anti-parallel rubbed polyimide layers (JALS-2096-R1) by UV exposure of 6J with 50 mW/cm2 at RT using a high pressure Hg lamp and with an applied square wave voltage of $14V_{PP}$ and 60 Hz. The tilt angle was measured with an Axometrics AxoScan® initially, after electrical stress with a square wave voltage of $60V_{PP}$ and 60 Hz for 72 h, and 24 h after release of the electrical stress. The change of the tilt angle Δtilt is determined according to the following equation $$tilt_{after\ stress} - tilt_{after\ tilt\ generation} = \Delta tilt$$

and is shown in Table 3 below. The lower the value of Δtilt, the higher is the tilt stability.

TABLE 3

| Tilt Stability | | |
|---|---|---|
| Mixture | Δtilt/° [1)] | Δtilt/° [2)] |
| PC1 | 0.4 | 0.2 |
| P1 | 0.4 | 0.2 |
| PC2 | 0.6 | 0.2 |
| P2 | 0.4 | 0.2 |

[1)] after electrical stress
[2)] after release (24 h after electric stress)

From Table 3 it can be seen that polymerizable mixtures P1 and P2 according to the invention show good tilt stability similar to or even better than the polymerizable reference mixtures PC1 and PC2.

The invention claimed is:

1. An LC medium comprising:

(i) a polymerizable component A) comprising one or more polymerizable compounds selected from formula M13:

M13

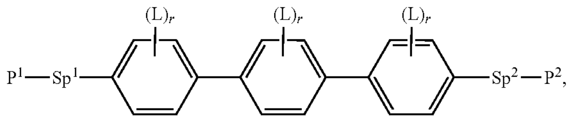

in which the individual radicals, on each occurrence identically or differently, and each, independently of one another, have the following meaning:

$P^1$, $P^2$ an acrylate or methacrylate group, $Sp^1$, $Sp^2$ a single bond,

L F, Cl, CN or straight-chain, optionally mono- or polyfluorinated alkyl or alkoxy 1 to 12 C atoms, straight-chain, optionally mono- or polyfluorinated alkenyl, alkynyl, alkylcarbonyl, alkoxycarbonyl, alkylcarbonyloxy, or alkoxycarbonyloxy having 2 to 12 C atoms, or branched, optionally mono- or polyfluorinated alkyl, alkoxy, alkenyl, alkynyl, alkylcarbonyl, alkoxycarbonyl, alkylcarbonyloxy or alkoxycarbonyloxy having 3 to 12 C atoms, and r 0, 1, 2, 3 or 4;

(ii) a liquid-crystalline component B), comprising one or more mesogenic or liquid-crystalline compounds, wherein component B) comprises one or more compounds of formula IIB2

IIB-2

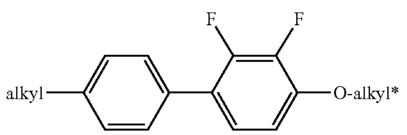

in which alkyl and alkyl* each, independently of one another, denote a straight-chain alkyl radical having 1-6 C atoms, and at least two compounds of formula IA, one or more compounds of formula IB, and at least one compound of formula IC-1 and/or IC-2 as defined below

IA

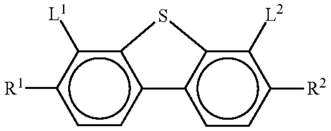

IB

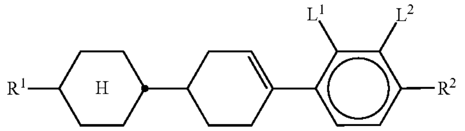

IC-1

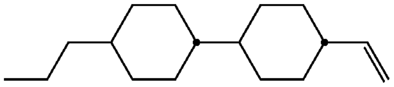

IC-2

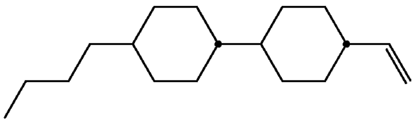

in which the individual radicals, on each occurrence identically or differently, and each, independently of one another, have the following meaning:

$R^1$, $R^2$ straight chain alkyl having 1 to 25 C atoms, branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$=$CR^{00}$—, —C≡C—,

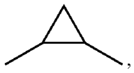, 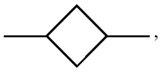,

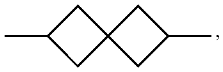, 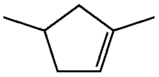,

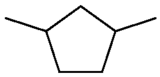, in such a manner that O- and/or S-atoms are not directly connected with each other, and wherein one or more H atoms are each optionally replaced by F or Cl, $R^0$, $R^{00}$ H or alkyl having 1 to 12 C atoms, $L^1$, $L^2$ F, alkyl an alkyl radical having 1 to 7 C atoms, and alkenyl an alkenyl radical having 2 to 5 C atoms, wherein the proportion of compounds of formula IA in the component B) of the LC medium is >8% by weight, and wherein the total proportion of compounds of formulae IC-1 and/or IC-2 in the LC medium is from 20 to 45% by weight; and (iii) one or more compounds of formula III2-2:

II2-2

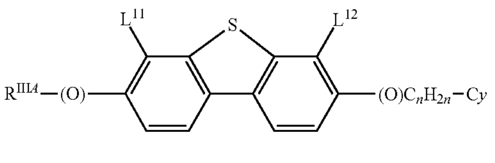

in which $L^{11}$ and $L^{12}$ each, independently of one another, denote F, Cl, $CF_3$ or $CHF_2$, (O) denotes O or a single bond, $R^{IIIA}$ denotes an alkyl having 1-7 C atoms, an alkenyl having 2-7 C atoms or a group Cy-$C_mH_{2m+1}$—, m and n are, identically or differently, 0, 1, 2, 3, 4, 5 or 6, and Cy denotes a cycloaliphatic group having 3, 4 or 5 ring atoms, wherein the cycloaliphatic group is optionally substituted with an alkyl having 1-3 carbon atoms, an alkenyl having 2-3 C atoms or with halogen or CN.

2. The LC medium according to claim 1, wherein the one or more compounds of formula IA are selected from the group consisting of the formulae IA-1 to IA-10:

IA-1

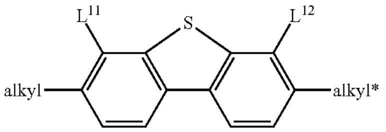

IA-2

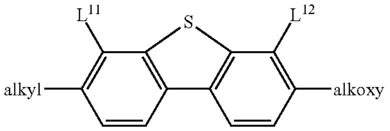

IA-3

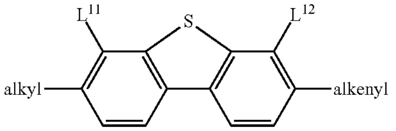

IA-4

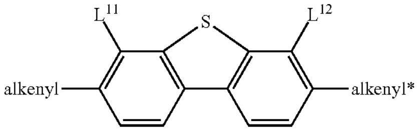

IA-5

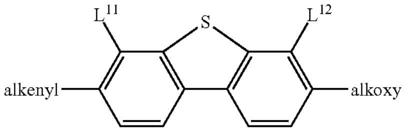

IA-6

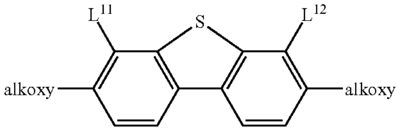

IA-7

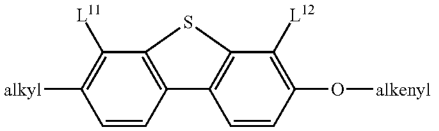

IA-8

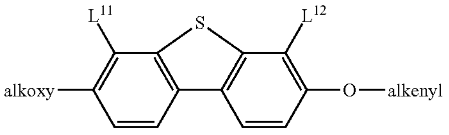

-continued

IA-9

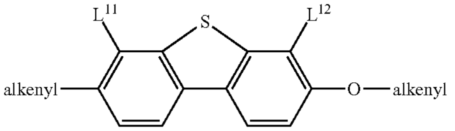

IA-10

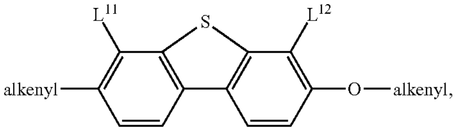

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl.

3. The LC medium according to claim 1, wherein the one or more compounds of formula IB are selected from the group consisting of the following subformulae:

IB-1

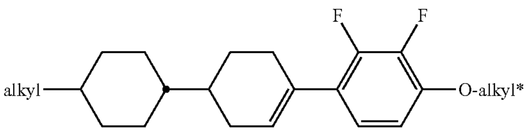

IB-2

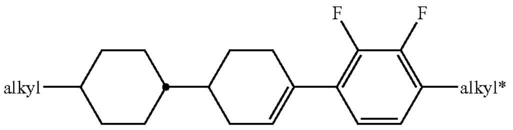

IB-3

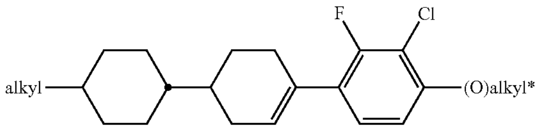

IB-4

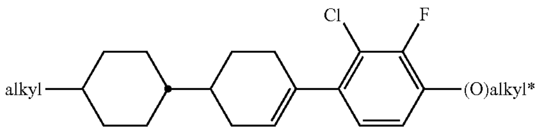

in which alkyl and alkyl* independently of each other denote a straight-chain alkyl radical having 1-6 C atoms and (O) denotes an oxygen atom or a single bond.

4. The LC medium according claim 1, further comprising one or more compounds selected from the group consisting of the formulae IC-3 to IC-12:

IC-3

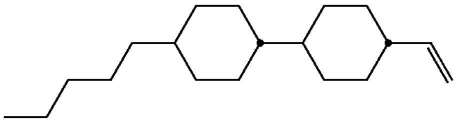

IC-4

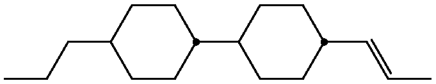

IC-5

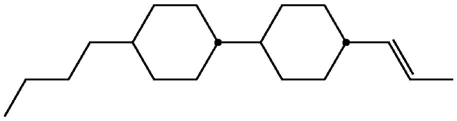

IC-6

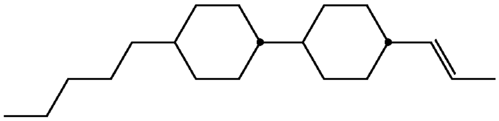

IC-7

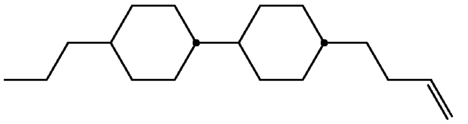

IC-8

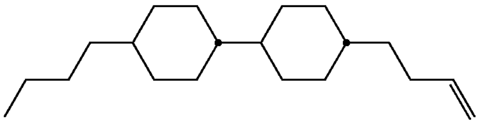

IC-9

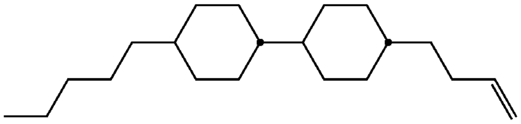

IC-10

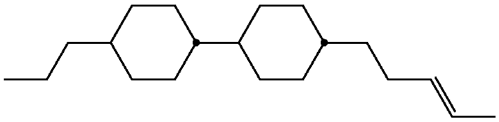

IC-11

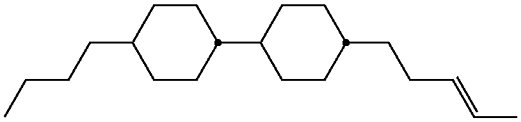

IC-12

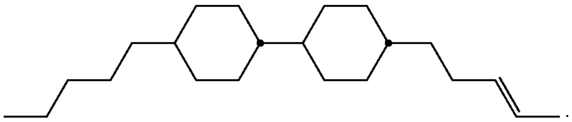

5. The LC medium according to claim 1, comprising, in addition to and other than the one or more compounds of formula IIB-2, one or more compounds of formula II

II

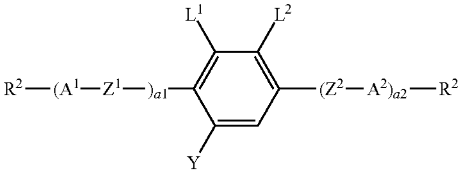

wherein the individual radicals, independently of each other and on each occurrence identically or differently, have the following meanings $R^1$ and $R^2$ straight chain alkyl having 1 to 25 C atoms, branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

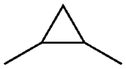, 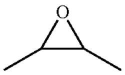, 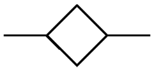, 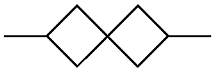, 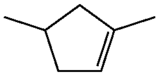 or 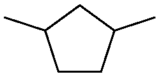

in such a manner that O- and/or S-atoms are not directly connected with each other, and wherein one or more H atoms are each optionally replaced by F or Cl, H or alkyl having 1 to 12 C atoms, $R^0$, $R^{00}$ H or alkyl having 1 to 12 C atoms, A1 and A2 a group selected from the following formulae

A1

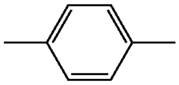

A2

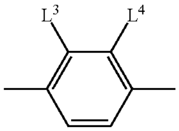

A3

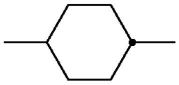

A4

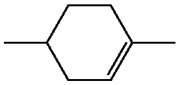

A5

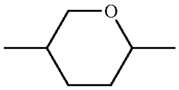

A6

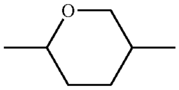

-continued

A7

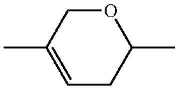

A8

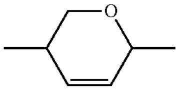

A9

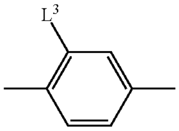

A10

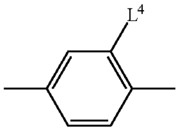

A11

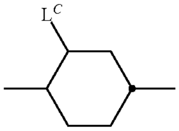

A12

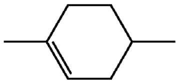

A13

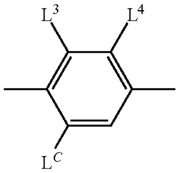

A14

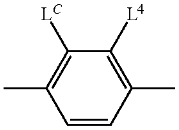

A15

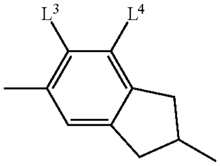

A16

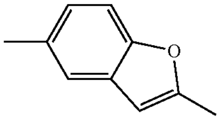, $Z^1$ and $Z^2$—$CH_2CH_2$—, —CH═CH—, —$CF_2O$—, —$OCF_2$—, —$CH_2O$-, —$OCH_2$—, —CO—O—, —O—CO—, —$C_2F_4$—, —CF═CF—, —CH═CH—$CH_2O$— or a single bond, $L^1$, $L^2$, $L^3$ and $L^4$ F, Cl, $OCF_3$, $CF_3$, $CH_3$, $CH_2F$ or $CHF_2$, Y H, F, Cl, $CF_3$, $CHF_2$ or $CH_3$, $L^C$ $CH_3$ or $OCH_3$, a1 1 or 2, and a2 0 or 1.

6. The LC medium according claim 5, wherein the one or more compounds of formula II in addition to and other than the one or more compounds of formula IIB-2 comprise one or more compounds of the formulae IIA, IIB, IIC and IID

IIA

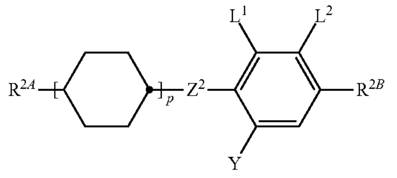

IIB

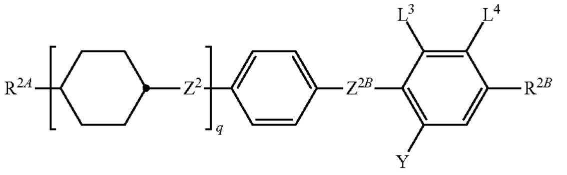

IIC

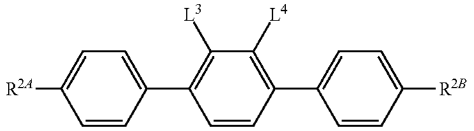

IID

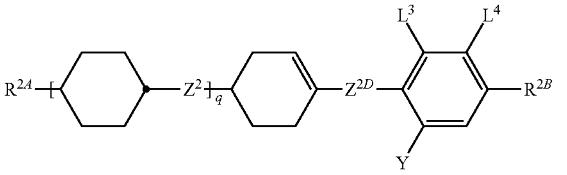

in which $R^{2A}$ and $R^{2B}$ each, independently of one another, denote H, an alkyl radical having up to 15 C atoms or an alkenyl radical having 2 to 15 C atoms, the alkyl or alkenyl radical being unsubstituted, monosubstituted by CN or $CF_3$ or at least monosubstituted by halogen, where, in addition, one or more $CH_2$ groups in these radicals may be replaced by —O—, —S—,

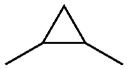, 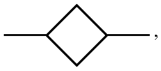,

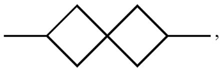, 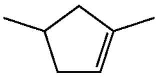,

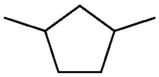,

—C≡C—, —$CF_2$O—, —O$CF_2$—, —OC—O— or —O—CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, $Z^2$, $Z^2$B and $Z^2$D each, independently of one another, denote a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF—, —CH═CHC$H_2$O—, p denotes 0, 1 or 2, and q on each occurrence, identically or differently, denotes 0 or 1.

7. The LC medium according to claim 1, wherein it additionally comprises one or more compounds of formula IV

IV

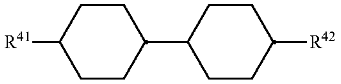

in which $R^{41}$ denotes an unsubstituted alkyl radical having 1 to 7 C atoms or an unsubstituted alkenyl radical having 2 to 7 C atoms, and $R^{42}$ denotes an unsubstituted alkyl radical having 1 to 7 C atoms or an unsubstituted alkoxy radical having 1 to 6 C atoms, an unsubstituted alkenyl radical having 2 to 7 C atoms.

8. The LC medium according to claim 7, wherein it additionally comprises one or more compounds of formula V

V

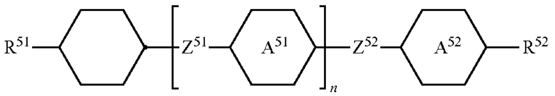

in which $R^{51}$ and $R^{52}$ independently of one another, have one of the meanings given for $R^{41}$ and $R^{42}$,

, , identically or differently, denote

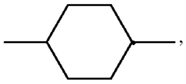, 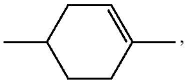,

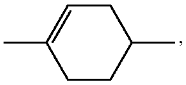, 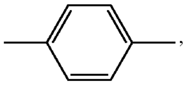,

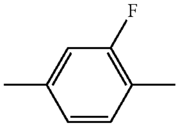 or 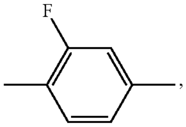, $Z^{51}$, $Z^{52}$ each, independently of one another, denote —$CH_2$—$CH_2$—, —$CH_2$—O—, —CH═CH—, —C≡C—, —COO— or a single bond, and n is 1 or 2.

9. The LC medium according to claim 1, further comprising one or more compounds of formula V-16

V-16

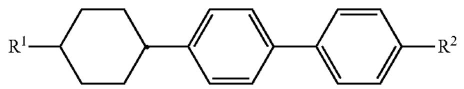

in which $R^1$ and $R^2$ each, independently of one another, denote straight-chain alkyl with 1 to 6 C atoms.

10. The LC medium according to claim 1, wherein the one or more polymerizable compounds comprise, in addition to and other than the one or more polymerizable compounds selected from formula M13, one or more compounds of formula M $$R^a—B^1—(Z^b—B^2)_m—R^b$$

in which the individual radicals, on each occurrence identically or differently, and each, independently of one another, have the following meaning:

$R^a$ and $R^b$ P, P-Sp-, H, F, Cl, Br, I, —CN, —$NO_2$, —NCO, —NCS, —OCN, —SCN, $SF_5$ or straight-chain alkyl having 1 to 25 C atoms or branched alkyl having 3 to 25 C atoms, in which, in addition, one or more non-adjacent $CH_2$ groups may each be replaced, independently of one another, by —$C(R^0)$=$C(R^{00})$—, —C≡C—, —$N(R^{00})$—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerizable group, Sp spacer group or a single bond, $B^1$ and $B^2$ an aromatic, heteroaromatic, alicyclic or heterocyclic group having 4 to 25 ring atoms, which may also contain fused rings, and which is unsubstituted, or mono- or polysubstituted by L, $Z^b$—O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, $CR^0R^{00}$ or a single bond, $R^0$ and $R^{00}$ H or alkyl having 1 to 12 C atoms, m 0, 1, 2, 3 or 4, n1 1, 2, 3 or 4, L P, P-Sp-, OH, $CH_2OH$, F, Cl, Br, I, —CN, —$NO_2$, —NCO, —NCS, —OCN, —SCN, —C(=O)$N(R^x)_2$, —C(=O)$Y^1$, —C(=O) $R^x$, —$N(R^x)_2$, optionally substituted silyl, optionally substituted aryl having 6 to 20 C atoms, or straight-chain alkyl, alkoxy, alkylcarbonyl, alkoxycarbonyl, alkylcarbonyloxy or alkoxycarbonyloxy having 1 to 25 C atoms or branched alkyl, alkoxy, alkylcarbonyl, alkoxycarbonyl, alkylcarbonyloxy or alkoxycarbonyloxy having 3 to 25 C atoms, in which, in addition, one or more H atoms may be replaced by F, Cl, P or P-Sp-, $Y^1$ halogen, and $R^x$ P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

11. The LC medium according claim 1, wherein it additionally comprises one or more additives selected from the group consisting of stabilizers, chiral dopants, polymerization initiators and self alignment additives.

12. A process of preparing an LC medium, comprising the steps of: mixing one or more polymerizable compounds selected from formula M13:

M13

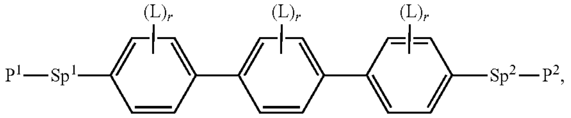

in which the individual radicals, on each occurrence identically or differently, and each, independently of one another, have the following meaning:

$P^1$, $P^2$ an acrylate or methacrylate group, $Sp^1$, $Sp^2$ a single bond,

L F, Cl, CN or straight-chain, optionally mono- or polyfluorinated alkyl or alkoxy having 1 to 12 C atoms, straight-chain, optionally mono- or polyfluorinated alkenyl, alkynyl, alkylcarbonyl, alkoxycarbonyl, alkylcarbonyloxy, or alkoxycarbonyloxy having 2 to 12 C atoms, or branched, optionally mono- or polyfluorinated alkyl, alkoxy, alkenyl, alkynyl, alkylcarbonyl, alkoxycarbonyl, alkylcarbonyloxy or alkoxycarbonyloxy having 3 to 12 C atoms, and r 0, 1, 2, 3 or 4, with one or more compounds of formula IIB2

IIB-2

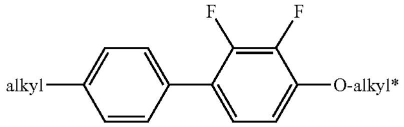

in which alkyl and alkyl* each, independently of one another, denote a straight-chain alkyl radical having 1-6 C atoms, and at least two compounds of formula IA, one or more compounds of formula IB, and at least one compound of formula IC-1 and/or IC-2

IA

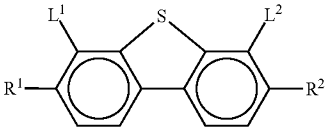

IB

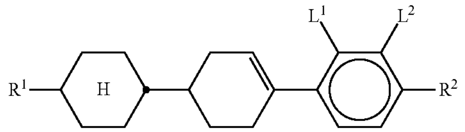

-continued

IC-1

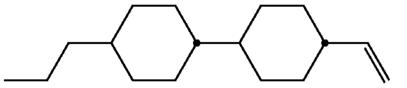

IC-2

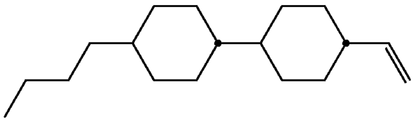

in which the individual radicals, on each occurrence identically or differently, and each, independently of one another, have the following meaning:

$R^1$, $R^2$ straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$=$CR^{00}$—, —C≡C—,

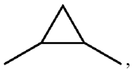, 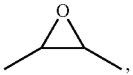, 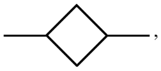, 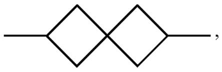, 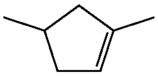 or 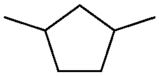

in such a manner that O- and/or S-atoms are not directly connected with each other, and wherein one or more H atoms are each optionally replaced by F or Cl, $R^0$, $R^{00}$ H or alkyl having 1 to 12 C atoms, $L^1$, $L^2$ F, alkyl an alkyl radical having 1 to 7 C atoms, and alkenyl an alkenyl radical having 2 to 5 C atoms, wherein the proportion of compounds of formula IA of the LC medium is >8% by weight based on the total weight of compounds of formulae IA, IB, and IC present, and wherein the total proportion of compounds of formulae IC-1 and/or IC-2 in the LC medium is from 20 to 45% by weight, and one or more compounds of formula III2-2:

II2-2

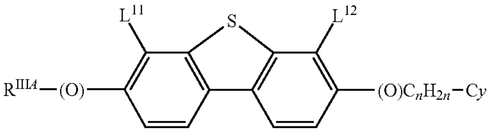

in which $L^{11}$ and L 12 each, independently of one another, denote F, Cl, $CF_3$ or $CHF_2$, (O) denotes O or a single bond, $R^{IIIA}$ denotes an alkyl having 1-7 C atoms, an alkenyl having 2-7 C atoms or a group Cy-$C_mH_{2m+1}$—, m and n are, identically or differently, 0, 1, 2, 3, 4, 5 or 6, and Cy denotes a cycloaliphatic group having 3, 4 or 5 ring atoms, wherein the cycloaliphatic group is optionally substituted with an alkyl having 1-3 carbon atoms, an alkenyl having 2-3 C atoms or with halogen or CN, and optionally with one or more compounds of formula II, III, IV and/or V

II

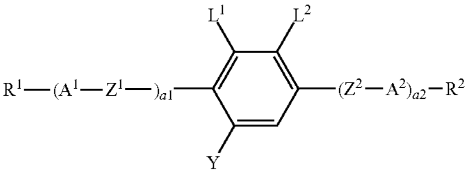

wherein the individual radicals, independently of each other and on each occurrence identically or differently, have the following meanings $R^1$ and $R^2$ straight chain alkyl having 1 to 25 C atoms or branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$=$CR^{00}$—, —C≡C—,

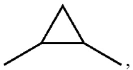, , 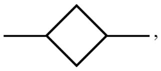, 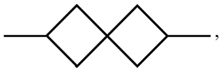, 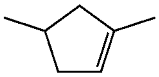 or 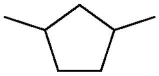

in such a manner that O- and/or S-atoms are not directly connected with each other, and wherein one or more H atoms are each optionally replaced by F or Cl, H or alkyl having 1 to 12 C atoms, $R^0$, $R^{00}$ H or alkyl having 1 to 12 C atoms, A1 and A2 a group selected from the following formulae

A1

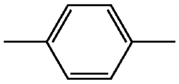

A2

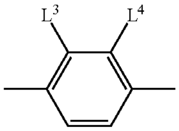

A3

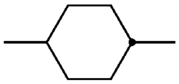

A4

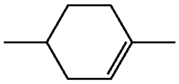

A5

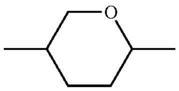

-continued

A6
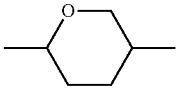

A7
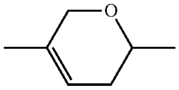

A8
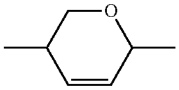

A9
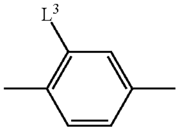

A10
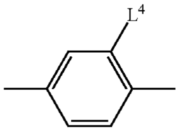

A11
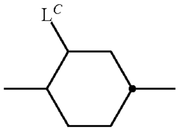

A12
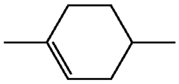

A13
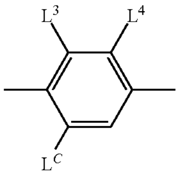

A14
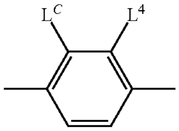

A15
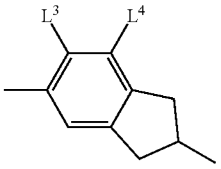

A16
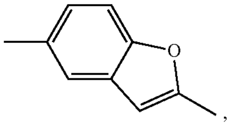

, $Z^1$ and $Z^2$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, $L^1$, $L^2$, $L^3$ and $L^4$ F, Cl, $OCF_3$, $CF_3$, $CH_3$, $CH_2F$ or $CHF_2$, Y H, F, Cl, $CF_3$, $CHF_2$ or $CH_3$, $L^C$ $CH_3$ or $OCH_3$, a1 1 or 2, and a2 0 or 1,

III

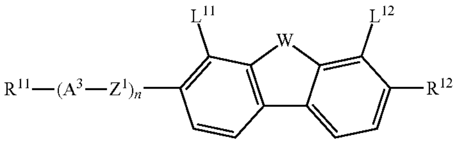

in which $R^{11}$ and R 12 each, independently of one another, denote H, an alkyl or alkoxy radical having 1 to 15 C atoms, where one or more $CH_2$ groups in these radicals may each be replaced, independently of one another, by

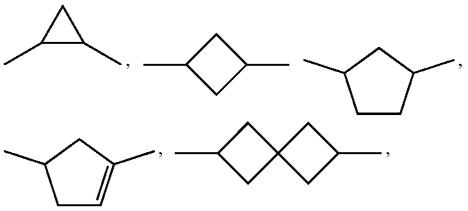

—C≡C—, —$CF_2O$—, —$OCF_2$—, —CH═CH—, by —O—, —CO—O— or —O—CO— in such a way that O atoms are not linked directly to one another, and in which, in addition, one or more H atoms may be replaced by halogen, $A^3$ on each occurrence, independently of one another, denotes a) 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, denotes 0, 1 or 2, n denotes 0, 1 or 2, $Z^1$ on each occurrence independently of one another denotes-CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, and $L^{11}$ and $L^{12}$ each, independently of one another, denote F, Cl, $CF_3$ or $CHF_2$, and W denotes O or S, and if n is 0 then Wis not S, wherein the one or more compounds of formula III2-2 are excluded from the one or more compounds of formula III,

IV

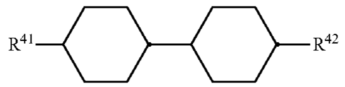

in which $R^{41}$ denotes an unsubstituted alkyl radical having 1 to 7 C atoms or an unsubstituted alkenyl radical having 2 to 7 C atoms, and $R^{42}$ denotes an unsubstituted alkyl radical having 1 to 7 C atoms or an unsubstituted alkoxy radical having 1 to 6 C atoms, an unsubstituted alkenyl radical having 2 to 7 C atoms,

V

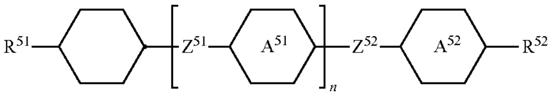

in which $R^{51}$ and $R^{52}$ independently of one another, have one of the meanings given for $R^{41}$ and $R^{42}$,

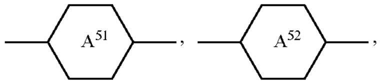

identically or differently, denote

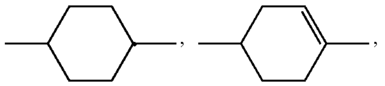

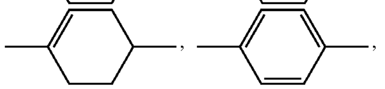

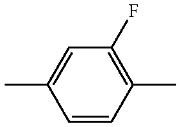

or

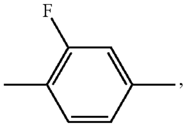

$Z^{51}$, $Z^{52}$ each, independently of one another, denote —$CH_2$—$CH_2$—, —$CH_2$—O—, —CH═CH—, —C≡C—, —COO— or a single bond, and n is 1 or 2, optionally with further liquid-crystalline compounds and/or additives, and optionally polymerizing the polymerizable compounds.

13. An LC display comprising the LC medium as claimed in claim 1.

14. The LC display of claim 13, which is a PSA or SA display.

15. The LC display of claim 14, which is a PS-VA, PS-IPS, PS-FFS or SA-VA display.

16. The LC display of claim 14, wherein it comprises two substrates, at least one of which is transparent to light, an electrode provided on each substrate or two electrodes provided on only one of the substrates, and located between the substrates a layer of the LC medium, wherein the polymerizable compounds are polymerized between the substrates of the display by UV photopolymerization.

17. A process for the production of an LC display comprising two substrates, at least one of which is transparent to light, an electrode provided on each substrate or two electrodes provided on only one of the substrates, and located between the substrates a layer of an LC medium, the process comprising the steps of providing the LC medium of claim 1 between the substrates of the display, and polymerizing the polymerizable compounds by irradiation with UV light.

18. The process according to claim 17, wherein the UV light has a wavelength in the range from 340 to 380 nm.

19. The process according to claim 17, wherein irradiation with UV light is carried out using an UV-LED lamp.

20. The LC medium according to claim 1, wherein the one or more compounds of formula III2-2 are selected from the group consisting of formulae III2-2-1 to III2-2-3:

II2-2-1

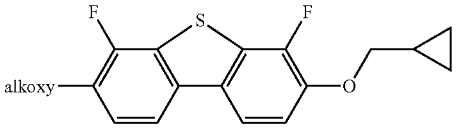

II2-2-2

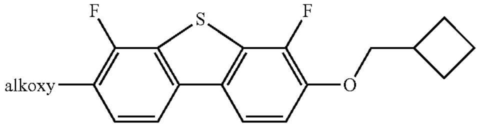

II2-2-3

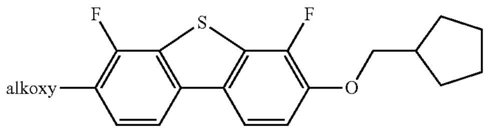

in which alkoxy denotes a straight-chain alkoxy radical having 1-6 C atoms.

* * * * *